United States Patent
Li et al.

(10) Patent No.: US 11,973,858 B2
(45) Date of Patent: Apr. 30, 2024

(54) METHOD FOR RECORDING DATA BLOCK IN BLOCKCHAIN NETWORK, ACCOUNTING NODE, AND MEDIUM

(71) Applicant: TENCENT TECHNOLOGY (SHENZHEN) COMPANY LIMITED, Guangdong (CN)

(72) Inventors: Maocai Li, Shenzhen (CN); Hu Lan, Shenzhen (CN); Zongyou Wang, Shenzhen (CN); Kaiban Zhou, Shenzhen (CN); Haitao Tu, Shenzhen (CN); Jinsong Zhang, Shenzhen (CN); Yifang Shi, Shenzhen (CN); Changqing Yang, Shenzhen (CN); Li Kong, Guangdong (CN); Gengliang Zhu, Shenzhen (CN); Yong Ding, Shenzhen (CN); Qucheng Liu, Shenzhen (CN); Qiuping Chen, Shenzhen (CN); Peng Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 586 days.

(21) Appl. No.: 17/200,118

(22) Filed: Mar. 12, 2021

(65) Prior Publication Data

US 2021/0203482 A1     Jul. 1, 2021

Related U.S. Application Data

(63) Continuation of application No. PCT/CN2019/122394, filed on Dec. 2, 2019.

(30) Foreign Application Priority Data

Dec. 7, 2018   (CN) .......................... 201811495812.2

(51) Int. Cl.
  *H04L 9/40*   (2022.01)
  *H04L 9/06*   (2006.01)
  (Continued)

(52) U.S. Cl.
  CPC .......... *H04L 9/0643* (2013.01); *H04L 9/3247* (2013.01); *H04L 67/568* (2022.05); *H04L 9/50* (2022.05)

(58) Field of Classification Search
  CPC ....... H04L 9/50; H04L 9/3247; H04L 9/0643; H04L 67/568
  See application file for complete search history.

(56) References Cited

U.S. PATENT DOCUMENTS 11,128,438 B1 * 9/2021 Konda ................ H04L 63/0263
2017/0046638 A1   2/2017 Chan et al.
(Continued)

FOREIGN PATENT DOCUMENTS

| CN | 1939003 A | 3/2007 |
|----|-----------|--------|
| CN | 103312752 A | 9/2013 |

(Continued)

OTHER PUBLICATIONS

Chinese Office Action dated Sep. 8, 2022 in Application No. 201911167521.5 with Concise English Translation, 10 pages.

(Continued)

*Primary Examiner* — Thaddeus J Plecha
(74) *Attorney, Agent, or Firm* — ARENTFOX SCHIFF LLP

(57) ABSTRACT

Aspects of the disclosure are directed to a method for use on a blockchain network that includes an accounting node subnetwork having accounting nodes configured to record a data block onto a blockchain and a service node having service nodes configured to verify data blocks recorded by the accounting nodes onto the blockchain. The method can (Continued)

include generating a signature based on transaction information to be included in a data block to be added onto the blockchain by using a key specific to the accounting node. The method can further include adding the transaction information and the generated signature to the data block and adding the data block onto the blockchain, and transmitting the signature to the service nodes in the service node subnetwork, so that the service nodes perform signature verification on the signature based on the key specific to the accounting node.

20 Claims, 33 Drawing Sheets

(51) Int. Cl.
*H04L 9/32* (2006.01)
*H04L 67/568* (2022.01)
*H04L 9/00* (2022.01)

(56) References Cited

U.S. PATENT DOCUMENTS

| | | | |
|---|---|---|---|
| 2018/0068091 A1 | 3/2018 | Gaidar et al. | |
| 2019/0173667 A1* | 6/2019 | Wang | H04L 63/08 |
| 2020/0082361 A1* | 3/2020 | Chan | H04L 9/3247 |
| 2020/0162237 A1* | 5/2020 | Chauhan | H04L 9/3239 |
| 2021/0135932 A1* | 5/2021 | Motylinski | H04B 7/15521 |

FOREIGN PATENT DOCUMENTS

| | | |
|---|---|---|
| CN | 106411503 A | 2/2017 |
| CN | 106850536 A | 6/2017 |
| CN | 106952094 A | 7/2017 |
| CN | 106991607 A | 7/2017 |
| CN | 107292735 | 10/2017 |
| CN | 107332826 A | 11/2017 |
| CN | 108234135 | 6/2018 |
| CN | 108470276 A | 8/2018 |
| CN | 108665359 A | 10/2018 |
| CN | 108681898 A | 10/2018 |
| CN | 108717630 | 10/2018 |
| CN | 109447648 | 3/2019 |

OTHER PUBLICATIONS

Chinese Office Action dated Sep. 5, 2022 in Application No. 201911167542.7 with Concise English Translation, 9 pages.
Kc Tam: "Notarization in Blockchain (Part 1)", Aug. 28, 2018, pp. 1-4, XP055638784, URL:https://medium.com/@kctheservant/notarization-in-blockchainpart-1-a9795f19e28d.
Kc Tam: "Notarization in Blockchain (Part 2)" Aug. 28, 2018, pp. 1-4, XP055638937, URL:https://medium.com/@kctheservant/notarization-in-blockchainpart-2-1 a06d00eb72.
European Search Report dated Sep. 10, 2021 in Application No. 19893940.7 (14 pages).
Supplementary European Search Report dated Sep. 28, 2021 in Application No. 19893940.7 (1 page).
International Search Report dated Feb. 24, 2020 in International Application No. PCT/CN2019/122394. (5 pages).
Written Opinion dated Feb. 24, 2020 in International Application No. PCT/CN2019/122394. (4 pages).

* cited by examiner

METHOD FOR RECORDING DATA BLOCK IN BLOCKCHAIN NETWORK, ACCOUNTING NODE, AND MEDIUM

RELATED APPLICATION

This application is a continuation of International Application No. PCT/CN2019/122394, filed on Dec. 2, 2019, which claims priority to Chinese Patent Application No. 201811495812.2, entitled "METHOD FOR RECORDING DATA BLOCK IN BLOCKCHAIN NETWORK, ACCOUNTING NODE, AND MEDIUM" and filed on Dec. 7, 2018. The entire disclosures of the prior applications are hereby incorporated by reference in their entirety.

FIELD OF THE TECHNOLOGY

The present disclosure relates to the field of blockchains, including to a method for recording a data block in a blockchain network, an accounting node, and a medium.

BACKGROUND OF THE DISCLOSURE

In a blockchain network, accounting, consensus, and witness completely occur in a consensus network formed by super nodes. Each super node not only acts as an accounting node that records a data block onto a blockchain, but also acts as a consensus and witness node. Other users outside the blockchain network can only unconditionally trust the consensus network formed by the super nodes.

However, usually, the other users outside the blockchain network are the party that truly has relationships of interest with the data block recorded on the blockchain. For example, in an invoice blockchain network, after an invoicing party invoices, an invoicing event is accounted by using a super node corresponding to the invoicing party in the blockchain network. The super node generates a data block according to the invoicing event, and all super nodes in the data block reach a consensus, and then recorded on the blockchain. The invoicing party and an invoice receiving party are parties with relevant interest, but cannot witness the accounting process, and can only unconditionally trust the consensus network formed by super nodes. If all the super nodes misbehave, the parties with relevant interest cannot do anything. The monopoly of the accounting right results in significant decrease in the credibility and the fairness of the blockchain network.

SUMMARY

An objective of the present disclosure lies in providing a method for recording a data block in a blockchain network, an accounting node, and a medium, so that the credibility and the fairness of the blockchain network can be improved.

According to an exemplary embodiment of the present disclosure, a method for recording a data block in a blockchain network is provided. The blockchain network can include an accounting node subnetwork and a service node subnetwork. The accounting node subnetwork can include accounting nodes configured to record a data block onto a blockchain. The service node subnetwork can include service nodes configured to verify data blocks recorded by the accounting nodes onto the blockchain. Further, the method can be performed by an accounting node in the accounting node subnetwork and include generating, by using a key specific to the accounting node, a signature based on transaction information to be included in a data block to be added onto the blockchain. The method can further include adding the transaction information and the generated signature to the data block, and adding the data block onto the blockchain, and transmitting the signature to the service nodes in the service node subnetwork, so that the service nodes perform signature verification on the signature according to the key specific to the accounting node.

According to a further exemplary embodiment of the present disclosure, an accounting node for recording a data block in a blockchain network is provided. The blockchain network can include an accounting node subnetwork and a service node subnetwork. The accounting node subnetwork including accounting nodes configured to record a data block onto a blockchain. The service node subnetwork including service nodes configured to verify data blocks recorded by the accounting nodes onto the blockchain. The accounting node including a processor that can be configured to generate, by using a key specific to the accounting node, a signature based on transaction information to be included in a data block to be added onto the blockchain. Further, the processor can be configured to add the transaction information and the generated signature to the data block, and adding the data block onto the blockchain, and to transmit the signature to the service nodes in the service node subnetwork, so that the service nodes perform signature verification on the signature according to the key specific to the accounting node.

According to other embodiments of the present disclosure, an accounting node is disclosed, including a memory that is configured to store non-transitory computer-readable instructions and one or more processors that is configured to read the non-transitory computer-readable instructions stored in the memory to perform the foregoing method for recording a data block in a blockchain network.

According to an aspect of the disclosure, a non-transitory computer-readable storage medium is disclosed, that stores computer-readable instructions that, when executed by a processor of a computer, cause the computer to perform the foregoing method for recording a data block in a blockchain network.

In view of the current situation in the related art that each node not only acts as an accounting node that records a data block onto a blockchain, but also acts as a consensus and witness node, and other users outside the blockchain network can only unconditionally trust the consensus network formed by the super nodes. In the embodiments of the present disclosure, the accounting node subnetwork and the service node subnetwork are separated, and a solution of a double-layer consensus network in which accounting and witness are separated from each other is provided. The accounting node in the accounting node subnetwork is responsible for recording the data block onto the blockchain, and the service nodes in the service node subnetwork are responsible for witnessing a recording result of the accounting node. Specifically, the accounting node generates a signature based on transaction information to be included in a data block to be added onto the blockchain, and then adds the transaction information and the generated signature to the data block, and then adds the data block onto the blockchain.

The signature is transmitted to the service nodes in the service node subnetwork, so that the service nodes perform signature verification on the signature according to the key specific to the accounting node. The service nodes in the service node subnetwork may witness transaction data of the entire network by verifying the signature of the accounting node on the block. Although the accounting network has a monopolistic accounting right, the data block has a digital signature representing the identity of the accounter, all the behaviors are public and traceable. If all the accounting nodes misbehave, all nodes that witness the transaction data of the entire network keep a specific evidence of the misbehavior of the accounting nodes. Compared with the conventional centralized system and private chain, in this solution, running of the system is more transparent. Compared with the conventional decentralized public chain solution, this solution is more controllable and easier to be supervised.

Other features and advantages of the present disclosure become obvious through the following detailed descriptions. The above general descriptions and the following detailed descriptions are merely exemplary, and do not limit the present disclosure.

BRIEF DESCRIPTION OF THE DRAWINGS

The above and other features, and advantages of the present disclosure will become more apparent from the detailed description of exemplary embodiments of the present disclosure with reference to the accompanying drawings.

DESCRIPTION OF EMBODIMENTS

Figure 1A:
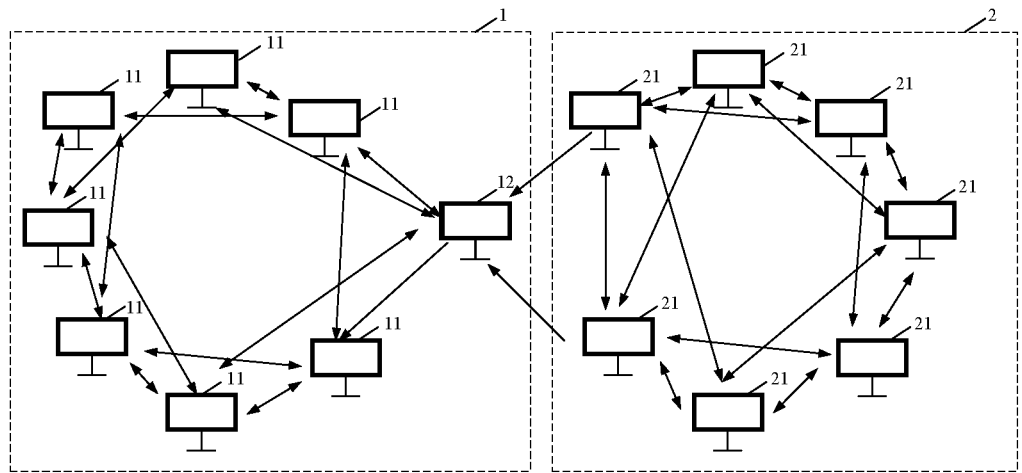
FIG. 1A to FIG. 1C show schematic diagrams of three system architectures of a method for recording a data block in a blockchain network according to an embodiment of the present disclosure.

At present, exemplary implementations are described more comprehensively with reference to the accompanying drawings. However, the exemplary implementations may be implemented in various forms, and are not understood as being limited to the examples described herein. Conversely, the exemplary implementations are provided to make the descriptions of the present disclosure more comprehensive and complete, and completely convey the idea of the exemplary implementations to a person skilled in the art. The accompanying drawings are merely exemplary illustrations of the present disclosure and are not necessarily drawn to scale. The same reference numbers in the drawings represent the same or similar parts, and therefore, repeated descriptions thereof are omitted.

In addition, the described features, structures, or characteristics may be combined in one or more exemplary implementations in any appropriate manner. In the following descriptions, a lot of specific details are provided to give a comprehensive understanding of the exemplary implementations of the present disclosure. However, a person skilled in the art is to be aware that, the technical solutions in the present disclosure may be implemented without one or more of the particular details, or another method, component, or step may be used. In other cases, known structures, methods, implementations, or operations are not shown or described in detail to avoid obscuring aspects of the present disclosure.

Some of the block diagrams shown in the accompanying drawings are functional entities and do not necessarily correspond to physically or logically independent entities.

Such functional entities may be implemented in the form of software, or implemented in one or more hardware modules or integrated circuits, or implemented in different networks and/or processor apparatuses and/or micro-controller apparatuses.

System architectures and an entire process to which the embodiments of the present disclosure are applied are first described below with reference to FIG. 1A to FIG. 1C.

FIG. 1A shows a system architecture of a blockchain network to which the embodiments of the present disclosure are applied. The blockchain network includes an accounting node subnetwork 2 and a service node subnetwork 1. The accounting node subnetwork 2 includes accounting nodes 21 configured to record a data block onto a blockchain. The service node subnetwork 1 includes service nodes 11 configured to verify data blocks recorded by the accounting nodes onto the blockchain. The service node 11 may alternatively request the accounting node for corresponding transaction data. The accounting node subnetwork 2 is connected to the service node subnetwork 1 by using a proxy node 12. The proxy node 12 may be a service node in the service node subnetwork 1, but is a special service node. The proxy node 12 is responsible for transmitting information to be transmitted by the accounting node 21 to the service node 11 to the service node 11. The service node 11 may be a terminal of a transaction party that generates various transaction information that needs to be added onto the blockchain. The service node 11 generates the transaction information, but has no right to directly record the transaction information onto the blockchain, and needs to record the transaction information onto the blockchain by using an accounting node 21.

A small quantity of accounting nodes 21 perform accounting in a unified manner, which helps unified processing and supervision of services. The service node 11 can supervise and witness, by using the information transmitted by the accounting node 21 through the proxy node 12, addition of the transaction information onto the blockchain. This is of great significance in some scenarios in which unified supervision is required, all nodes that are supervised cheat, and therefore public supervision is required. In the accounting node subnetwork 2, after each accounting node 21 generates a data block, the data block is broadcast to other accounting nodes 21 for consensus, and then the data block is added onto the blockchain.

In FIG. 1A, the service node subnetwork 1 uses a P2P network mode. The P2P network is a distributed application architecture that distributes tasks and workloads among peers and is a networking or network form formed by a peer-to-peer computing model on an application layer, namely, a "point-to-point" or "end-to-end" network. The P2P network may be defined as: network participants share some of their own hardware resources (processing capabilities, storage capabilities, network connection capabilities, printers, and the like). The shared resources provide services and content through the network, and can be directly accessed by other peer nodes without going through intermediate entities. Participants in this network are not only providers of resources, services, and content, but also obtainers of resources, services, and content. Therefore, in the service node subnetwork 1, after receiving a message transmitted from the accounting node 21, the proxy node 12 propagates the message to the service nodes 11 nearby. The service nodes 11 nearby receive the message, and then transmit the message to the service node 11 nearby. Through layer-to-layer propagation, the propagation of the message between the service nodes 11 of the service node subnetwork 1 is implemented.

Figure 1B:
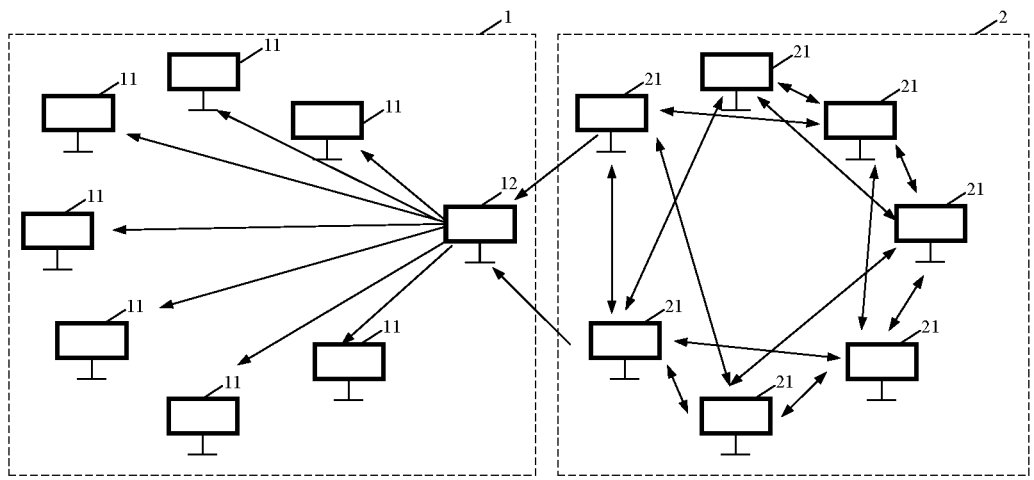

FIG. 1B shows a system architecture of another blockchain network to which the embodiments of the present disclosure are applied. The difference between the system architecture and the system architecture of FIG. 1A is that the P2P network mode is not used in the service node subnetwork 1, but the broadcast network mode is used. After receiving a message transmitted from the accounting node 21, the proxy node 12 broadcasts the message to the remaining service nodes 11 in the service node subnetwork 1. In this way, the propagation of the message between the service nodes 11 of the service node subnetwork 1 is also implemented.

Figure 1C:
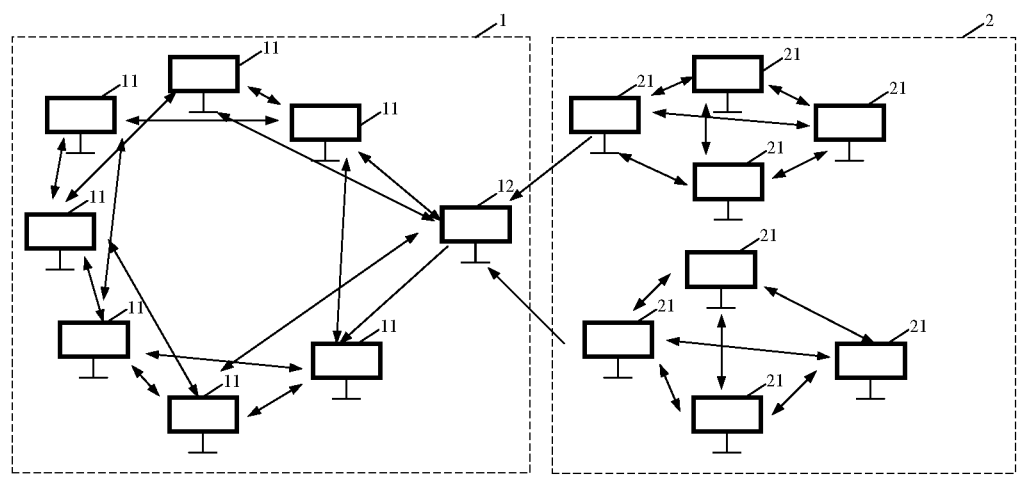

FIG. 1C shows a system architecture of another blockchain network to which an embodiment of the present disclosure is applied. A difference between the system architecture and the system architecture of FIG. 1A lies in that an accounting node subnetwork 2 is divided into a plurality of branch accounting node subnetworks. Each branch accounting node subnetwork may be responsible for the recording of one type of transaction information. For example, an enterprise may have a supply chain financial service, and may need to record contract information, payment for goods on credit and other information generated in the supply and marketing process onto the blockchain. At the same time, the enterprise also needs to invoice, as well as record the invoicing information, invoice reimbursement information, and the like onto the blockchain. In this case, to meet the requirement that the accounting nodes are supervised by the same department, it is possible that the accounting nodes that record supply chain financial service transactions and the accounting nodes that record transactions in the invoice flow process need to belong to different departments. For example, the accounting node that records the supply chain financial service transactions is an accounting terminal set by the bank, and the accounting node that records the transactions in the invoice flow process is an accounting terminal set by the Internal Revenue Service. Therefore, the supply chain financial service transactions and the transactions in the invoice flow process may also be finally recorded onto different sub-blockchains. In this case, the proxy node 12 needs to transmit the transaction information to the branch accounting node subnetwork corresponding to the transaction type according to the transaction type carried in the transaction information transmitted from the service node 11.

Figure 2A:
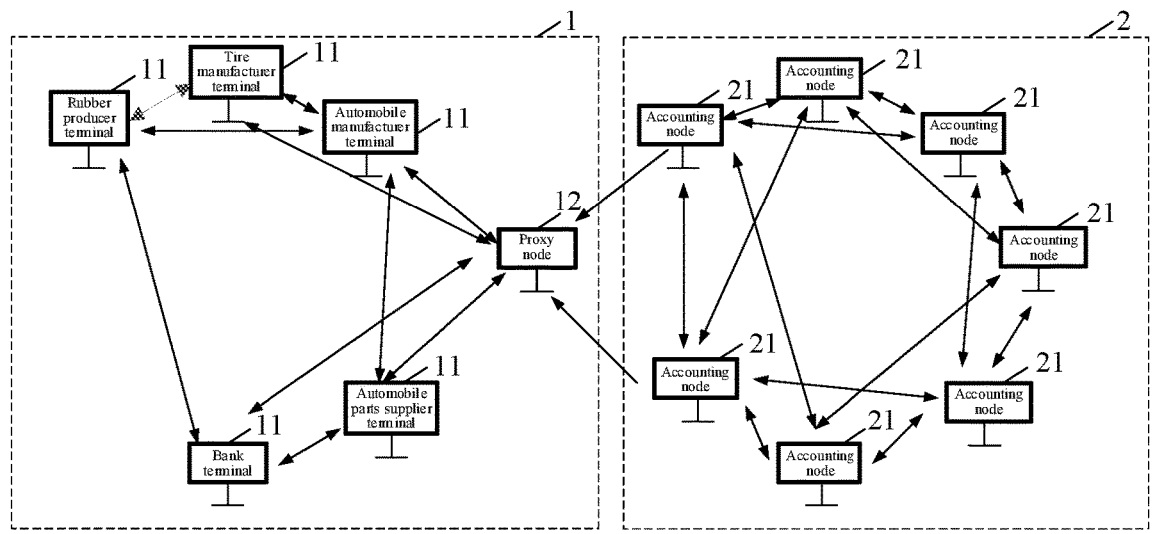
FIG. 2A to FIG. 2C show schematic architectural diagrams of scenarios in which a method for recording a data block in a blockchain network according to an embodiment of the present disclosure is separately applied to three different application scenarios: supply chain finance, electronic invoices, and legal digital currency.

FIG. 2A shows a schematic architectural diagram of a scenario in which a method for recording a data block in a blockchain network according to an embodiment of the present disclosure is applied to an application scenario of supply chain finance.

The supply chain finance is such as type of service: a manufacturing enterprise produces a device or product, and it is often not necessary that all parts or components of the device or product are produced by the enterprise. Some of the parts or components need to be outsourced to other production enterprises for production. Although the manufacturing enterprise has concluded a supply and marketing contract with the ordering party in advance, the manufacturing enterprise can only get the payment for goods when the entire device or product is produced. In this process, the purchase of parts or components from the production enterprises needs to be paid by the manufacturing enterprise first, making it difficult for the manufacturing enterprise to make a capital turnover. Therefore, there is a demand that the manufacturing enterprise can request a bank guarantee by using the total purchase contract (including the price and the information about the ordering party) concluded for the entire device or product, and when the manufacturing enterprise needs to purchase parts or components, by using the total purchase contract of the entire device or product guaranteed by the bank as a basis, a part of the payment for goods is transferred from the total purchase contract price of the device or product as the guarantee for the purchase of the parts or components. In this way, the production enterprises can rest assured to produce the parts or components, and because of the bank guarantee, there is no need to worry about not receiving the part of the transferred payment for goods. At the same time, the manufacturing enterprise does not really pay the payment for goods at this time, but can wait until the actual payment for goods of the purchaser of the entire device or product is received before paying this part of the payment for goods to the production enterprise of the parts or components.

It is difficult to implement the service in the conventional blockchain network, because the bank sets all the accounting nodes, and this network is closed. After the manufacturing enterprise has concluded a total purchase contract with the ordering party of the entire device or product, or signed a sub-purchase contract with the producer of the parts or components, these contracts need to be transmitted to the accounting node set by the bank to be added onto the blockchain. The accounting nodes set by the bank can supervise and witness each other, but each enterprise node in the supply and marketing chain cannot supervise and witness. Therefore, the trust of each enterprise node on the supply chain cannot be obtained. However, in this embodiment of the present disclosure, because the accounting node subnetwork 2 is separated from the service node subnetwork 1, the accounting node subnetwork 2 is dedicated to accounting, and the service node subnetwork 1 includes each enterprise node terminal on the supply and marketing chain for witnessing the accounting of the accounting nodes 21. Once all the accounting nodes 21 cheat, the service nodes 11 that witness the accounting keep a specific evidence of the misbehavior of the accounting nodes.

In an example of automobile supply chain finance, as shown in FIG. 2A, the service nodes 11 include an automobile manufacturer terminal, a tire manufacturer terminal, a rubber producer terminal, an automobile parts supplier terminal, a bank terminal, and the like. After the automobile manufacturer has concluded a total purchase contract with an automobile ordering party, a part of the total purchase contract price is allocated for the purchase of tires, and a first sub-purchase contract is concluded with the tire manufacturer, and the other part is allocated for the purchase of automobile parts, and a second sub-purchase contract is concluded with automobile parts supplier. The tire manufacturer then allocates, based on the first sub-purchase contract concluded with the automobile manufacturer, a part of the first sub-purchase contract price for the purchase of the rubber required for the manufacture of tires, and concludes a third sub-purchase contract with the rubber producer. In this way, a layered purchasing relationship is established.

When the automobile manufacturer concludes the total purchase contract with the automobile ordering party, or concludes the first sub-purchase contract and the second sub-purchase contract respectively with the tire manufacturer and the automobile parts supplier, or the tire manufacturer concludes the third sub-purchase contract with the rubber producer, corresponding transaction information is transmitted to the proxy node 12, and the proxy node 12 selects an accounting node 21. The proxy node 12 transmits the corresponding transaction information to the selected accounting node 21 for caching. The accounting node 21 generally does not package a piece of transaction information separately into a data block to be added onto the blockchain, but packages transaction information into a data block according to a block packaging requirement (for example, reaching a preset piece quantity or size). A key for signing is allocated to each accounting node in advance, and the key is specific to the accounting node. The accounting node 21 generates, by using the key specific to the accounting node, a signature based on the transaction information to be included in a data block to be added onto the blockchain. The method for generating the signature may include: first generating a digest for the transaction information in the data block, and then generating the signature for the digest by using a signature algorithm by using the key specific to the accounting node. The accounting node 21 adds the transaction information and the generated signature to the data block, then adds the data block onto the blockchain after all the accounting nodes 21 reach a consensus, and at the same time transmits the signature to each service node 11 in the service node subnetwork through the proxy node 12.

The information transmitted to each service node 11 at the same time as the signature may also include the transaction information in the data block, or the digest of the transaction information. In a case of transmitting the transaction information while transmitting the signature, the service node 11 obtains the key specific to the accounting node 21. In a case of an asymmetric public-private key pair, the key used by the accounting node 21 in the accounting process is a private key allocated to the accounting node 21 by the certification authority (CA). While allocating the private key, the CA also allocates a public key for the accounting node 21. The public key is stored in the CA. The service node 11 can request the CA for the public key allocated for the accounting node 21. The public key is the key that is specific to the accounting node and that is obtained by the service node 11. The service node 11 decrypts the signature by using the key, to obtain the digest of the transaction information in the data block. The service node 11 calculates a digest for the transaction information in the data block received at the same time. If the calculated digest is consistent with the digest obtained through decryption, the signature verification is successful.

In a case of transmitting the digest of the transaction information while transmitting the signature (for example, transmitting the digest and the signature that are placed in a block header), the service node 11 obtains the key specific to the accounting node, for example, requests the CA for the public key allocated to the accounting node 21. The service node 11 decrypts the signature by using the key specific to the accounting node, to obtain a digest of the transaction information in the data block. If the digest received at the same time as the signature is consistent with the digest obtained through decryption, the signature verification is successful.

In a case of transmitting the digest (for example, transmitting the digest and the signature that are placed in a block header, where the digest may be a Merkle root calculated according to a hash value of each piece of transaction information to be included in the data block) of the transaction information while transmitting the signature, the service node 11 cannot receive each piece of transaction information. When needing to view the transaction information, the service node 11 needs to request the accounting node 21. Each service node 11 signs a smart contract with a blockchain manager, and the smart contract includes permission data of the service node. According to the permission data of the service node 11, the accounting node 21 returns transaction information that the service node has permission to obtain and that is in the data block to the service node 11.

For the transaction information that the service node 11 does not have permission to obtain and that is in the data block, only a hash value of the transaction information is returned to the service node 11. In this way, the objective that some units do not want their transaction information to be seen by irrelevant parties is achieved, and information security is improved. Because the Merkle root can be calculated only based on the hash value of each piece of transaction information, the objective of hiding the transaction information without affecting content verification in the data block is achieved. The service node 11 can calculate hash values for the obtained non-hidden transaction information, calculate the Merkle root based on these hash values and the hash value of the received hidden transaction information, and compare the calculated Merkle root with a Merkle root included in the block header. If they are not consistent, it indicates that content in the data block is not tampered with, and the content verification succeeds. The service node 11 can also verify whether the received non-hidden transaction information is consistent with the transaction information transmitted to the accounting node 21 by the service node 11. If they are inconsistent, it indicates that the accounting node 21 misbehaves, so that the objective of supervision is achieved.

The general process of accounting and witness in the application scenario of supply chain finance is described below with reference to FIG. 3A to FIG. 3G. FIG. 3A to FIG. 3G are diagrams of a service node display interface in which a method for recording a data block in a blockchain network according to an embodiment of the present disclosure is applied to an application scenario of supply chain finance.

Figure 3A:
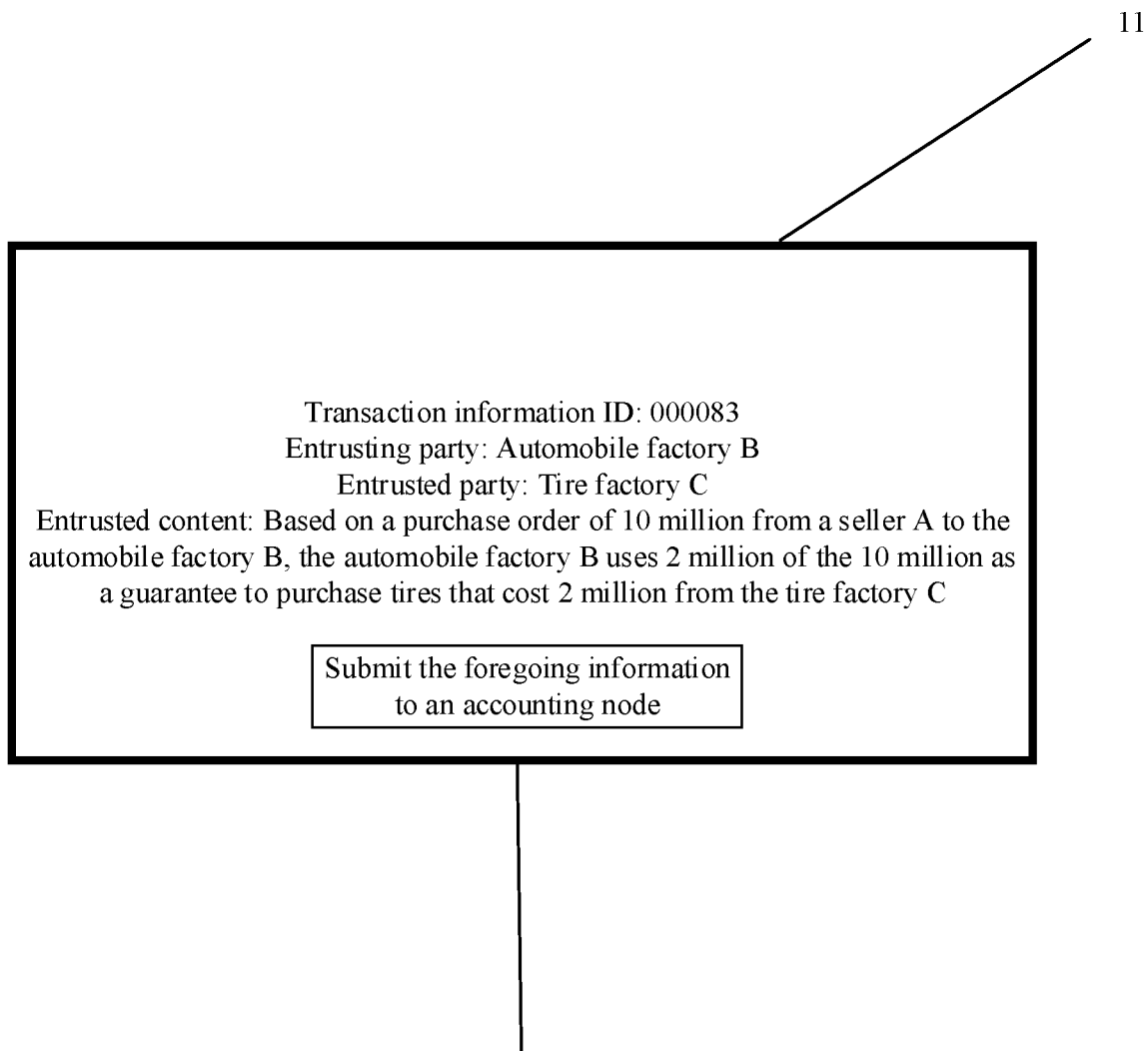
FIG. 3A to FIG. 3G show schematic diagrams of a service node display interface in which a method for recording a data block in a blockchain network according to an embodiment of the present disclosure is applied to an application scenario of supply chain finance.

As shown in FIG. 3A, based on a purchase order of 10 million from a seller A to an automobile factory B, the automobile factory B uses 2 million of the 10 million as a guarantee, and entrusts a tire factory C to produce tires sold at a price of 2 million. After a service staff member of the automobile factory B enters the foregoing transaction information in a service node 11 of the automobile factory B, the service staff member clicks the "submit to accounting node" option, and the transaction information is transmitted to an accounting node 21 through a proxy node 12. The accounting node 21 places transaction information to be included in a data block to be added onto the blockchain into a block body. The accounting node 21 further generates a digest of the transaction information, such as the Merkle root of FIG. 3B. The accounting node 21 further generates, by using the key specific to the accounting node, a signature based on the transaction information in the data block. The Merkle root, the signature, and the digest of a previous data block on the blockchain are placed together in the block header. The block header and the block body form the data block to be added onto the blockchain, and the data block is added onto the blockchain after all the accounting nodes 21 reach a consensus.

Figure 3B:
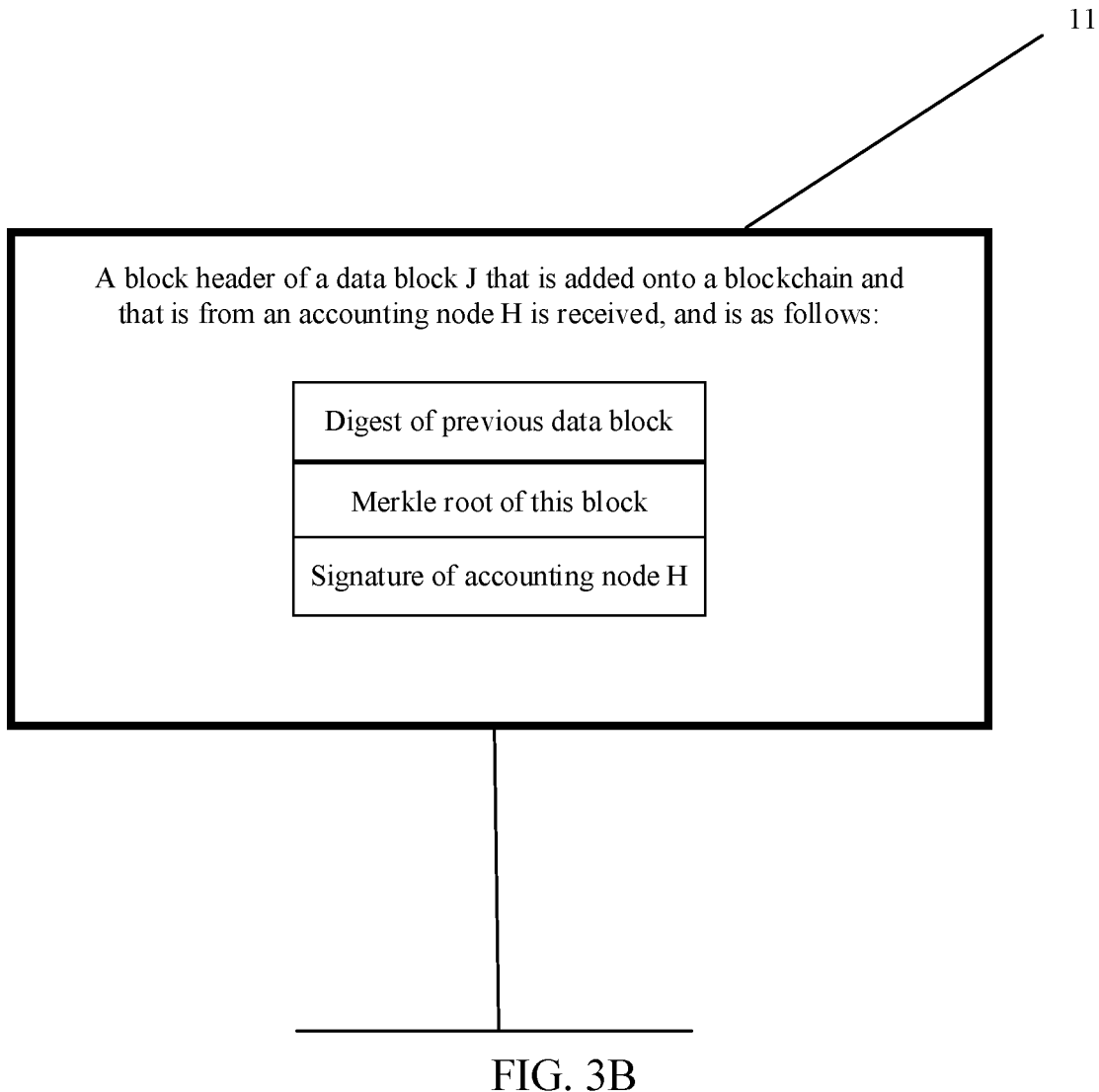
Figure 3C:
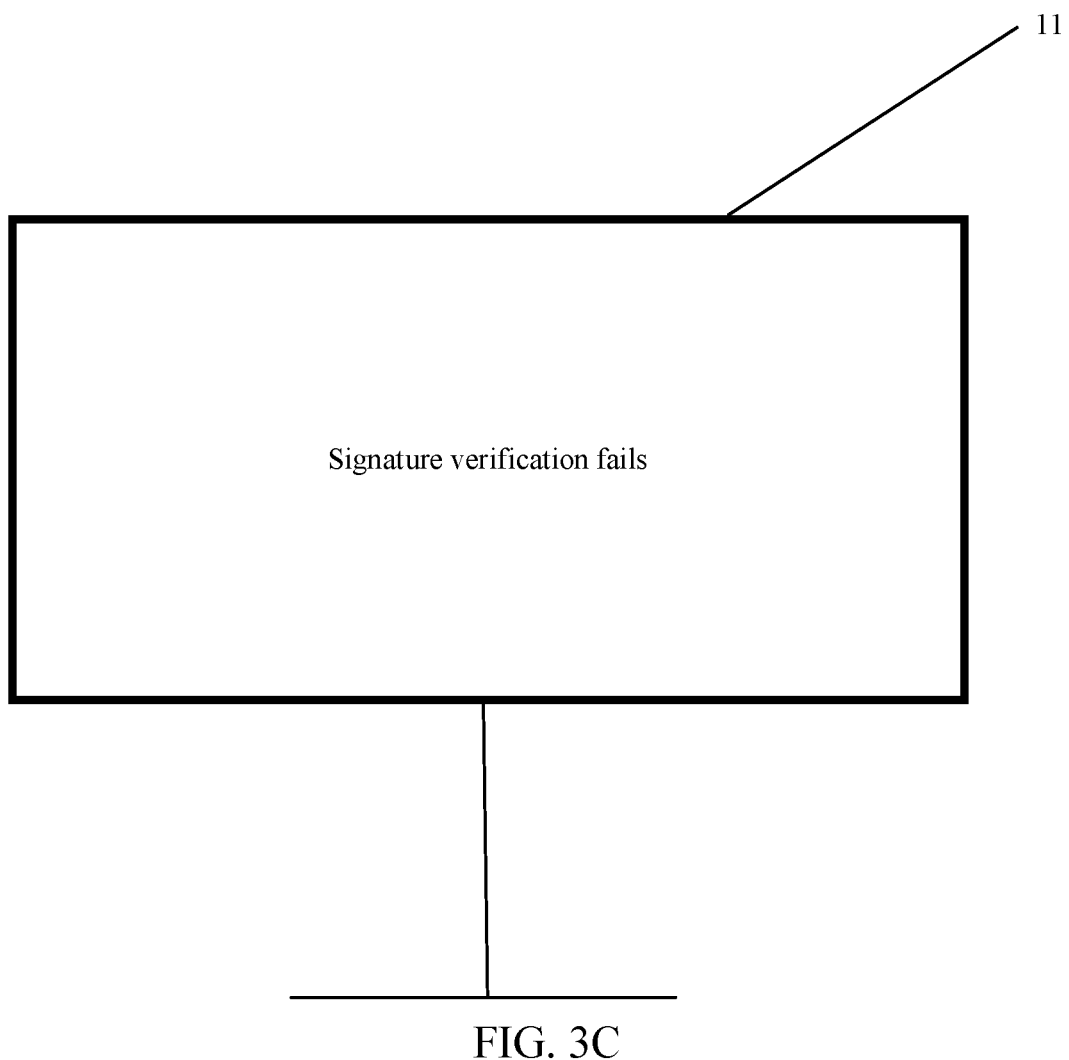
Figure 3D:
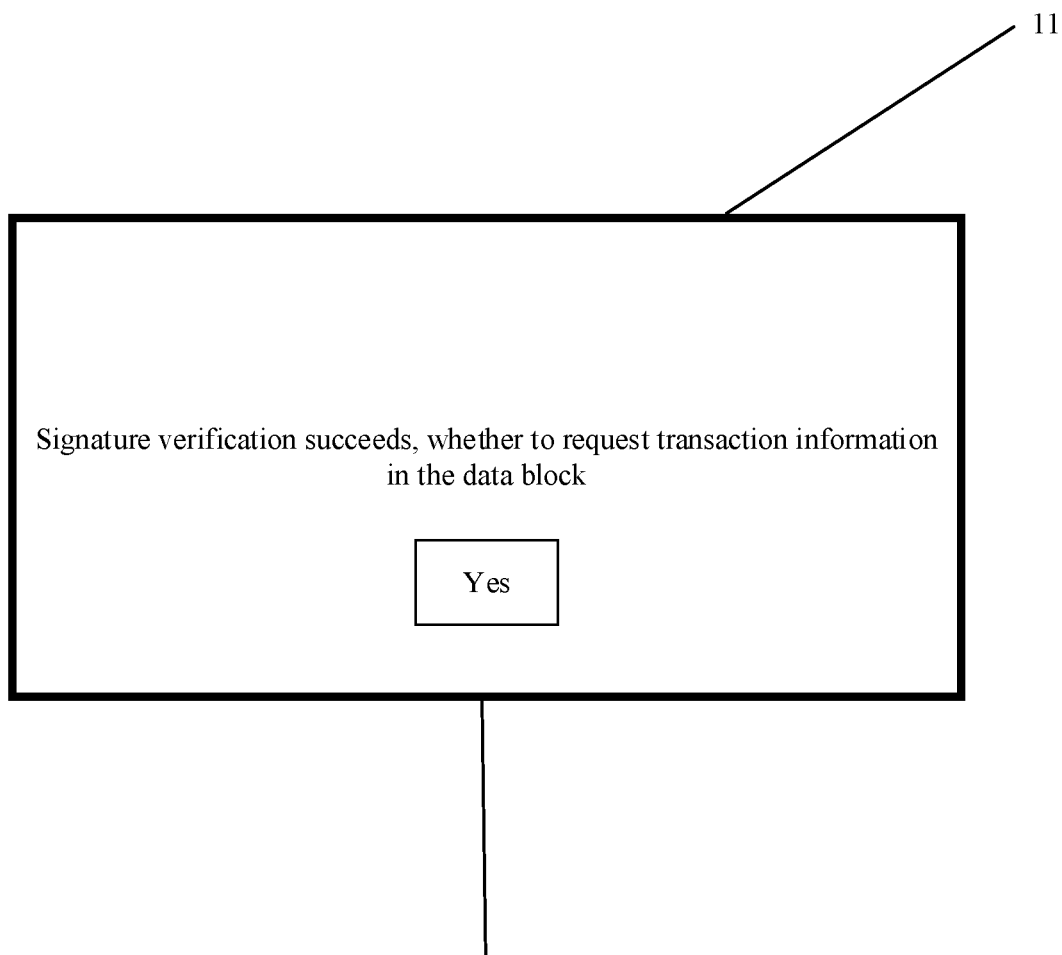

The accounting node 21 further transmits the block header to each service node 11. As shown in FIG. 3B, the Merkle root, the signature, and the digest of a previous data block on the blockchain are displayed on a screen of the service node 11. In this case, the service node 11 obtains the key (for example, by requesting the CA) specific to the accounting node, and decrypts the signature by using the key specific to the accounting node, to obtain the digest of the transaction information in the data block, that is, the Merkle root. If the Merkle root in the received block header is inconsistent with the Merkle root obtained through decryption, the signature verification fails and an interface shown in FIG. 3C is displayed. If the Merkle root in the received block header is consistent with the Merkle root obtained through decryption, the signature verification succeeds and an interface shown in FIG. 3D is displayed. In the foregoing process, the service node 11 obtains only the block header of the data block, and has not obtained the transaction information in the data block. Therefore, in this case, the user is queried in the interface of FIG. 3D whether to request the transaction information in the data block.

If the user selects "Yes", the service node 11 requests the accounting node 21 for the transaction information through the proxy node 12. The accounting node 21 obtains the permission data in the smart contract. According to the permission data of the service node 11, the accounting node 21 returns the transaction information that the service node 11 has permission to obtain and that is in the data block to the service node 11, for example, specific information of transaction information ID 000083 and specific information of transaction information ID 000153 in FIG. 3E; and returns only hash values of pieces of transaction information that the service node 11 does not have permission to obtain and that is in the data block, such as transaction information of transaction information ID 000258, transaction information of transaction information ID 000256, transaction information of transaction information ID 078365, and transaction information of transaction information ID 018387 shown in FIG. 3E to the service node 11.

Figure 3E:
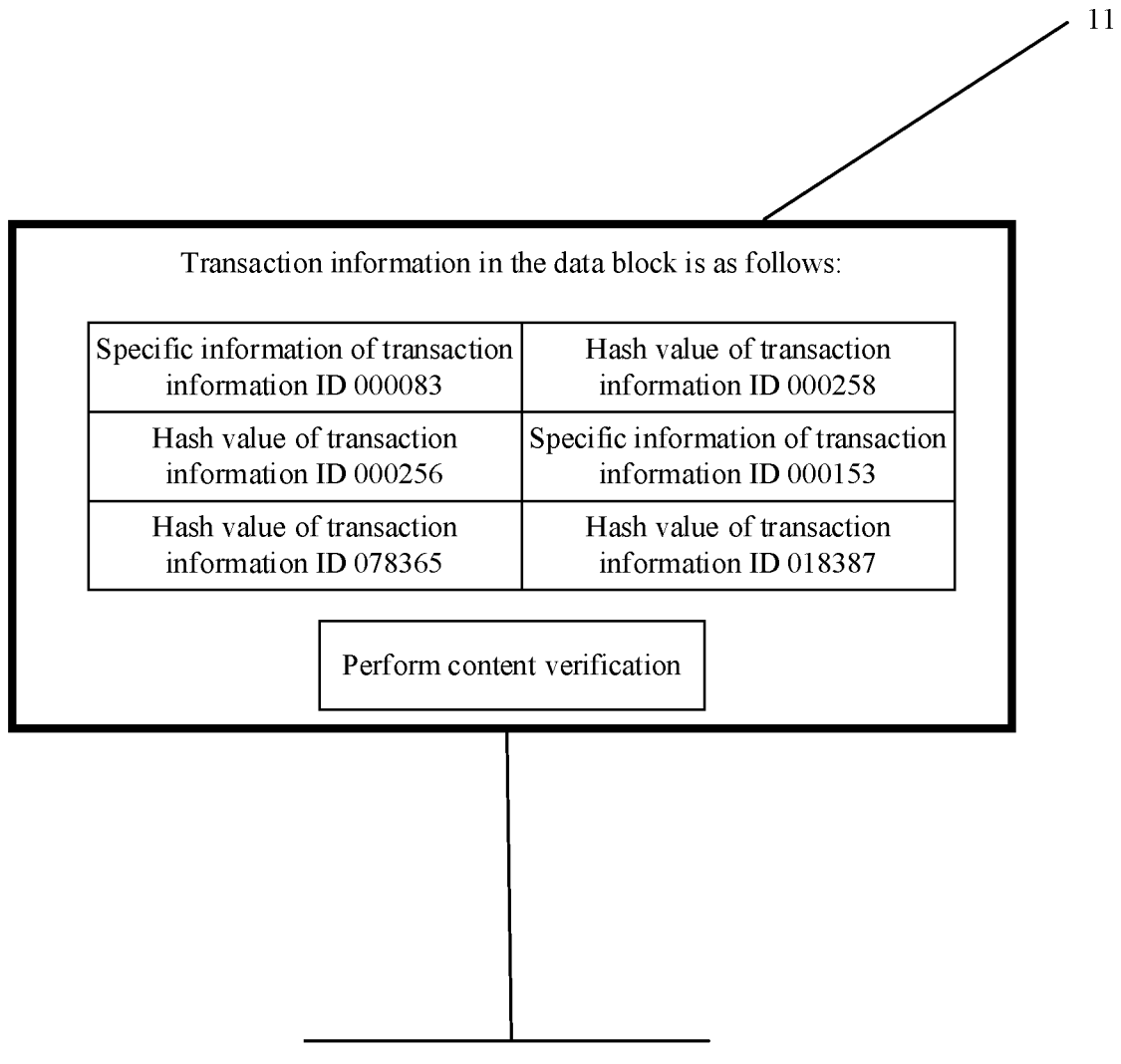
Figure 3F:
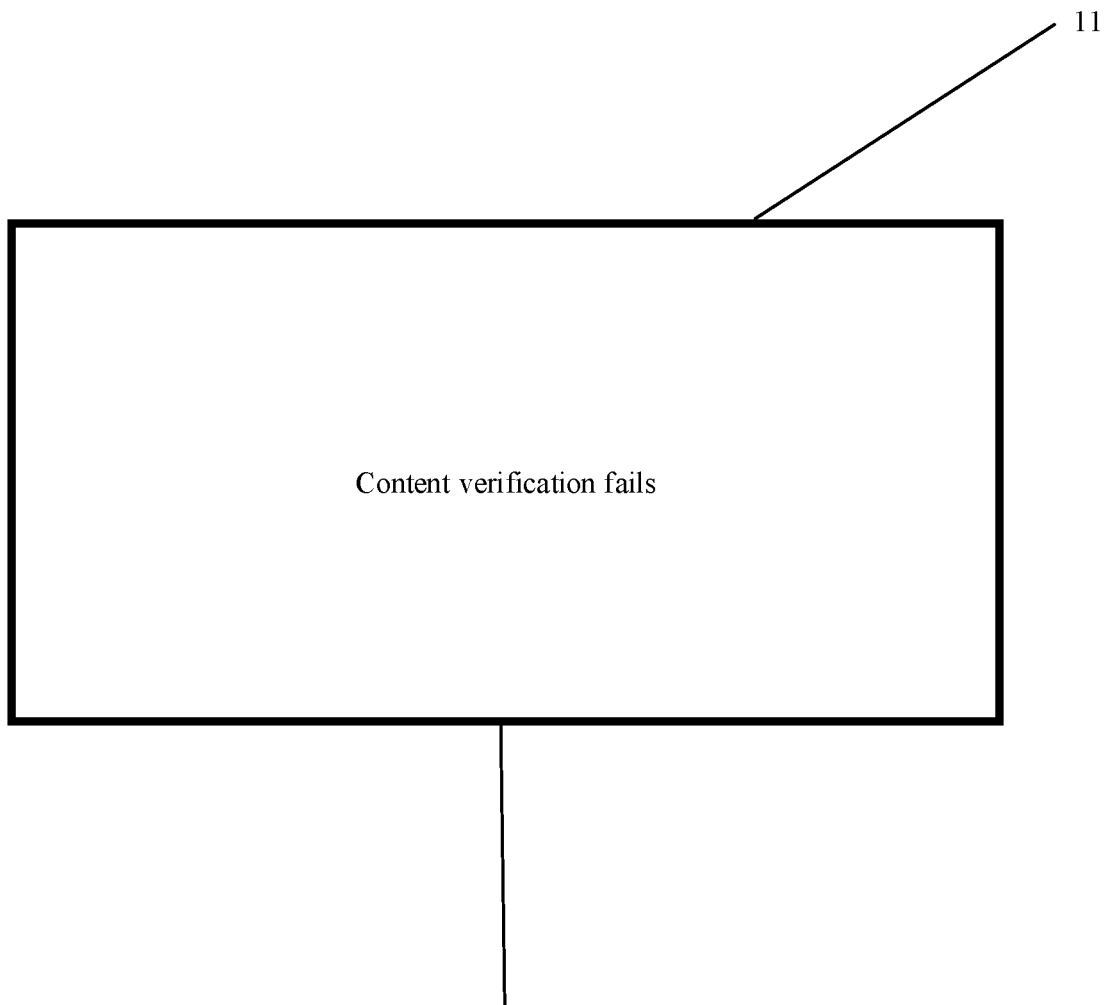
Figure 3G:
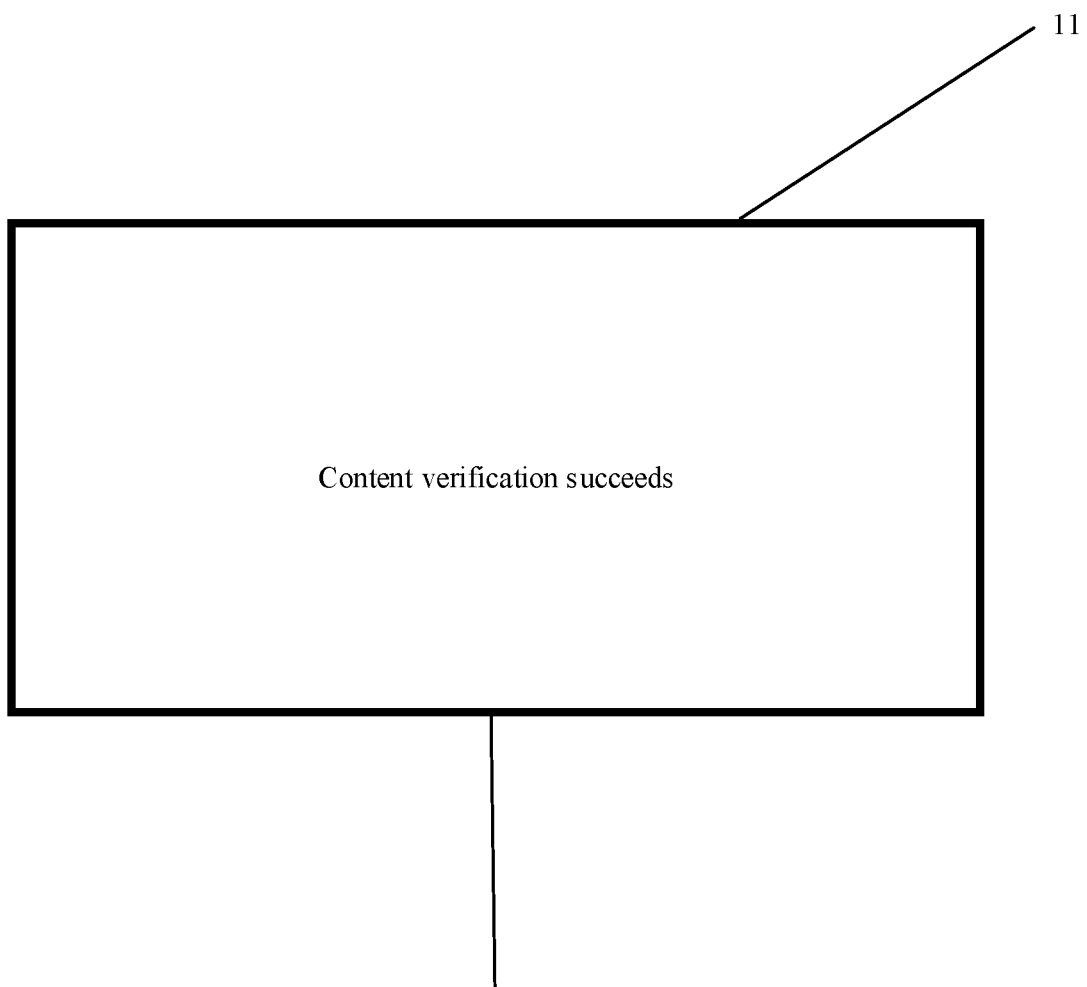

When the user selects "Perform content verification" on the interface of FIG. 3E, for the specific information of transaction information ID 000083 and specific information of transaction information ID 000153 in FIG. 3E, the service node 11 calculates hash values thereof, and then together with the received hash value of the transaction information of transaction information ID 000258, the hash value of the transaction information of transaction information ID 000256, the hash value of the transaction information of transaction information ID 078365, and the hash value of the transaction information of transaction information ID 018387, calculates the Merkle root, and compares the calculated Merkle root with a Merkle root included in the block header, to perform content verification. If the accounting node 21 has tampered with the content of the data block, the calculated Merkle root is inconsistent with a Merkle root included in the block header, and a "Content verification fails" interface shown in FIG. 3F is displayed. If the calculated Merkle root is consistent with the Merkle root included in the block header, a "Content verification succeeds" interface shown in FIG. 3G is displayed.

Figure 2B:
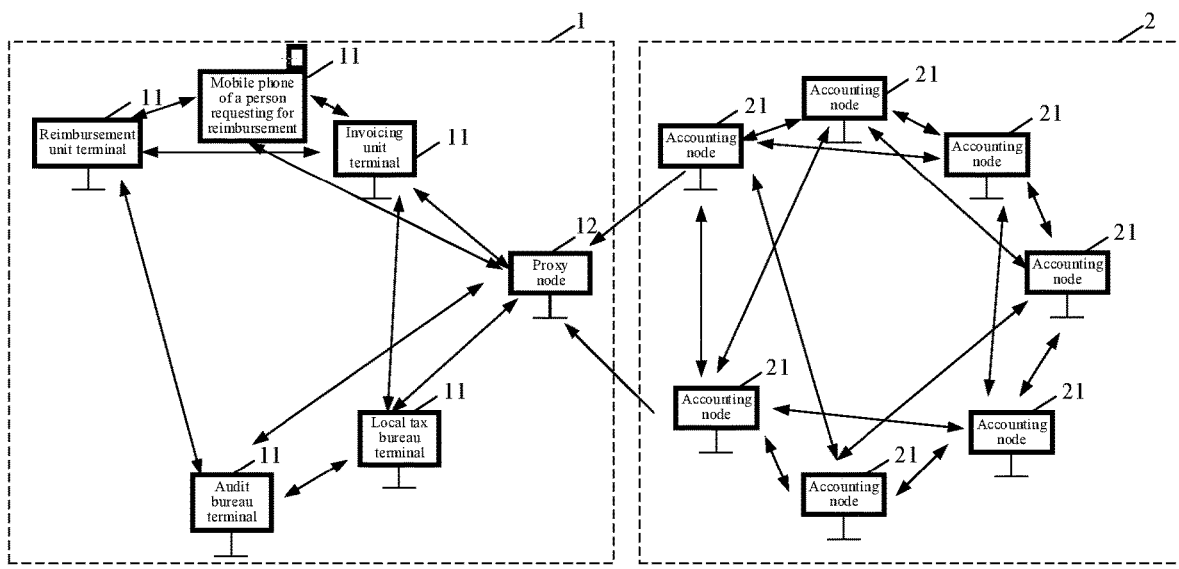

FIG. 2B shows an architectural diagram of a scenario in which a method for recording a data block in a blockchain network according to an embodiment of the present disclosure is applied to an application scenario of electronic invoices. In the blockchain application scenario of the conventional electronic invoice, the local tax bureau issues invoices to an invoicing enterprise, and the invoicing enterprise invoices to a holder, and the holder reimburses the invoices to a reimbursement unit of the holder. All the transactions need to be added onto the blockchain, that is, recorded onto the blockchain. However, the nodes such as the local tax bureau, the invoicing enterprise, and the reimbursement unit are not the accounting nodes 21. They need to entrust the corresponding accounting nodes or super nodes to record the transactions onto the blockchain. All the accounting nodes or super nodes are uniformly set by the department of national tax. They may supervise and witness each other. However, the nodes such as the local tax bureau, the invoicing enterprise, and the reimbursement unit are direct relevant parties of the invoice, but cannot supervise and witness, and can only completely trust the accounting nodes 21. However, in this embodiment of the present disclosure, because the accounting node subnetwork 2 is separated from the service node subnetwork 1, the accounting node subnetwork 2 is dedicated to accounting, and the service node subnetwork 1 includes nodes of relevant interest to the invoice, for witnessing the accounting of the accounting nodes 21. Once all the accounting nodes 21 cheat, the service nodes 11 that witness the accounting keep a specific evidence of the misbehavior of the accounting nodes.

In an example of an electronic invoice, as shown in FIG. 2B, the service nodes 11 include an invoicing unit terminal, a mobile phone of a person requesting for reimbursement, a reimbursement unit terminal, a local tax bureau terminal, and the like. When the local tax bureau issues invoices for the invoicing unit, or the invoicing unit invoices, or the person requesting for reimbursement reimburses the invoices in the reimbursement unit, corresponding transaction information (transfer of the ownership of the invoices) is transferred to the proxy node 12, and the proxy node 12 selects an accounting node 21. The proxy node 12 transmits the corresponding transaction information to the selected accounting node 21 for caching. Then, the accounting node 21 packages the transaction information into a data block according to a block packaging requirement. The accounting node 21 generates a signature based on the transaction information in the data block, adds the signature into a block header of the data block to be added onto the blockchain, and then transmits the signature to each service node 11. The processes are similar to the process shown in FIG. 2A.

The information transmitted to each service node 11 at the same time as the signature may also include the transaction information in the data block, or the digest of the transaction information. In a case of transmitting the transaction information while transmitting the signature and in a case of transmitting the digest while transmitting the signature, the signature verification manners at the service nodes 11 are different, but the signature verification can be performed at the service nodes 11. This is similar to the foregoing process shown in FIG. 2A. Therefore, reference may be made to the related descriptions shown in FIG. 2A. In addition, in a case of transmitting the digest of the transaction information while transmitting the signature, the service node 11 may perform content verification of the data block, and the verification process is also similar to the foregoing process shown in FIG. 2A, and therefore details are not described again.

FIG. 4A to FIG. 4G show diagrams of a service node display interface in which a method for recording a data block in a blockchain network according to an embodiment of the present disclosure is applied to an application scenario of electronic invoices. The diagrams of the interface indicate the general process of accounting and witness in the application scenario of electronic invoices.

Figure 4A:
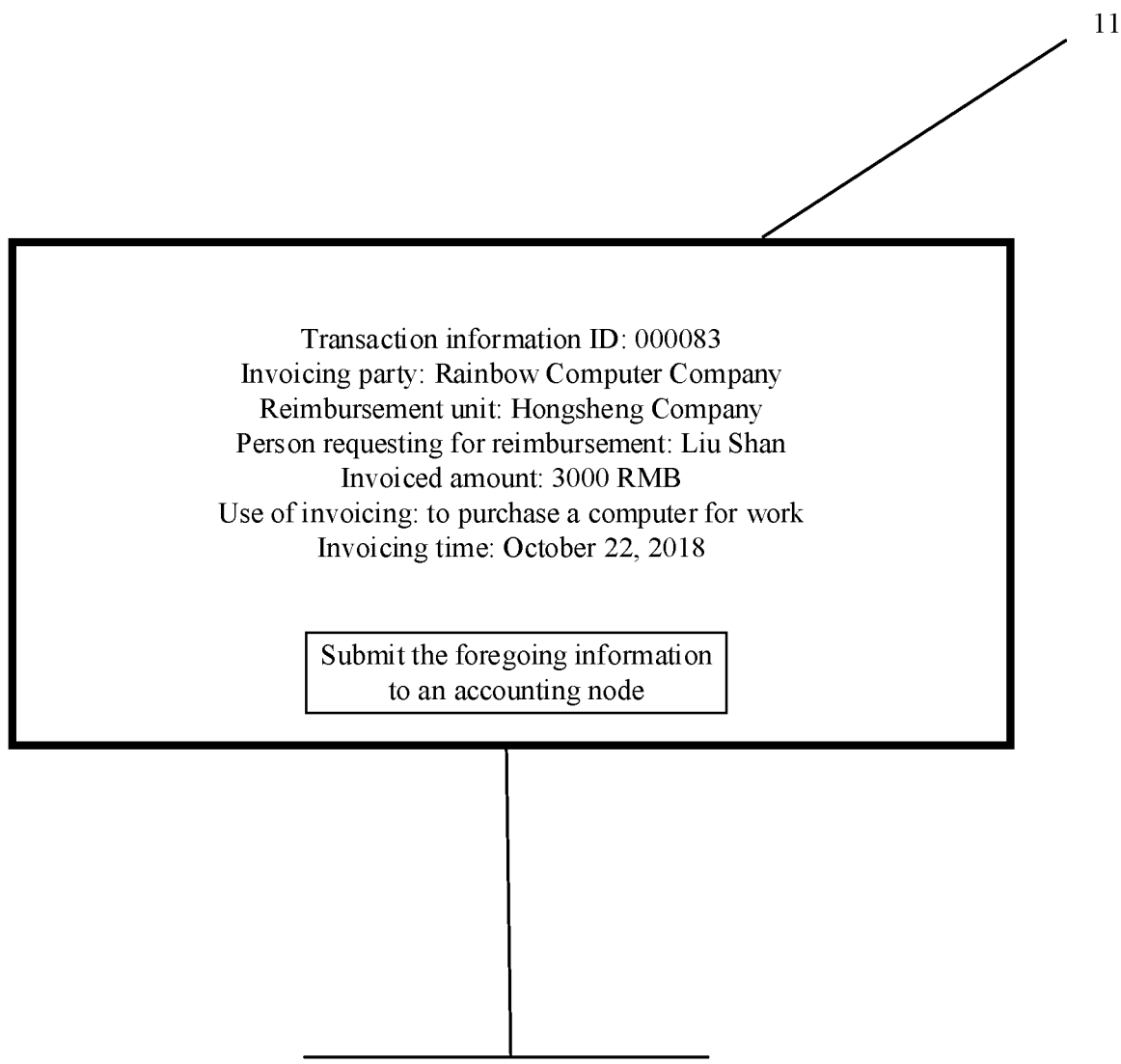
FIG. 4A to FIG. 4G show schematic diagrams of a service node display interface in which a method for recording a data block in a blockchain network according to an embodiment of the present disclosure is applied to an application scenario of electronic invoices.
Figure 4B:
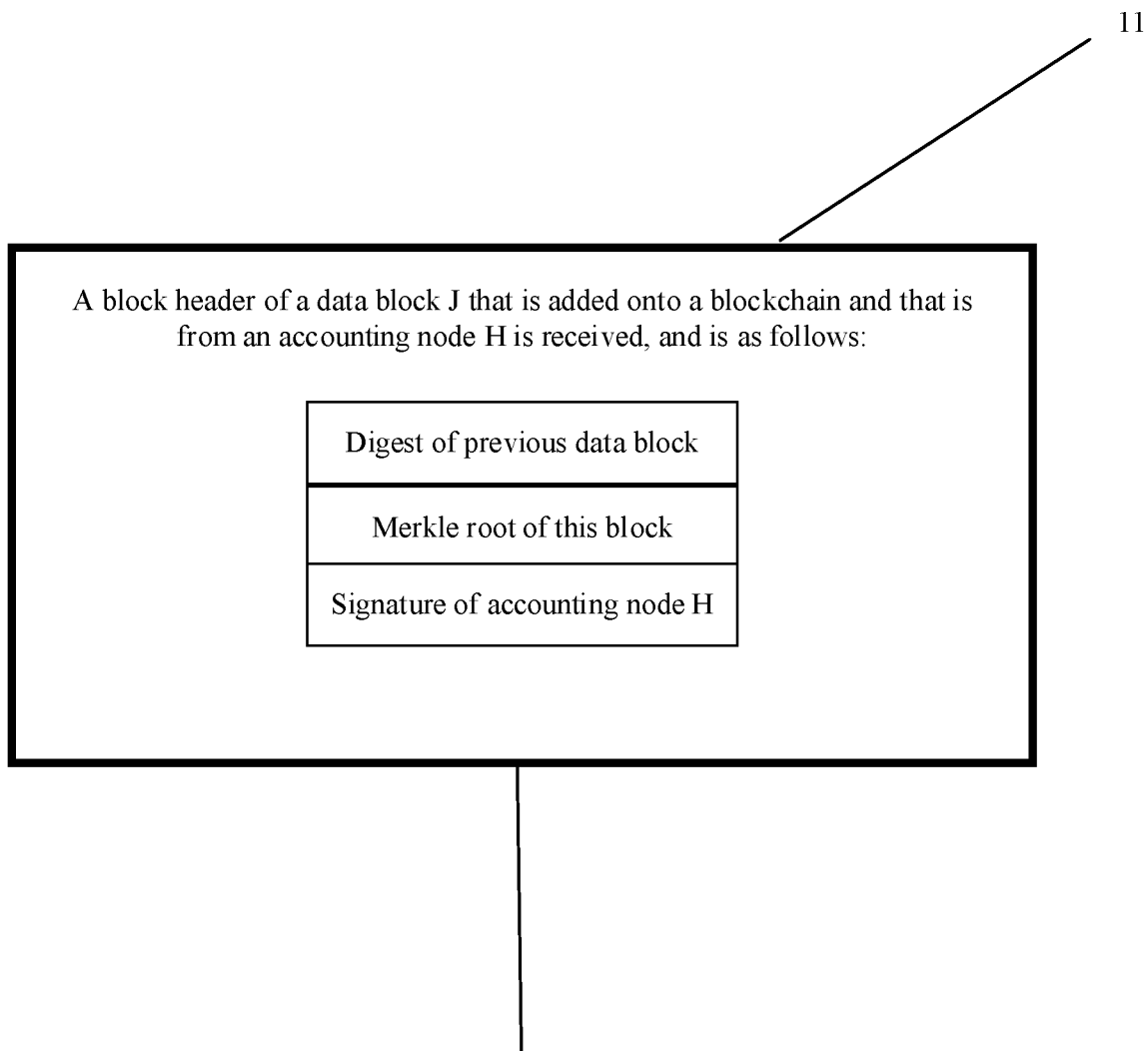

As shown in FIG. 4A, on Oct. 22, 2018, Liu Shan purchased a computer for his unit Hongsheng Company from the Rainbow Computer Company, and spent 3000 yuan. The Rainbow Computer Company invoices for Liu Shan, and the transaction ID of the invoice is 000083. After a staff member of the Rainbow Computer Company enters the foregoing information, the staff member clicks the "submit to accounting node" option, and transaction information is transmitted to the accounting node 21 through the proxy node 12. The accounting node 21 places the transaction information to be included in a data block to be added onto the blockchain into a block body. The accounting node 21 further generates a Merkle root and a signature, and places the Merkle root, the signature, and the digest of a previous data block on the blockchain together in the block header. The accounting node 21 adds the data block onto the blockchain, and transmits the block header to each service node 11. As shown in FIG. 4B, the Merkle root, the signature, and the digest of a previous data block on the blockchain are displayed on a screen of the service node 11.

Figure 4C:
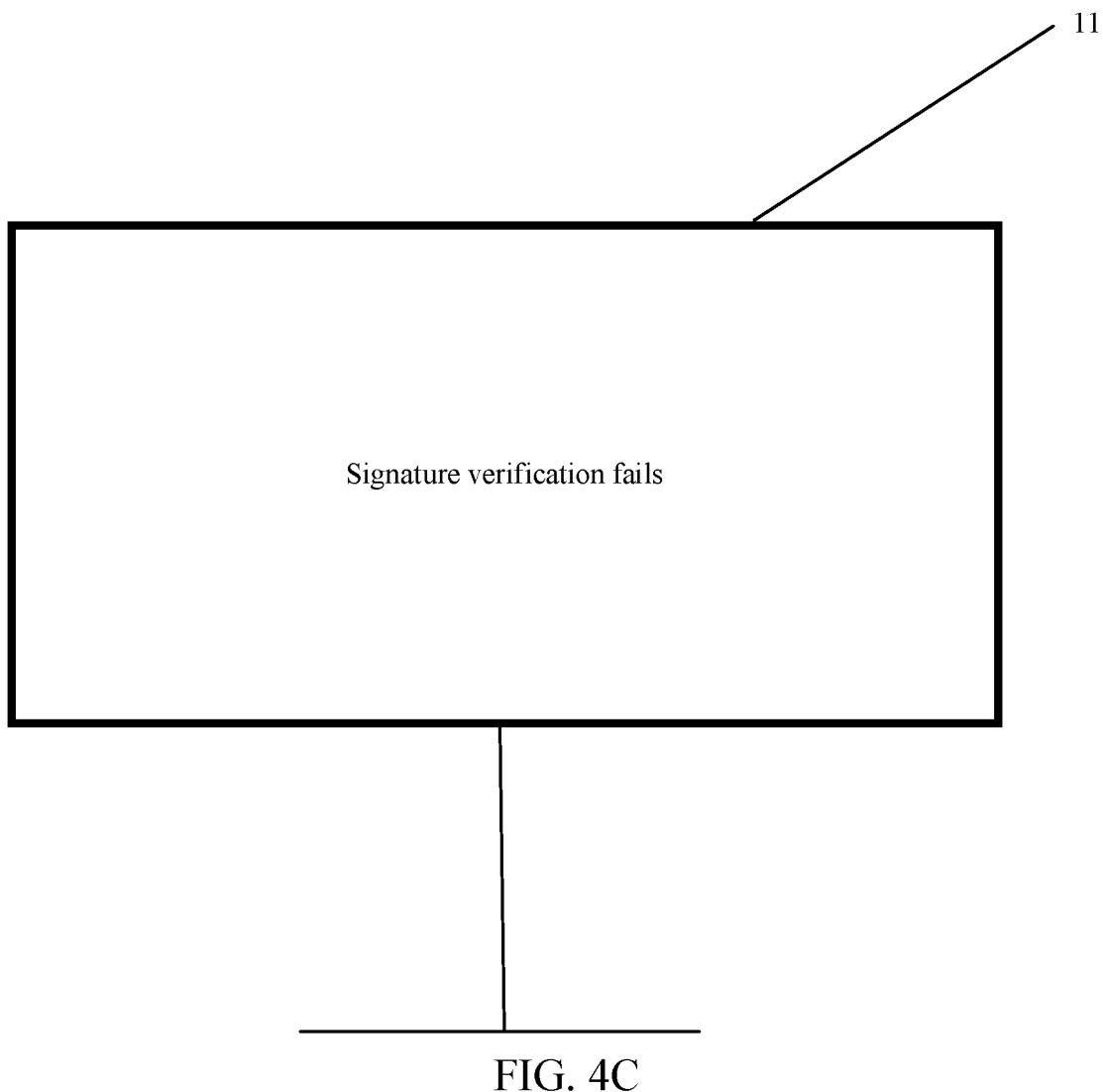
Figure 4D:
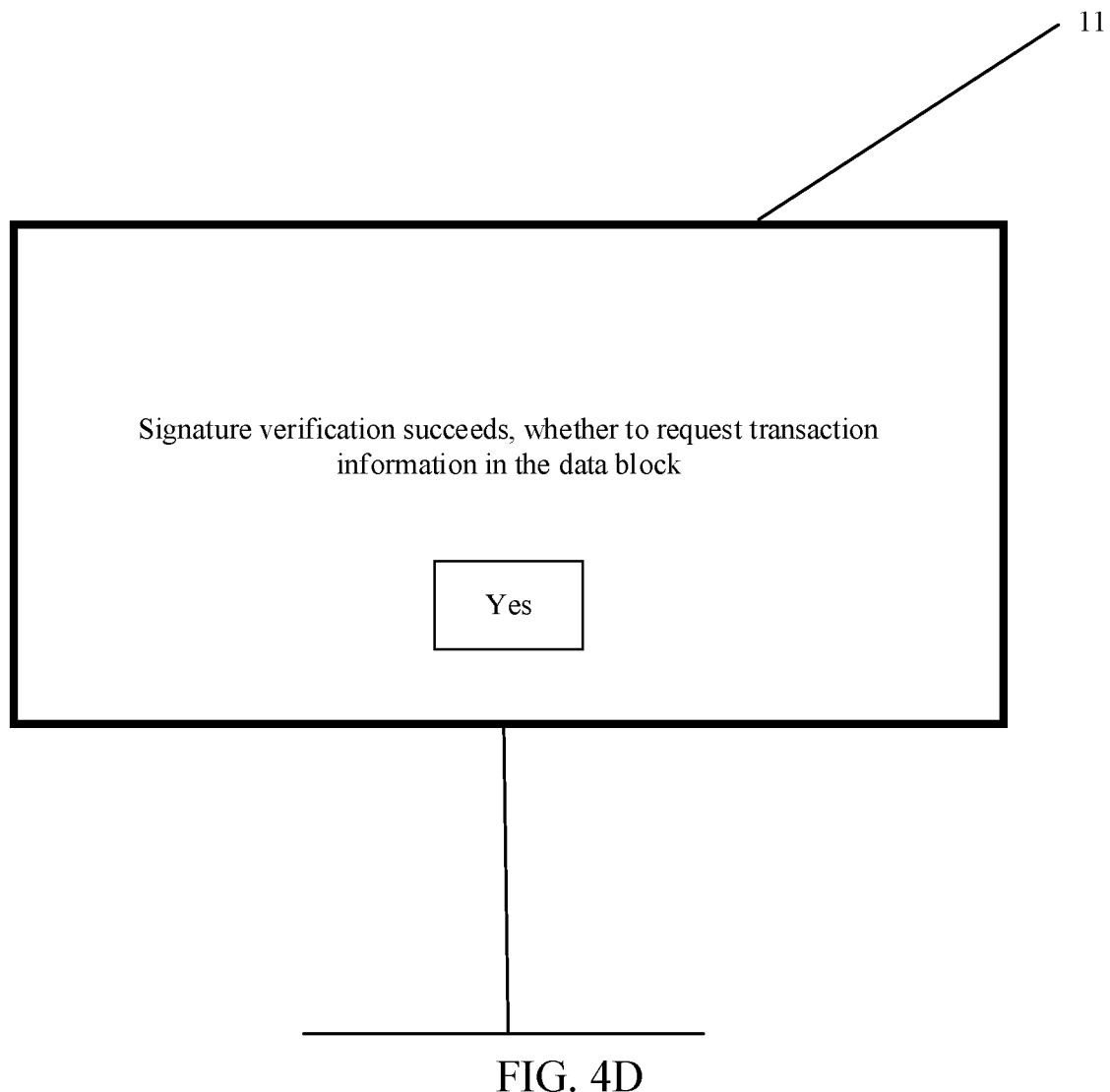
Figure 4E:
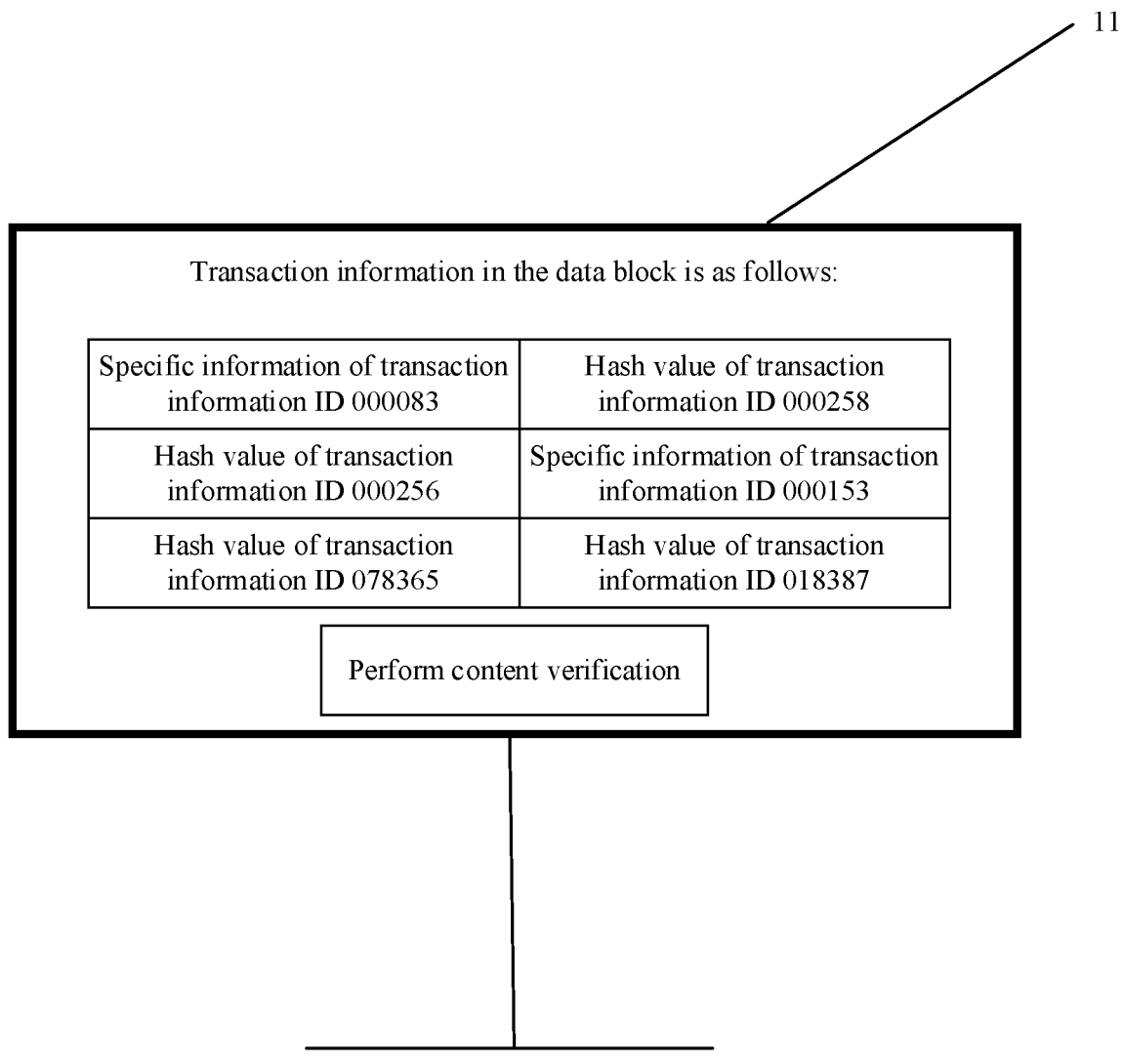
Figure 4F:
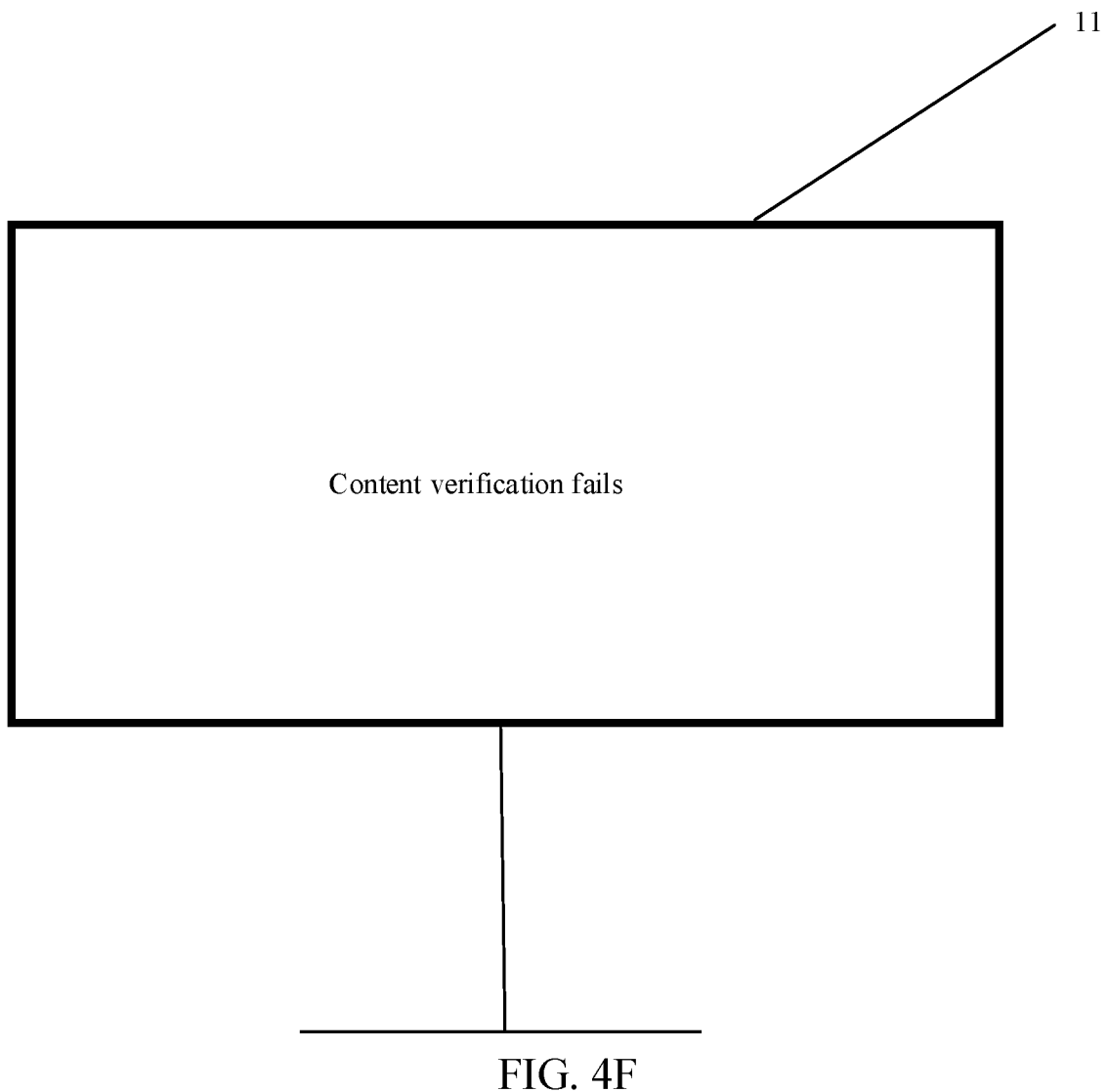
Figure 4G:
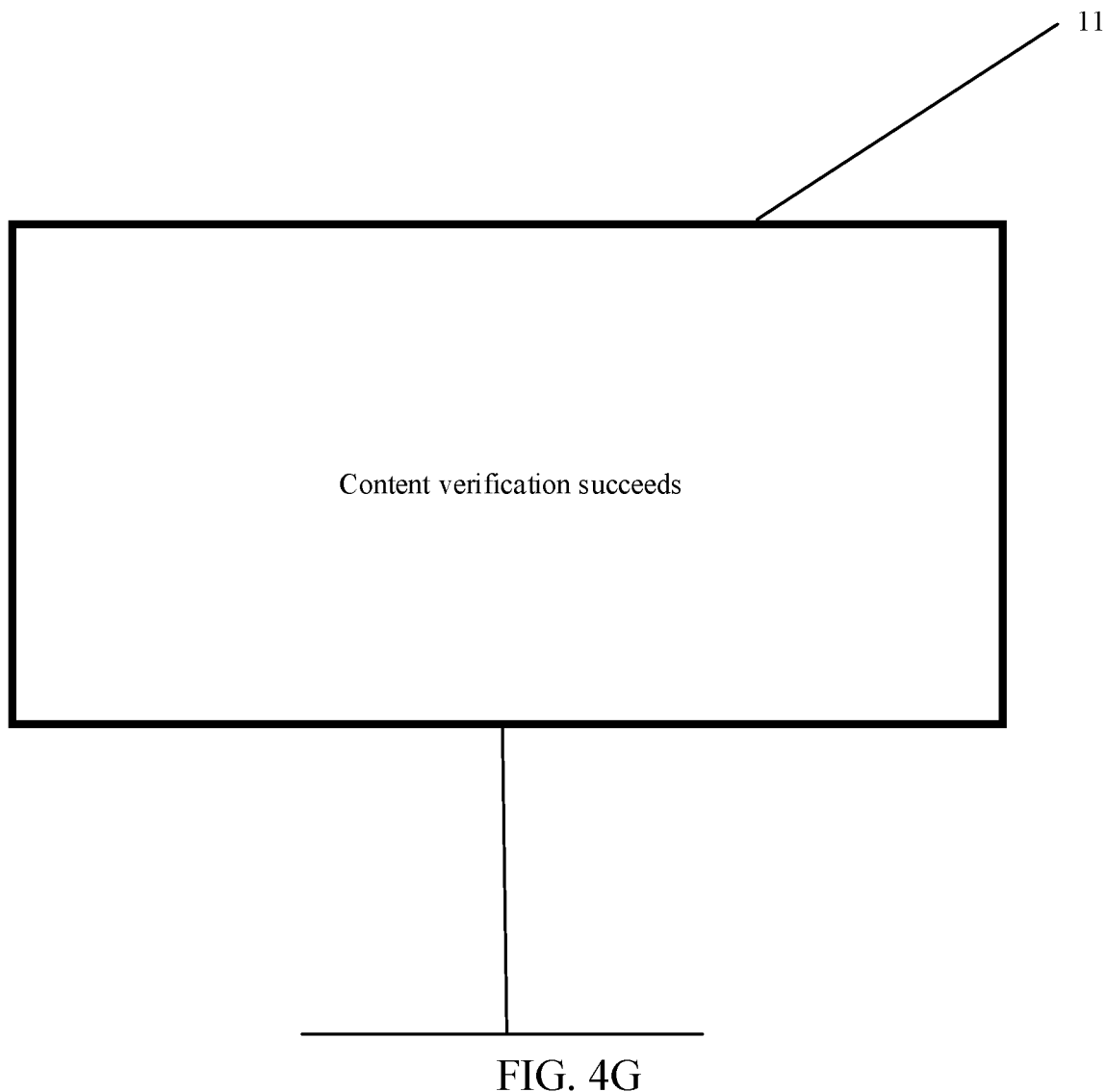

Then, the service node 11 performs signature verification, and an interface of a signature verification failure shown in FIG. 4C or an interface of a signature verification success shown in FIG. 4D is displayed according to the verification result. If the interface of a signature verification success is displayed, the service node 11 may request the accounting node 21 for transaction information, and display the interface of the obtained transaction information or the hash value of the transaction information shown in FIG. 4E, and then separately display, according to the verification result of content verification, the interface of a content verification failure shown in FIG. 4F or the interface of a content verification success shown in FIG. 4G. The processes are similar to the processes shown in FIG. 3C to FIG. 3G, and therefore details are not described again.

Figure 2C:
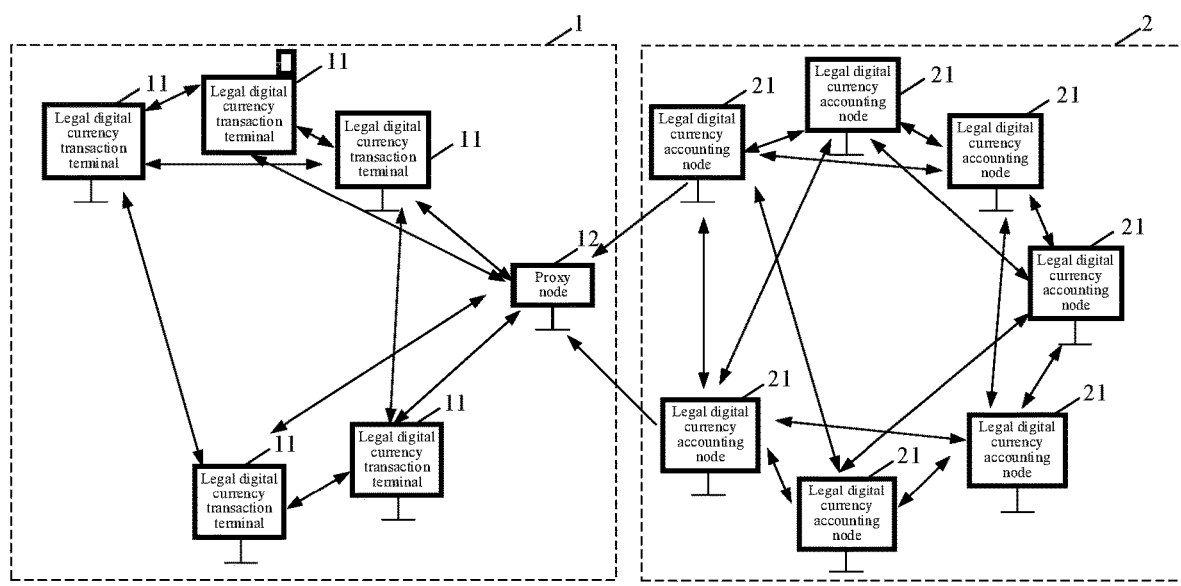

FIG. 2C shows an architectural diagram of a scenario in which a method for recording a data block in a blockchain network according to an embodiment of the present disclosure is applied to an application scenario of legal digital currency.

In a scenario of a conventional civil digital currency such as Bitcoins, each transaction in a flow process of Bitcoins is added onto the blockchain by parties of the transaction. Each party not only can act as an accounting node to add data onto the blockchain, but also can witness a data block added onto the blockchain by another node. Each node acts as both an accounting node and a witness node, so that the public trust use of the digital currency. However, in the scenario of the legal digital currency, the digital currency is officially issued, and needs to be officially supervised. The public needs to trust the digital currency, to prevent all the official accounting nodes from cheating. In this case, the solution provided in this embodiment of the present disclosure that the accounting node subnetwork 2 is separated from the service node subnetwork 1 completely avoids this problem. First, each accounting node 21 of the accounting node subnetwork 2 belongs to the official. A transaction of the legal digital currency occurring at any service node 11 needs to be recorded onto the blockchain by using a corresponding accounting node 21. However, each service node 11 in the service node subnetwork 1 may witness the accounting of the accounting node 21. Once all the accounting nodes 21 cheat, the service nodes 11 that witness the accounting keep a specific evidence of the misbehavior of the accounting nodes.

In an example of the legal digital currency, as shown in FIG. 2C, each service node 11 includes each transaction terminal in circulation of the legal digital currency. When transaction information of the legal digital currency is transmitted, the transaction terminal transmits corresponding transaction information (transfer of the ownership of the legal digital currency) to the proxy node 12, and the proxy node 12 selects an accounting node 21. The proxy node 12 transmits the corresponding transaction information to the selected accounting node 21 for caching. Then, the accounting node 21 packages the transaction information into a data block according to a block packaging requirement. The accounting node 21 generates a signature based on the transaction information in the data block, adds the signature into a block header of the data block to be added onto the blockchain, and then transmits the signature to each service node 11. The processes are similar to the process shown in FIG. 2A.

The information transmitted to each service node 11 at the same time as the signature may also include the transaction information in the data block, or the digest of the transaction information. In a case of transmitting the transaction information while transmitting the signature and in a case of transmitting the digest while transmitting the signature, the signature verification manners at the service nodes 11 are different, but the signature verification can be performed at the service nodes 11. This is similar to the foregoing process shown in FIG. 2A. Therefore, reference may be made to the related descriptions shown in FIG. 2A. In addition, in a case of transmitting the digest of the transaction information while transmitting the signature, the service node 11 may perform content verification of the data block, and the verification process is also similar to the foregoing process shown in FIG. 2A, and therefore details are not described again.

FIG. 5A to FIG. 5G show diagrams of a service node display interface in which a method for recording a data block in a blockchain network according to an embodiment of the present disclosure is applied to an application scenario of legal digital currency. The diagrams of the interface indicate the general process of accounting and witness in the application scenario of legal digital currency.

Figure 5A:
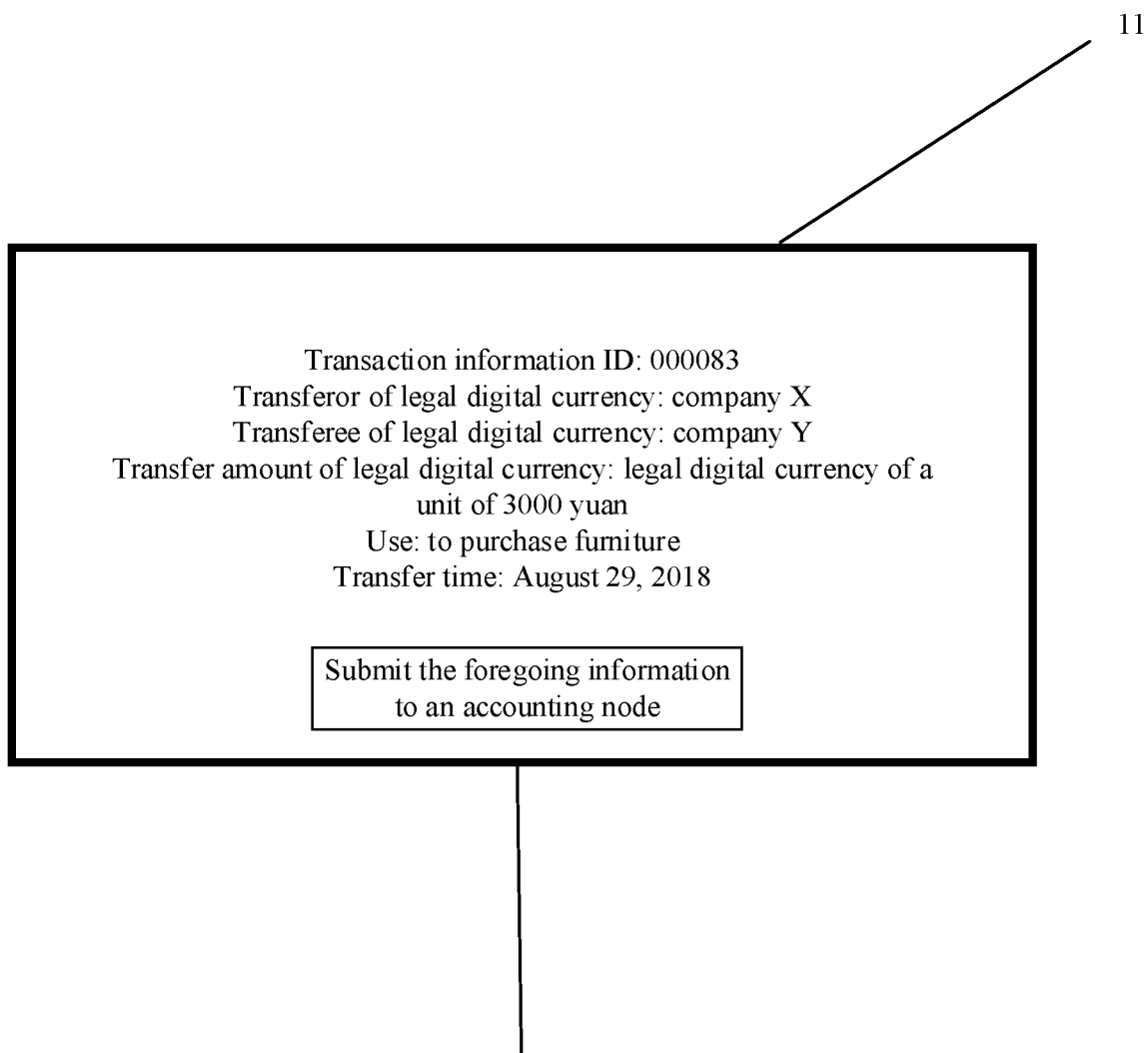
FIG. 5A to FIG. 5G show schematic diagrams of a service node display interface in which a method for recording a data block in a blockchain network according to an embodiment of the present disclosure is applied to an application scenario of legal digital currency.
Figure 5B:
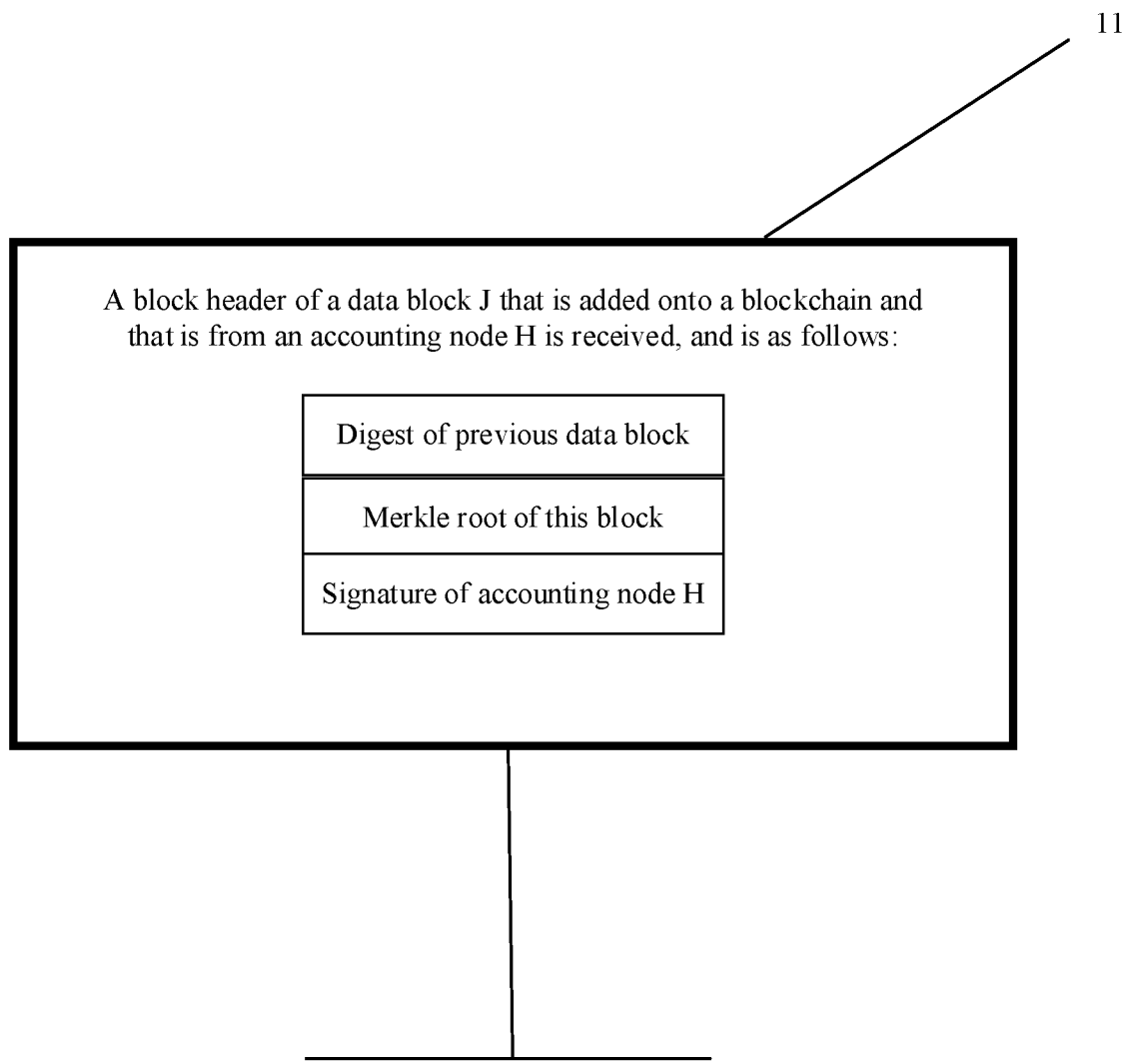

As shown in FIG. 5A, on Aug. 29, 2018, a company X bought a piece of furniture sold at the price of 3000 units of legal digital currency from a company Y, and paid 3000 units of legal digital currency to the company Y. After a responsible person of the company X enters the foregoing information, the responsible person clicks the "submit to accounting node" option, and transaction information is transmitted to the accounting node 21 through the proxy node 12. The accounting node 21 places the transaction information to be included in a data block to be added onto the blockchain into a block body. The accounting node 21 further generates a Merkle root and a signature, and places the Merkle root, the signature, and the digest of a previous data block on the blockchain together in the block header. The accounting node 21 adds the data block onto the blockchain, and transmits the block header to each service node 11. As shown in FIG. 5B, the Merkle root, the signature, and the digest of a previous data block on the blockchain are displayed on a screen of the service node 11.

Figure 5C:
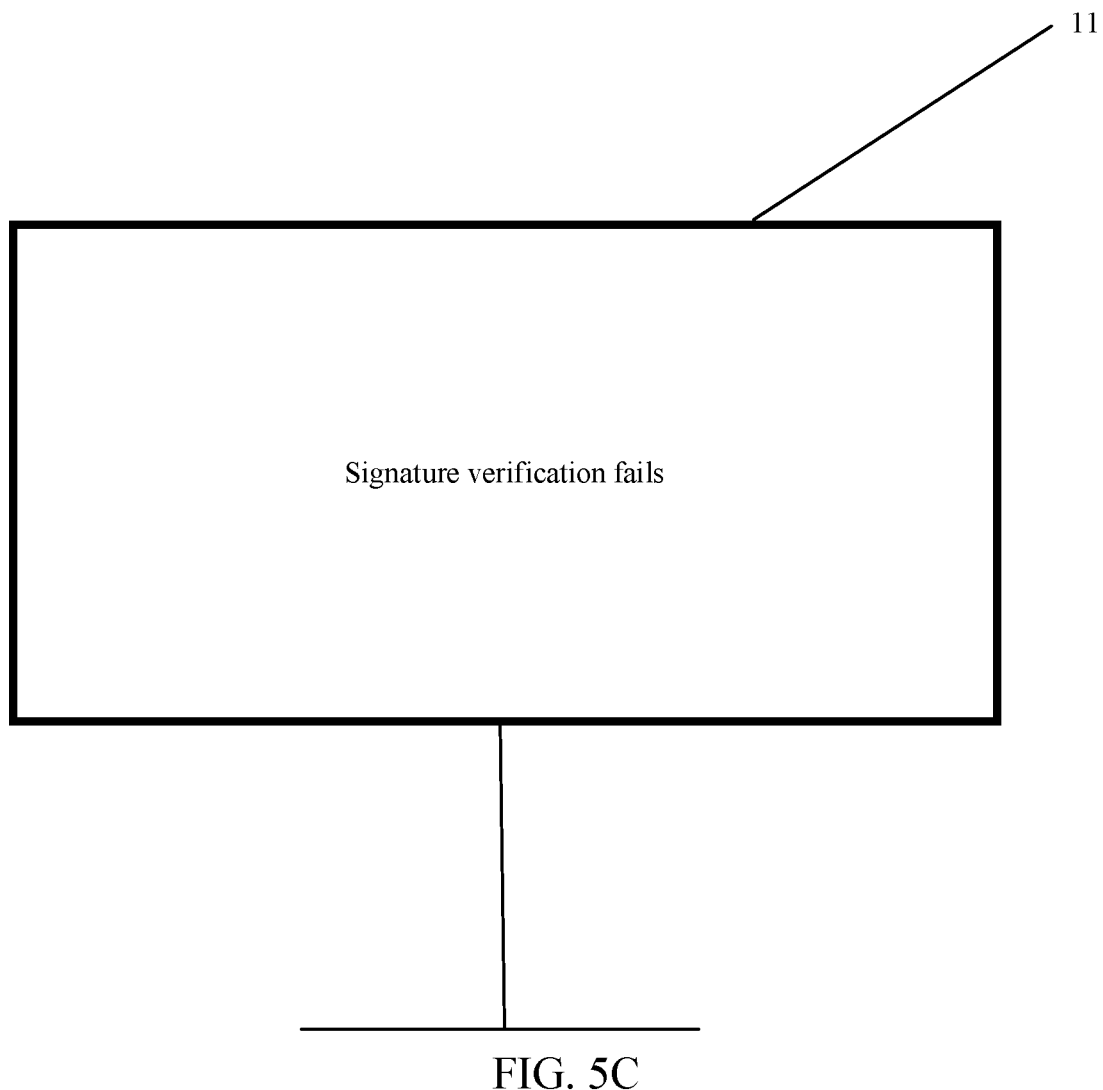
Figure 5D:
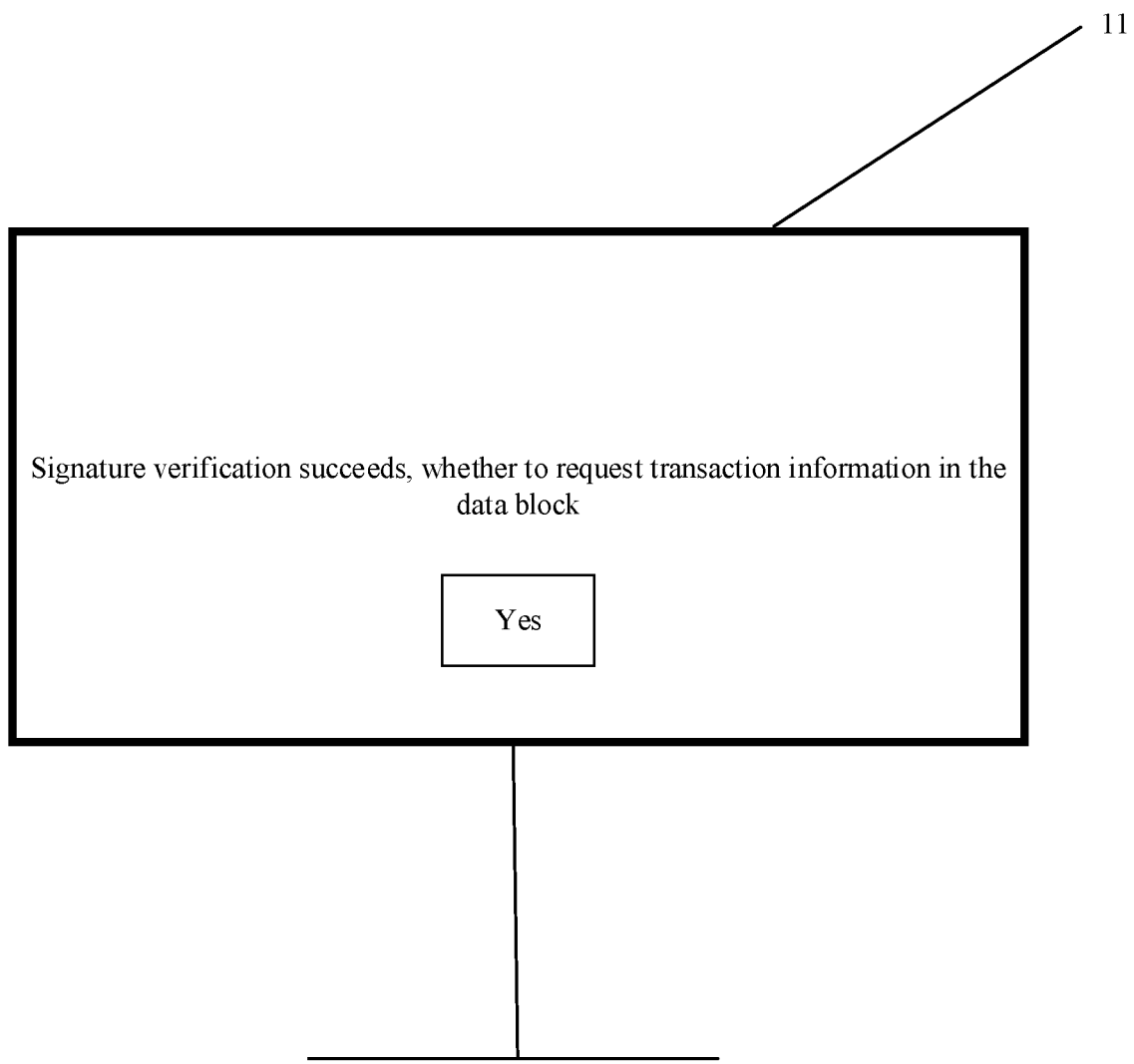
Figure 5E:
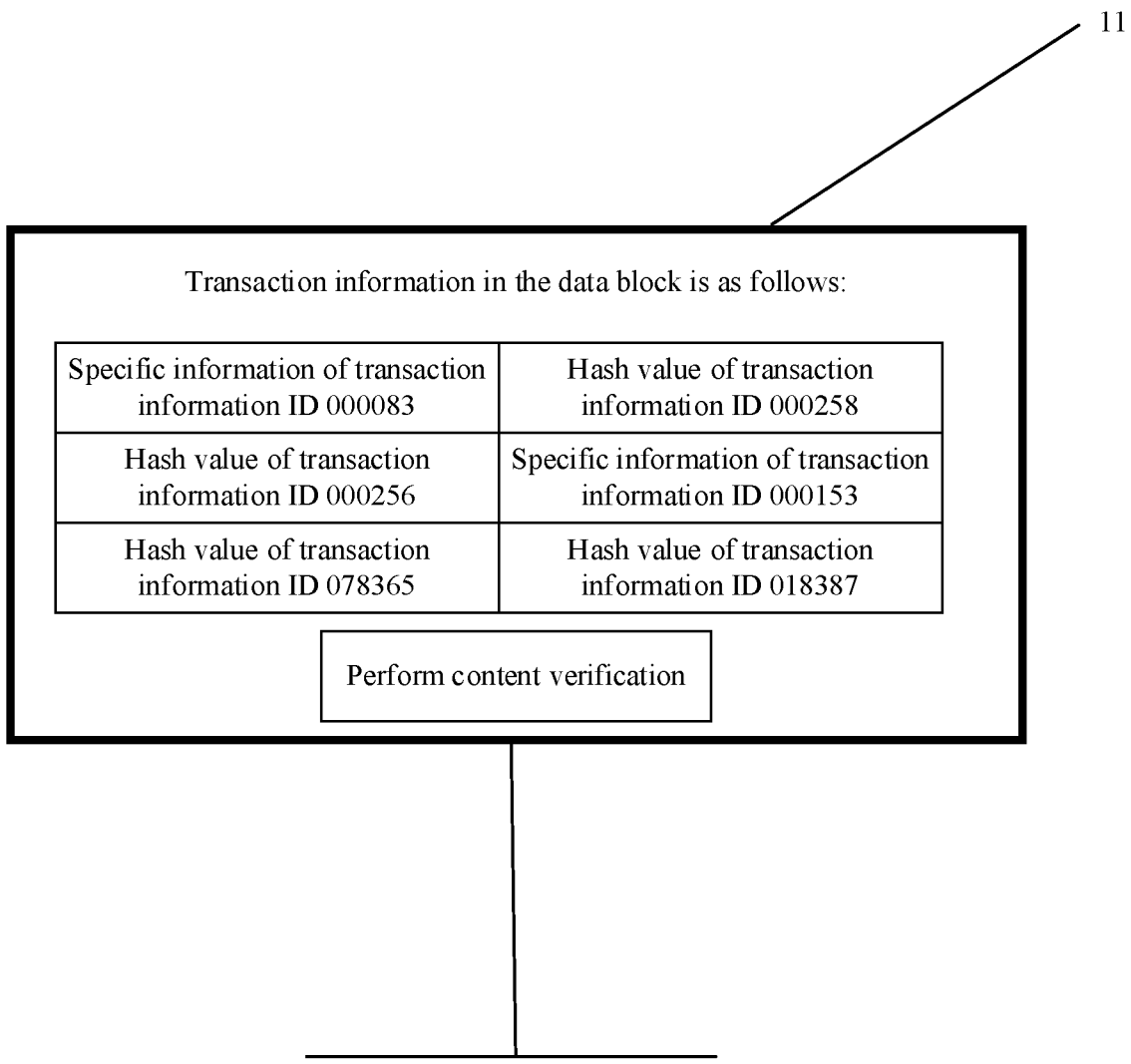
Figure 5F:
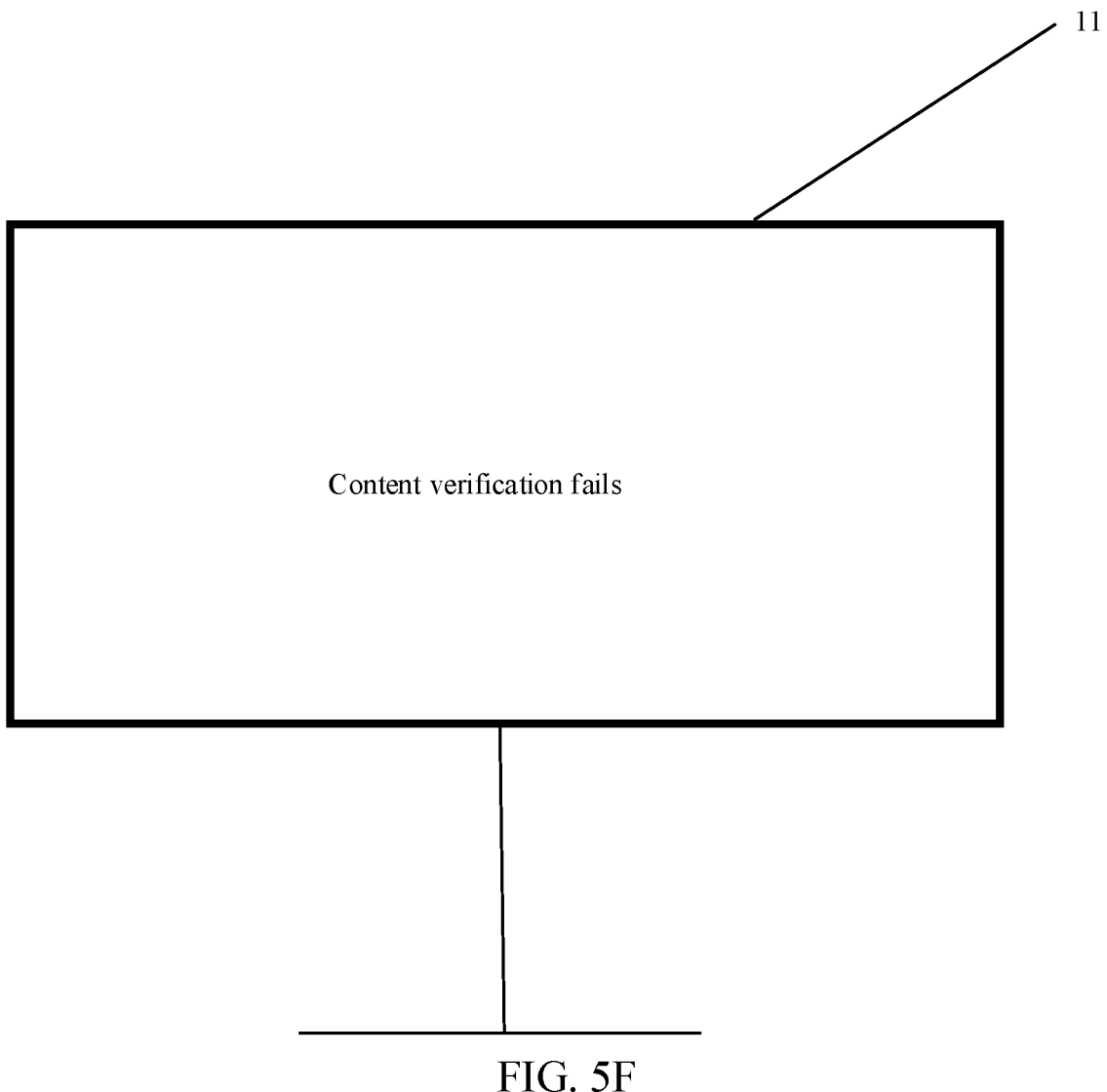
Figure 5G:
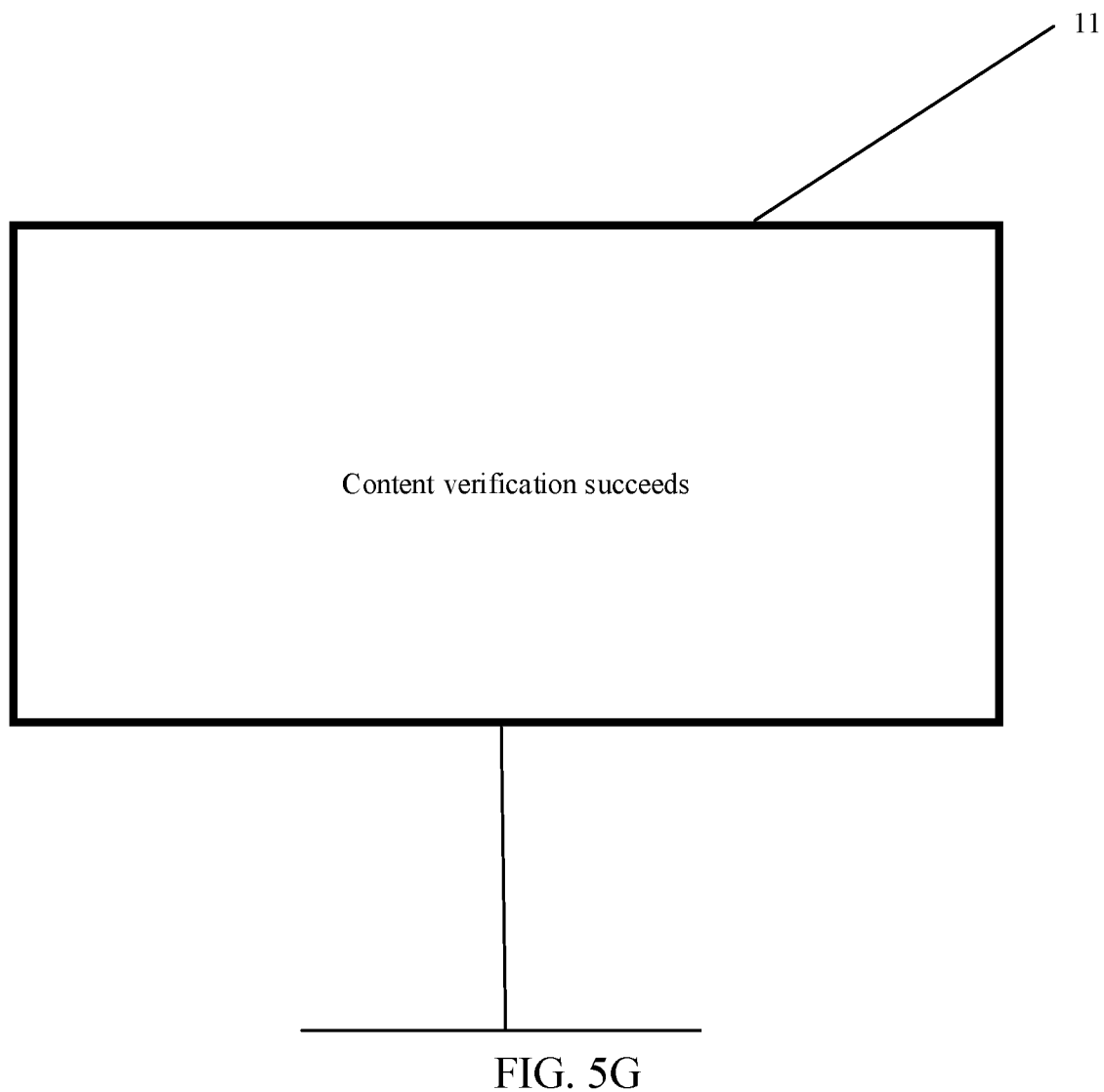

Then, the service node 11 performs signature verification, and an interface of a signature verification failure shown in FIG. 5C or an interface of a signature verification success shown in FIG. 5D is displayed according to the verification result. If the interface of a signature verification success is displayed, the service node 11 may request the accounting node 21 for transaction information, and display the interface of the obtained transaction information or the hash value of the transaction information shown in FIG. 5E, and then separately display, according to the verification result of content verification, the interface of a content verification failure shown in FIG. 5F or the interface of a content verification success shown in FIG. 5G. The processes are similar to the processes shown in FIG. 3C to FIG. 3G, and therefore details are not described again.

Figure 6:
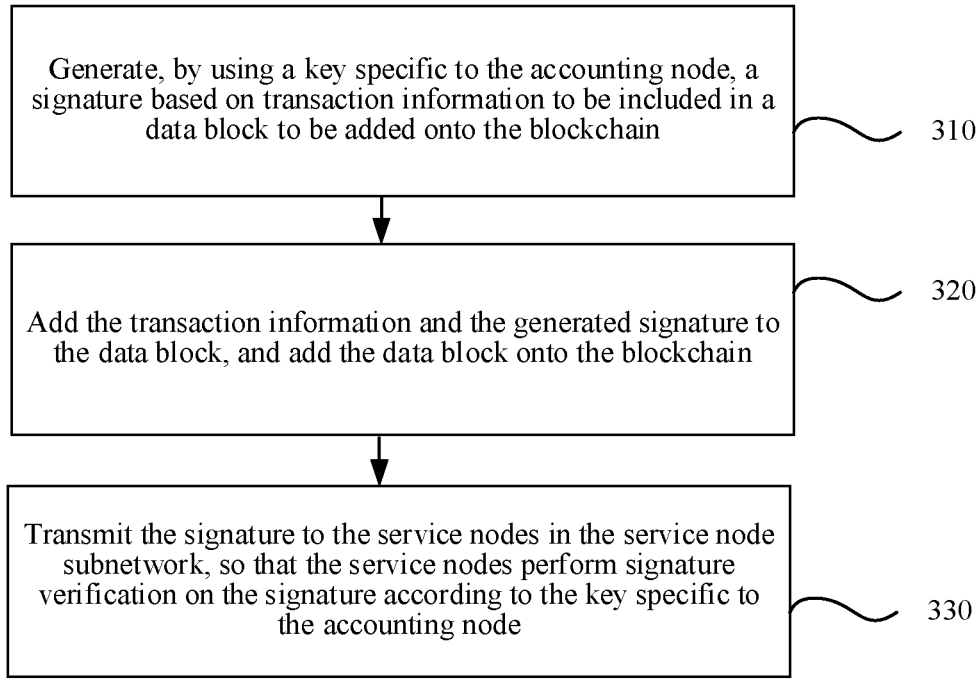
FIG. 6 shows a flowchart of a method for recording a data block in a blockchain network according to an embodiment of the present disclosure.

As shown in FIG. 6, according to an embodiment of the present disclosure, a method for recording a data block in a blockchain network is provided. As shown in FIG. 1A to FIG. 1C, the blockchain network includes an accounting node subnetwork 2 and a service node subnetwork 1. The accounting node subnetwork 2 includes accounting nodes 21 configured to record a data block onto a blockchain. The service node subnetwork 1 includes service nodes 11 configured to verify data blocks recorded by the accounting nodes onto the blockchain. The method is performed by an accounting node 21 in the accounting node subnetwork. The method can include the following steps.

In step 310, the method can generate, by using a key specific to the accounting node, a signature based on transaction information to be included in a data block to be added onto the blockchain.

In step 320, the method can add the transaction information and the generated signature to the data block, and add the data block onto the blockchain.

In step 330, the method can transmit the signature to the service nodes in the service node subnetwork, so that the service nodes perform signature verification on the signature according to the key specific to the accounting node.

The foregoing step 310 to step 330 are described below in detail.

In step 310, the signature is generated by using the key specific to the accounting node based on the transaction information to be included in the data block to be added onto the blockchain. The key specific to the accounting node is a key that is pre-allocated by the CA for each accounting node, and that is dedicated for use for signing the transaction information by the accounting node. Generally, the signing process is as follows: digest operation is performed on a to-be-signed message to obtain a digest of the to-be-signed message, and then the digest is encrypted by using a key used for signing, to obtain the signature. When the signature is verified, the signature needs to be decrypted by using a key used for decrypting the signature, to obtain the digest of the to-be-signed message, and then the same digest operation is performed again on the to-be-signed message, to obtain a re-determined digest. If the digest obtained through decryption is consistent with the re-determined digest, the signature verification is successful. Through signature verification, whether the to-be-signed message is transmitted by the signer and whether the message is complete can be verified. If the message is not transmitted by the signer, or a part of the message is lost during transmission, the signature verification fails.

The key used for signing and the key used for decrypting the signature may be the same, that is, a case of symmetric keys, or different, that is, the case of asymmetric keys. In the case of symmetric keys, the CA (not shown in the figure, a node that implements a certification function and that is independent of the accounting node subnetwork) can issue a key specific to each accounting node for the accounting node in advance, and record a correspondence between the key and the accounting node into the CA. In an embodiment, when each accounting node is set up, the accounting node may request the CA, and the CA issues a key specific to the accounting node for the accounting node. In another embodiment, when each accounting node needs to generate a signature, the accounting node may request the CA, and the CA issues a key specific to the accounting node for the accounting node.

In an embodiment, the key allocated to the accounting node may be broadcast to each service node in the service node subnetwork while being transmitted to the accounting node, so that the service node can use the key for decrypting the signature. In another embodiment, the key allocated to the accounting node may be transmitted to the service node at the request of the service node. That is, when the service node needs the key to decrypt the signature, the service node requests the CA, and the CA transmits the key to the service node, so that the service node decrypts the signature.

In the case of asymmetric keys, the CA can generate a pair of public and private keys for each accounting node in advance, issue the private key to the accounting node, and broadcast the public key to all service nodes in the service node subnetwork; or a correspondence between the private key and the accounting node is recorded into the CA, and the service node that requires the public key corresponding to the private key can request the CA for the key. In an embodiment, when each accounting node is set up, the accounting node may request the CA, and the CA generates the foregoing public and private keys. In another embodiment, when each accounting node needs to generate a signature, the accounting node may request the CA, and the CA generates the public and private keys.

In an embodiment, the public key may be immediately broadcast to each service node in the service node subnetwork after being generated. In another embodiment, the public key may be transmitted to the service node at the request of the service node. That is, the service node requests the CA when needing the public key to decrypt the signature. The CA transmits the public key to the service node, so that the service node decrypts the signature.

In an embodiment, in step 310, when the service node 11 transmits the transaction information to the accounting node 21 through the proxy node 12, the accounting node 21 may use the received transaction information as transaction information to be included in a data block to be added onto the blockchain, and apply a signature algorithm to the transaction information, to generate the signature.

In another embodiment, in step 310, when the service node 11 transmits the transaction information to the accounting node 21 through the proxy node 12, instead of immediately using the received transaction information as transaction information to be included in a data block to be added onto the blockchain, and applying a signature algorithm to the transaction information to generate the signature, the accounting node 21 places the transaction information into a cache, and until sufficient transaction information is cached in the cache, packages the transaction information into a data block, generates a signature, and adds the data block onto the blockchain. The advantage of this embodiment is to improve the use efficiency of the data block. In a data block, a plurality of pieces of transaction information may be stored, so that data blocks on the blockchain are not excessive and are not excessively dispersed, and the workload of adding the data block onto the blockchain is also reduced.

Figure 13:
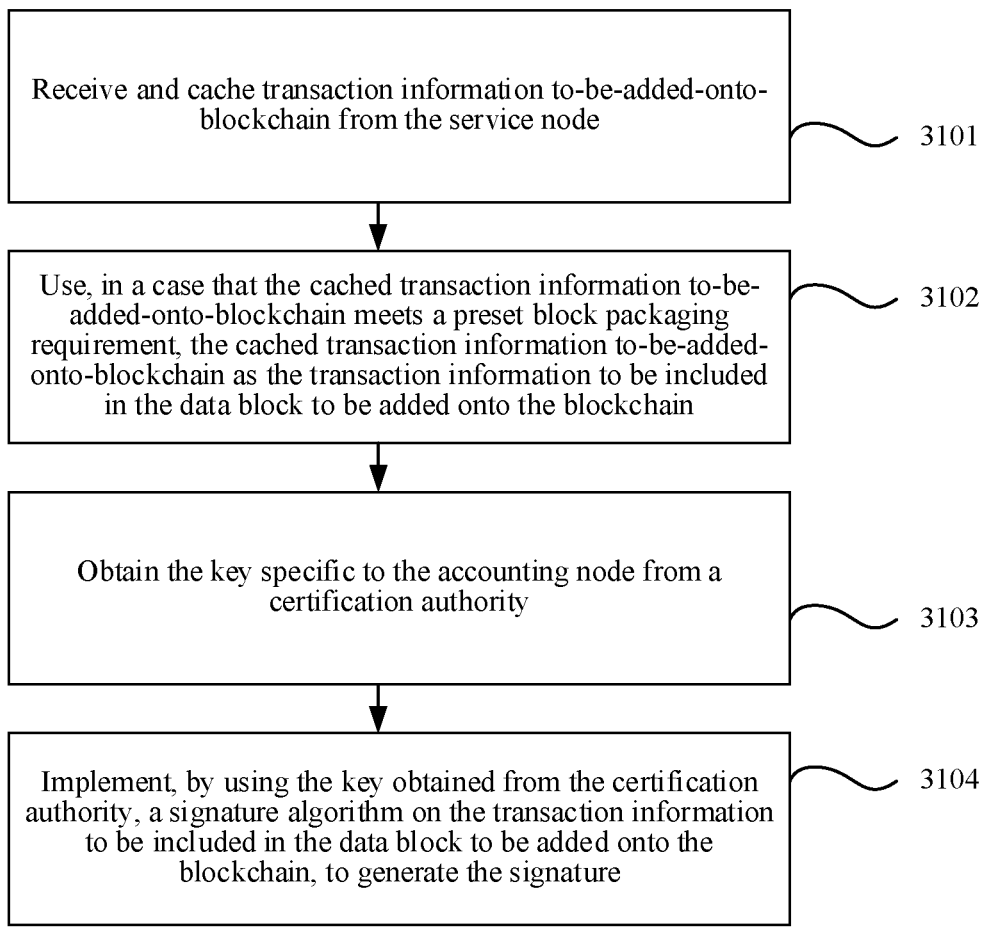
FIG. 13 shows a flowchart of a specific implementation of step 310 in FIG. 6 according to an embodiment of the present disclosure.

In this embodiment, as shown in FIG. 13, step 310 can include the following.

In step 3101, the method can receive and cache transaction information to-be-added-onto-blockchain from the service node.

In step 3102, the method can use, in a case that the cached transaction information to-be-added-onto-blockchain meets a preset block packaging requirement, the cached transaction information to-be-added-onto-blockchain as the transaction information to be included in the data block to be added onto the blockchain.

In step 3103, the method can obtain the key specific to the accounting node from a CA.

In step 3104, the method can implement, by using the key obtained from the CA, a signature algorithm on the transaction information to be included in the data block to be added onto the blockchain, to generate the signature.

In step 3101, the transaction information to-be-added-onto-blockchain is transaction information that needs to be recorded onto the blockchain after the service node completes a transaction, such as the information displayed on interfaces of FIG. 3A, FIG. 4A, and FIG. 5A. After receiving the information, the accounting node does not immediately package the information into a data block, instead, first caches the information. Until the cached transaction information to-be-added-onto-blockchain reaches a preset block packaging requirement, the cached transaction information to-be-added-onto-blockchain is used as the transaction information to be included in a data block to be added onto the blockchain.

In step 3102, in an embodiment, the block packaging requirement includes at least one of the following: a total size of the cached transaction information to-be-added-onto-blockchain reaches a preset size threshold; a total quantity of pieces of the cached transaction information to-be-added-onto-blockchain reaches a preset piece quantity threshold; and a time length from a caching time of a piece of transaction information to-be-added-onto-blockchain that is cached the earliest in the cached transaction information to-be-added-onto-blockchain to a current time reaches a preset time threshold.

In a case that the block packaging requirement is that the total size of the cached transaction information to-be-added-onto-blockchain exceeds a preset size threshold, for example, the preset size threshold is 4 Mb, there are originally two pieces of transaction information in the cache, the sizes of which are respectively 0.8 Mb and 1.5 Mb, in this case, if another piece of transaction information to-be-added-onto-blockchain is received and the size is 2 MB, 0.8 Mb+1.5 Mb+2 Mb=4.3 Mb>4 Mb, in this case, a data block can be generated for the three pieces of transaction information, to prevent the resource waste of generating a data block for each piece of transaction information.

In a case that the block packaging requirement is that the total piece quantity of the cached transaction information to-be-added-onto-blockchain exceeds a preset piece quantity threshold, for example, the preset piece quantity threshold is 5, there are originally 4 pieces of transaction information in the cache, in this case, if another piece of transaction information to-be-added-onto-blockchain is received, in this case, a data block can be generated for the 5 pieces of transaction information, to prevent the resource waste of generating a data block for each piece of transaction information.

In a case that the block packaging requirement is that a time length from a caching time of a piece of transaction information to-be-added-onto-blockchain that is cached the earliest in the cached transaction information to-be-added-onto-blockchain to a current time reaches a preset time threshold, for example, the preset time threshold is 24 hours, if the transaction information to-be-added-onto-blockchain is placed into the cache at 11:27:01, Apr. 25, 2018, a data block can be generated for the transaction information to-be-added-onto-blockchain at 11:27:01 on April 26, to avoid an excessively long delay from a time that the data block is requested to be added onto the blockchain to a time that the data block is really added onto the blockchain.

In practice, one or more of the foregoing usually need to be used in combination with each other. For example, if the total size of the cached transaction information to-be-added-onto-blockchain exceeds a preset size threshold or a time length from a caching time of a piece of transaction information to-be-added-onto-blockchain that is cached the earliest in the cached transaction information to-be-added-onto-blockchain to a current time reaches a preset time threshold, a data block can be generated. In this way, not only the resource waste of generating a data block for one piece of transaction information but also the unlimited waiting caused by insufficient transaction information received in a period time are avoided.

In step 3103, the key specific to the accounting node is obtained from the CA.

As described above, when the accounting node is set up, the accounting node may request the CA for the key specific to the accounting node, or when a signature is required (for example, after step 3102), the accounting node may request the CA for the key specific to the accounting node. In the case of symmetric keys, the key specific to the accounting node is a unique key issued by the CA to the accounting node. In the case of asymmetric keys, the key specific to the accounting node is a private key generated by the CA for the accounting node.

In step 3104, the signature algorithm is implemented, by using the key obtained from the CA, on the transaction information to be included in the data block to be added onto the blockchain, to generate the signature. The signature algorithm is described above, and includes a digest algorithm and a method for encrypting the digest. In an embodiment, the digest is the Merkle root.

In an embodiment, based on transaction information to be included in a data block to be added onto the blockchain, the Merkle root can be generated by determining a hash value of each piece of transaction information in the data block, sorting the transaction information in the data block according to a sequence of entering the cache, and grouping transaction information sorted at an odd-numbered position and immediately following transaction information sorted at an even-numbered position into an information pair, performing hash operation on hash values of the two pieces of transaction information of each information pair, to obtain a hash value of the information pair, sorting the information pairs according to a sequence of entering the cache, grouping an information pair sorted at an odd-numbered position and an immediately following information pair sorted at an even-numbered position into an upper-level information pair, and performing hash operation on hash values of the two information pairs in each upper-level information pair, to obtain a hash value of the upper-level information pair, until a hash value of an uppermost-level information pair is obtained, that is, the Merkle root.

In another embodiment of the present disclosure, if the transaction information sorted at a last odd-numbered position is the last piece of transaction information in the cache, the transaction information is copied, and the last piece of transaction information and the copied transaction information form an information pair. If an information pair sorted at a last odd-numbered position is the last information pair in the cache, the information pair is copied, and the last information pair and the copied information pair form an upper-level information pair, and the Merkle root obtained in this manner is referred to as a binary tree.

For example, there are nine pieces of transaction information in the cache, and are respectively A1 to A9 according to a time sequence of entering the cache, and are to be placed into a data block to be added onto the blockchain. A1 and A2 form an information pair B1, and a hash operation is performed on the hash value of A1 and the hash value of A2 to obtain the hash value of B1; A3 and A4 form an information pair B2, and a hash operation is performed on the hash value of A3 and the hash value of A4 to obtain the hash value of B2; A5 and A6 form an information pair B3, and a hash operation is performed on the hash value of A5 and the hash value of A6 to obtain the hash value of B3; A7 and A8 form an information pair B4, and a hash operation is performed on the hash value of A7 and the hash value of A8 to obtain the hash value of B4; A9 is copied to obtain A10, A9 and A10 form an information pair B5, and a hash operation is performed on the hash value of A9 and the hash value of A10, to obtain the hash value of B5.

For B1 to B5, B1 and B2 form an upper-level information pair C1, and a hash operation is performed on the hash value of B1 and the hash value of B2 to obtain the hash value of C1; B3 and B4 form an upper-level information pair C2, and a hash operation is performed on the hash value of B3 and the hash value of B4 to obtain the hash value of C2; B5 is copied to obtain B6, B5 and B6 form an information pair C3, and a hash operation is performed on the hash value of B5 and the hash value of B6 to obtain the hash value of C3.

For C1 to C3, C1 and C2 form an upper-level pair D1, and a hash operation is performed on the hash value of C1 and the hash value of C2 to obtain the hash value of D1; C3 is copied to obtain C4, C3 and C4 form an information pair D2, and a hash operation is performed on the hash value of C3 and the hash value of C4, to obtain the hash value of D2.

For D1 and D2, a hash operation is performed on the hash value of D1 and the hash value of D2, to obtain the Merkle root.

In step 320, the transaction information and the generated signature are added to the data block, and the data block is added onto the blockchain.

In an embodiment, the data block is not divided into a block header and a block body, and is used as an entirety, and the transaction information and the signature are added to the entirety of the data block. In a further embodiment, each data block may carry a digest of a previous data block in the blockchain. The function thereof is, because each data block includes information of a previous data block, and a digest of the data block is included in a following data block on the blockchain, adjacent data blocks are associated with each other, and once a data block is tampered with, a digest of the data block included in a following data block does not correspond to the data block, so that tampering is recognized, thereby ensuring the security of information stored on the blockchain.

In another embodiment, the data block is not divided into a block header and a block body, and is used as an entirety, and the transaction information, the digested calculated according to the transaction information, and the signature are added to the entirety of the data block. The digest may be the Merkle root described above. The transaction information is different, and the digests obtained through operation by using a digest algorithm are also different. Therefore, different block body content, that is, the transaction information, can be distinguished according to the digests. The digest may be used for retrieving a data block. In some embodiments, the digest also needs to be used when the service node verifies the signature. Similarly, as described above, each data block may carry a digest of a previous data block in the blockchain In another embodiment, the data block is divided into a block header and a block body. The block body is a main body of the data block, and includes transaction information stored in the data block. The block header is a head of the data block, and does not include the transaction information, and instead, includes auxiliary information, including a digest (for example, the Merkle root) calculated based on all transaction information in this data block, the signature, and the digest of the previous data block. Therefore, in this embodiment, the transaction information is added to the block body, and the digest (for example, the Merkle root) and the signature are added to the block header. The function of the digest of the previous data block is described above. Through signature verification, the behavior of cheating by all the accounting nodes can be prevented.

In an embodiment, step 320 can include a the transaction information and the generated signature to the data block, and transmitting the data block to a leader accounting node in all accounting nodes in the accounting node subnetwork, broadcasting, by the leader accounting node, the data block to other accounting nodes in the accounting node subnetwork for consensus, and adding, by the leader accounting node, the data block onto the blockchain after the consensus succeeds.

The leader accounting node is an accounting node that is elected by the accounting nodes in the accounting node subnetwork and that performs a consensus initiation operation and a consensus result collection operation in the consensus algorithm. The leader accounting node may be a fixed accounting node, or elected in real time according to an existing election algorithm. Therefore, details are not described again.

Figure 20:
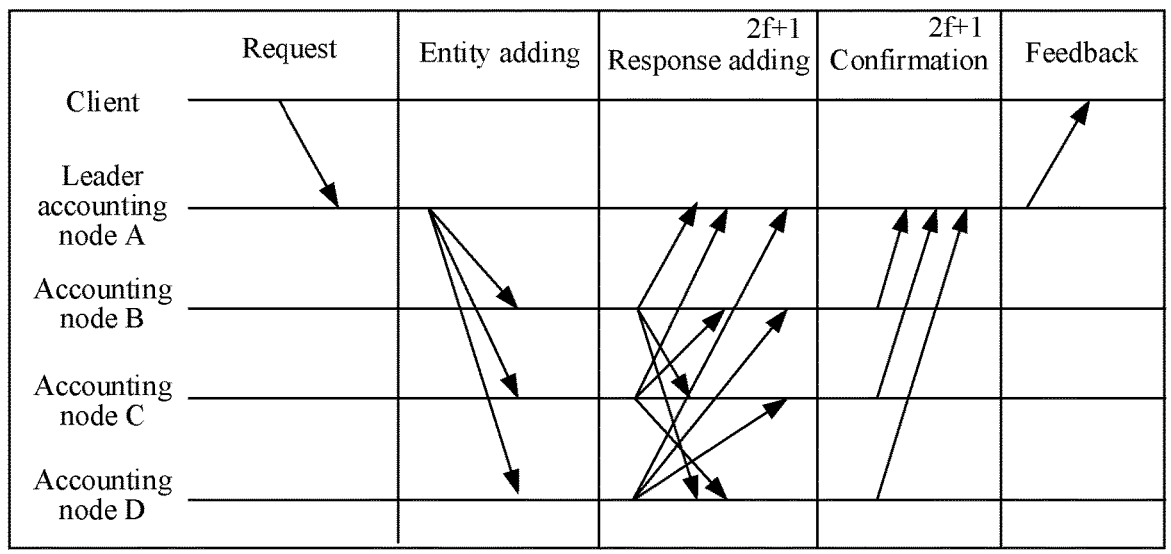
FIG. 20 shows a schematic diagram of a consensus process performed between accounting nodes according to an embodiment of the present disclosure.

FIG. 20 shows a process in which a leader accounting node broadcasts the data block to other accounting nodes in the accounting node subnetwork for consensus according to an embodiment of the present disclosure.

Referring to FIG. 20, at a request stage, a client (that is, an accounting node that forms a data block to be recorded onto the blockchain) initiates a consensus request, and transmits the consensus request to a leader accounting node A in a leading status; at a following entity adding stage, the leader accounting node A broadcasts a data block corresponding to the consensus request to other accounting nodes in the accounting node subnetwork that are not in the leading status (for example, accounting nodes B, C, D . . . ); at a following response adding stage, the other accounting nodes broadcast received consensus content to other accounting nodes, and when the consensus content that is broadcast by a preset quantity (2f+1) of other accounting nodes and that is received by the leader accounting node A is consistent, a confirmation stage is entered, and the accounting nodes feedback the confirmation result to the leader accounting node A again. At a feedback stage, when confirmation of the feedbacks that are of the preset quantity (2f+1) of other blockchain nodes and that are received by the leader accounting node A succeeds, the leader accounting node A determines that the consensus is completed, and feeds back the consensus completion result to the client. f is a maximum integer of all integers less than (N−1)/3, and N is the quantity of accounting nodes in the accounting node subnetwork. f is the quantity that is of accounting nodes misbehaving in the accounting node subnetwork and that can be tolerated by the algorithm.

After the consensus succeeds, the leader accounting node may add the data block onto the blockchain, that is, complete adding the data block onto the blockchain.

In step 330, the signature is transmitted to the service nodes in the service node subnetwork, so that the service nodes perform the signature verification on the signature according to the key specific to the accounting node. As described above, the signing process is usually as follows: digest operation is performed on a to-be-signed message to obtain a digest of the to-be-signed message, and then the digest is encrypted by using a key used for signing, to obtain the signature. The signature verification usually includes the following steps: decrypting the signature by using a key used for decrypting the signature to obtain a decrypted digest, and comparing the decrypted digest with an actual digest of the to-be-signed message. Therefore, during the signature verification, the digest of the to-be-signed message needs to be learned, or the to-be-signed message itself needs to be learned, and then the digest is recalculated according to a digest algorithm. Correspondingly, when the signature is transmitted to the service nodes in the service node subnetwork, the digest of the transaction information included in the data block also needs to be transmitted to the service nodes, or the transaction information included in the data block is transmitted to the service nodes, so that the service nodes can recalculate the digest.

In an embodiment, in a case that the data block is not divided into a block header and a block body, the transmitting the digest of the transaction information included in the data block to the service node may include placing the digest and the signature into the same message for transmission to the service node. In another embodiment, in a case that the data block includes a block header and a block body, the transmitting the digest of the transaction information included in the data block to the service node may include transmitting the block header in which the digest and the signature are located to the service node.

In an embodiment, in a case that the data block is not divided into a block header and a block body, the transmitting the transaction information included in the data block to the service node may include placing the transaction information into a message for transmission to the service node. In another embodiment, in a case that the data block includes a block header and a block body, the transmitting the transaction information included in the data block to the service node may include transmitting the block body in which the transaction information is located to the service node.

In the embodiment of transmitting the signature and the transaction information included in the data block simultaneously to the service node, step 330 can include transmitting the signature and the transaction information in the data block to the service nodes in the service node subnetwork, so that the service nodes perform obtaining a key specific to the accounting node, and decrypting the signature by using the key specific to the accounting node, to obtain a digest of transaction information in the data block, the method can further include calculating a digest of the transaction information in the data block, and considering the signature verification a success if the calculated digest is consistent with the digest obtained through decryption.

In an embodiment, the obtaining the key specific to the accounting node may include obtaining an identifier of the accounting node that transmits the signature and the transaction information, transmitting a key request to the CA, the key request including the identifier of the accounting node, and receiving, from the CA, the key that is specific to the accounting node and that corresponds to the identifier.

In a case that the accounting node places the signature and the transaction information into a message for transmission to the service node, in an embodiment, the identifier of the accounting node may be placed into a dedicated accounting node identifier field of the message for transmission. In this way, the service node can read the identifier of the accounting node from the accounting node identifier field.

Next, the service node places the identifier of the accounting node into a dedicated field of the key request, and after receiving the key request, the CA can read the identifier of the accounting node from the dedicated field. As described above, when generating keys specific to the accounting nodes for the accounting nodes, the AC stores the keys and the identifiers of the accounting nodes in a corresponding manner. Therefore, after reading the identifier of the accounting node, the CA can obtain the key stored corresponding to the identifier, that is, the key specific to the accounting node. In the case of symmetric keys, the key specific to the accounting node is a unique key generated for the accounting node. In the case of asymmetric keys, the key specific to the accounting node is a public key in a pair of public and private keys generated for the accounting node.

The service node decrypts the signature by using the key specific to the accounting node, to obtain a digest of the transaction information in the data block. Then, the service node recalculates a digest of the transaction information in the data block. The digest algorithm used by the service node needs to be the same as that used by the accounting node. In this case, if the accounting node does not cheat, and information is not lost in the transmission process, the recalculated digest needs to be consistent with the digest obtained through decryption; if the recalculated digest is inconsistent with the digest obtained through decryption, it indicates that the accounting node has a cheating behavior or information is lost in the transmission process, and the signature verification fails. Otherwise, the signature verification succeeds.

The advantage of this embodiment is that, the signature and the transaction information are simultaneously transmitted to the service node, so that the service node recalculates the digest according to the transaction information. The digest is recalculated by the service node itself, so that the reliability of the data source is ensured, thereby improving the accuracy of the signature verification.

The foregoing is an embodiment of transmitting the transaction information and the signature included in the data block simultaneously to the service node. In this embodiment, the service node verifies the signature according to the transaction information. In another embodiment, the digest of the transaction information and the signature are simultaneously transmitted to the service node, and the service node verifies the signature according to the digest of the transaction information. The advantage of this is that the transaction information may be hidden without being provided to the service node. Although the service node does not know the transaction information, the service node can also verify the signature according to the digest. In this manner, transaction information that may be reported by remaining service nodes and that is not expected to be known by the service node is not exposed, and verification can be performed.

Figure 7:
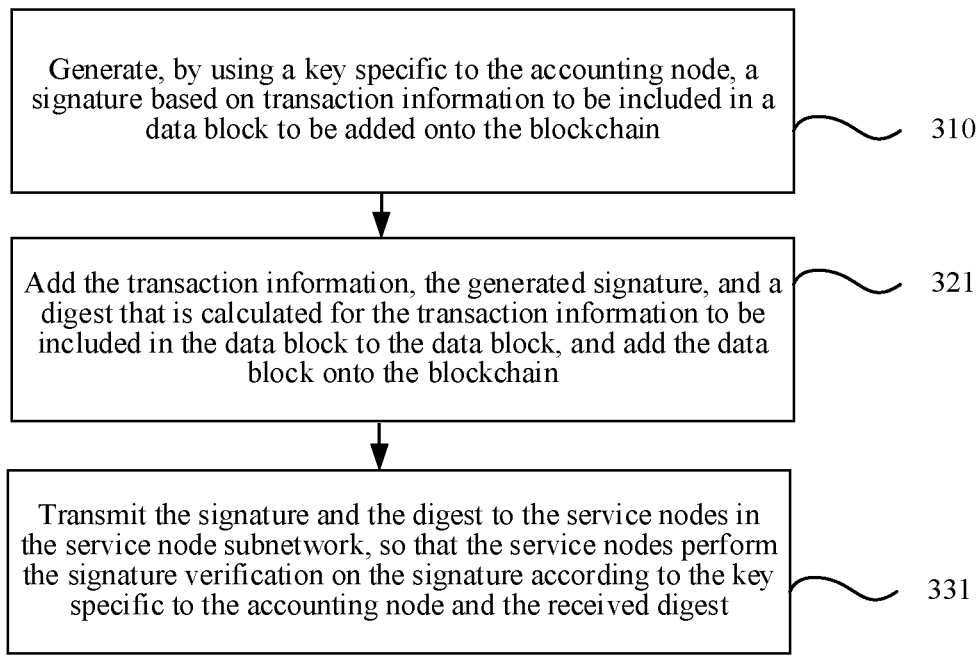
FIG. 7 shows a flowchart of a method for recording a data block in a blockchain network according to an embodiment of the present disclosure.

Therefore, in this embodiment, as shown in FIG. 7, step 320 includes: step 321: Add the transaction information, the generated signature, and a digest that is calculated for the transaction information to be included in the data block to the data block, and add the data block onto the blockchain.

Step 330 includes step 331 where the method can transmit the signature and the digest to the service nodes in the service node subnetwork, so that the service nodes perform the signature verification on the signature according to the key specific to the accounting node and the received digest.

In an embodiment, the data block in step 321 may not be divided into a block header and a block body, and the transaction information, the signature, and the digest are added into the entirety of the data block together. In another embodiment, the data block in step 321 includes a block header and a block body, the transaction information is placed into the block body, the signature and the digest are placed into the block header, and the data block is added onto the blockchain.

In an embodiment, the transmitting the signature and the digest to the service node in step 331 may be implemented in the manner of placing the signature and the digest into the same message for transmission. In another embodiment, in a case that the signature and the digest have been placed into the block header, the block header may be transmitted to the service node.

In an embodiment, a specific process of performing the signature verification on the signature according to the key specific to the accounting node and the received digest can include obtaining the key specific to the accounting node, decrypting the signature by using the key specific to the accounting node, to obtain a digest of the transaction information in the data block, and considering the signature verification a success in a case that the received digest is consistent with the digest obtained through decryption.

The key specific to the accounting node may be obtained in the foregoing manner, that is, transmitting the key request to the CA, and receiving, from the CA, the key that is specific to the accounting node and that corresponds to the identifier of the accounting node. Therefore, details are not described again. The key specific to the accounting node may be a unique key allocated to the accounting node, or a public key in the pair of private and public keys allocated to the accounting node.

Different from the foregoing case of verifying the signature by using the transaction information, in this embodiment, because the service node receives the digest of the transaction information transmitted by the accounting node, the received digest may be directly compared with the digest obtained through decryption. If the received digest is consistent with the digest obtained through decryption, the signature verification succeeds. If the received digest is inconsistent with the digest obtained through decryption, the signature verification fails. The advantage of this embodiment lies in that the transaction information is completely hidden, so that the security of the transaction information is improved, and normal signature verification is ensured at the same time.

Figure 8:
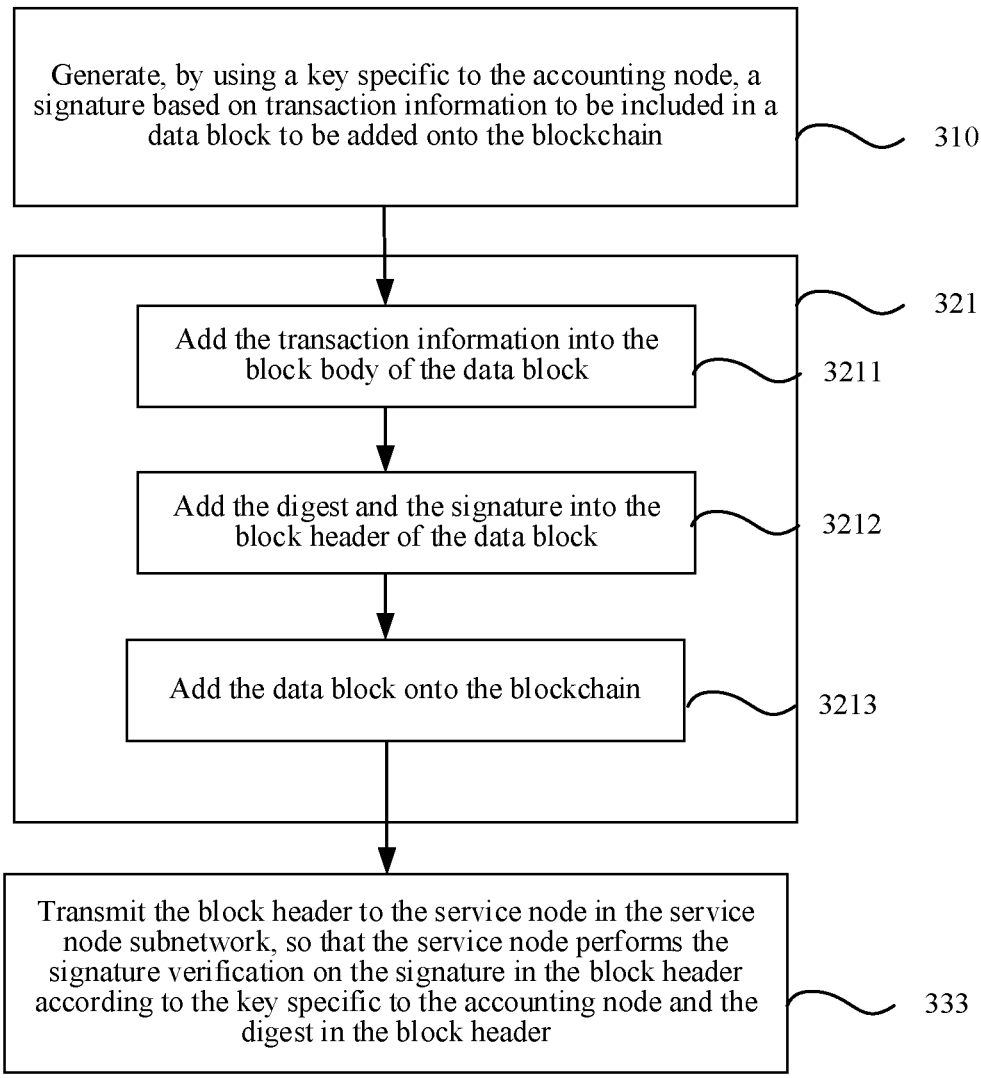
FIG. 8 shows a flowchart of a method for recording a data block in a blockchain network according to an embodiment of the present disclosure.

As shown in FIG. 8, in a case that the data block includes a block header and a block body, the transaction information is added into the block body, and the digest and the signature (optionally, and the digest of the previous block in the blockchain) are added into the block header. In this embodiment, step 321 includes step 3211 where the method can include the transaction information into the block body of the data block, step 3212 where the method can add the digest and the signature into the block header of the data block, and step 3213 where the method can add the data block onto the blockchain.

Figure 19:
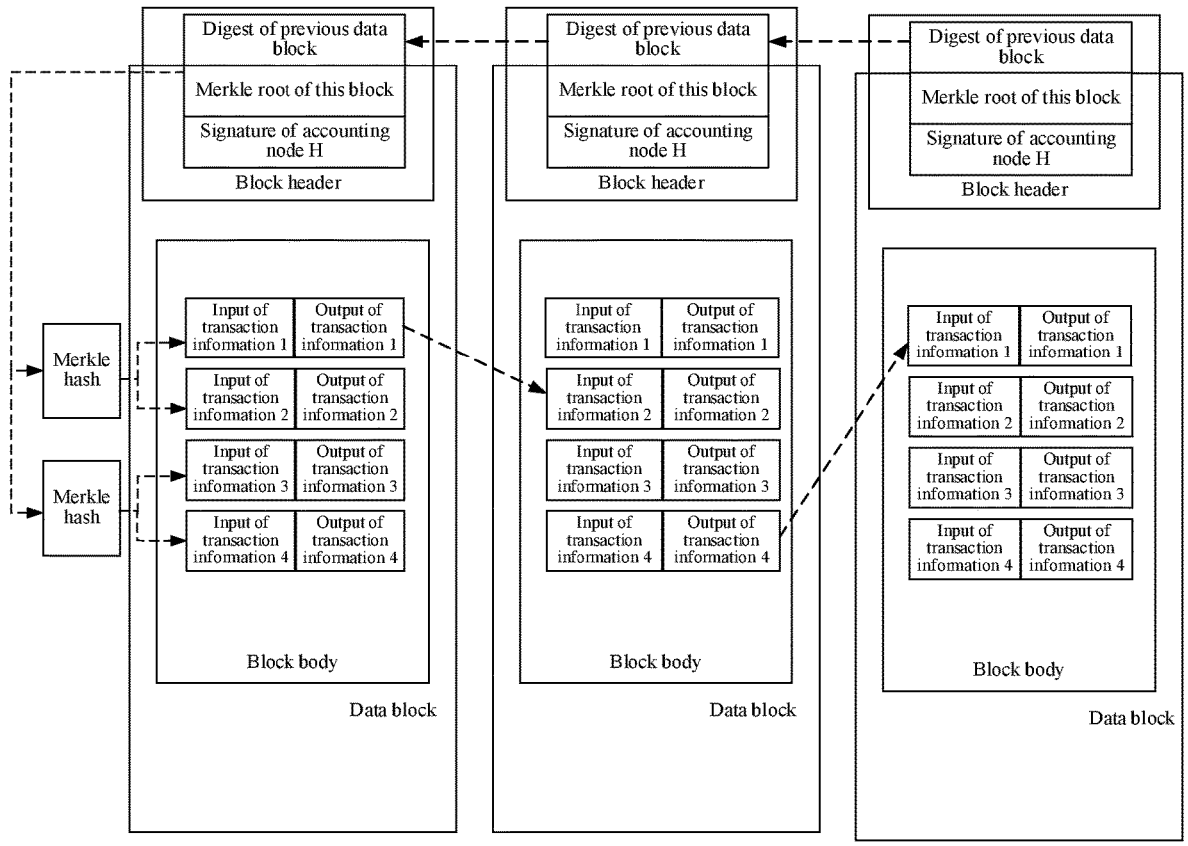
FIG. 19 shows a schematic structural diagram of a data block according to an embodiment of the present disclosure.

As shown in FIG. 19, each piece of transaction information includes input of the transaction information and output of the transaction information. The input of the transaction information is related transaction information of an initiator of the transaction, and the output of the transaction information is related transaction information of a receiver of the transaction. For example, in the transaction of electronic invoicing, the initiator is an invoicing unit, and a name of the invoicing unit, an identification number of a tax payer, an account name, an account opening bank, an electronic invoice number, and the like become the input of the transaction information, and a name and a mobile phone number of a person requesting for reimbursement, a payment account number, an account opening bank, and the like become the output of the transaction information.

In FIG. 19, each piece of transaction information is written into a block body of the data block. The digest (the Merkle root of this block) and the signature are written into the block header of the data block, and the digest of the previous data block on the blockchain is also written into the block header. The block header and the block body together form the data block. As shown in FIG. 19, the Merkle root of a block is finally obtained through layer-to-layer hash operation on a hash value of each piece of transaction information in the block body according to the manner described in the foregoing embodiment. The dashed line arrow in FIG. 19 indicates that the data blocks may be associated with each other. The output of one piece of transaction information in one data block is exactly the input of one piece of transaction information in another data block. For example, during electronic invoicing, the name, the mobile phone number, and the reimbursement unit of the person requesting for reimbursement, the payment account number, the account opening bank, and the like are the output of the transaction information in the corresponding data block. When the person requesting for reimbursement returns to the unit for reimbursement, the name and the mobile phone number of the person requesting for reimbursement, the payment account number, the account opening bank, and the like become the input of the transaction information of reimbursement.

In this embodiment, after the foregoing addition process is completed, step 331 includes: step 333: Transmit the block header to the service nodes in the service node subnetwork, so that the service nodes perform the signature verification on the signature in the block header according to the key specific to the accounting node and the digest in the block header.

Figure 9:
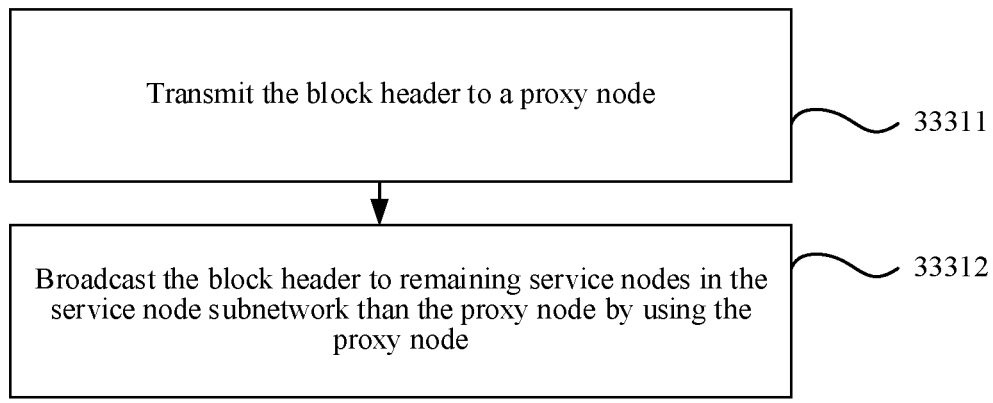
FIG. 9 shows a flowchart of a specific implementation of step 333 in FIG. 8 according to an embodiment of the present disclosure.

In step 333, as shown in FIG. 9, in an embodiment, the transmitting the block header to the service nodes in the service node subnetwork includes:

In step 33311, the method can transmit the block header to a proxy node, the proxy node being a service node in the service node subnetwork.

In step 33312, the method can broadcast the block header to remaining service nodes in the service node subnetwork than the proxy node by using the proxy node.

This embodiment is for the network system architecture shown in FIG. 1B. In this system architecture, the proxy node communicates with all service nodes in the service node subnetwork in a broadcasting manner. The advantage of this embodiment lies in that, the block header can be quickly notified to all service nodes in the service node subnetwork.

Apart from the communication manner of broadcasting a message shown in FIG. 1B, the service node subnetwork may also use the P2P network communication manner shown in FIG. 1A. The P2P network, that is, a peer-to-peer computer network, is a distributed application architecture that distributes tasks and workloads among peers and is a networking or network form formed by a peer-to-peer computing model on an application layer. In a P2P network environment, a plurality of computers connected to each other are in a peer-to-peer position. Each computer has the same function, and there is no distinction between master and slave. One computer can be used as a server and set shared resources for use by other computers in the network, and also can be used as a workstation. Generally speaking, the entire network does not rely on dedicated centralized servers or dedicated workstations. Each computer in the network can not only act as a requester of network services, but also respond to requests from other computers, and provide resources, services, and content. In the P2P service node subnetwork, the proxy node can transmit the block header to the service node nearby, and the service node that receives the block header then transmits the block header to a service nodes nearby, until all the service nodes in the service node subnetwork receive the block header.

Figure 10:
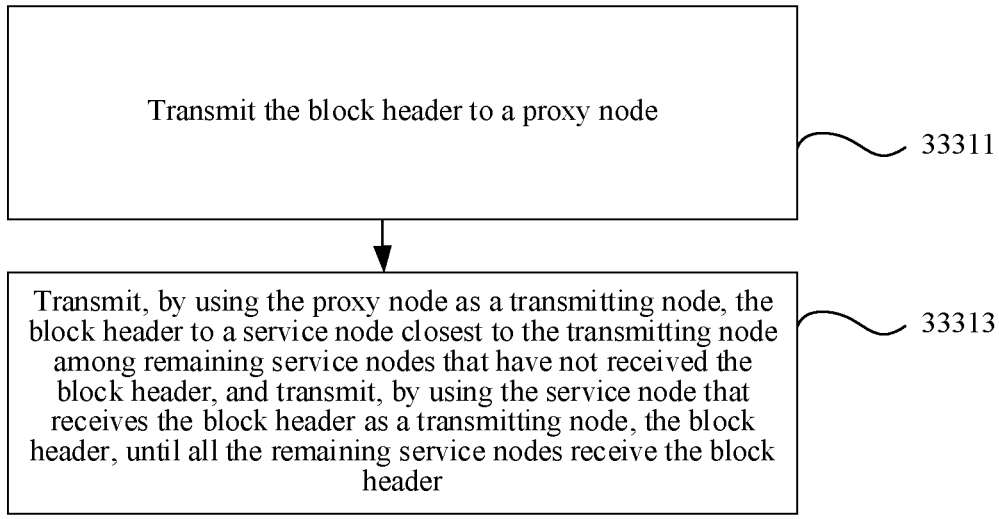
FIG. 10 shows a flowchart of a specific implementation of step 333 in FIG. 8 according to an embodiment of the present disclosure.

In an embodiment of use of a P2P networking form, as shown in FIG. 10, the transmitting the block header to the service nodes in the service node subnetwork includes the following.

In step 33311, the method can transmit the block header to a proxy node, the proxy node being a service node in the service node subnetwork.

In step 33313, the method can transmit, by using the proxy node as a transmitting node, the block header to a service node closest to the transmitting node among remaining service nodes that have not received the block header, and transmit, by using the service node that receives the block header as a transmitting node, the block header, until all the remaining service nodes receive the block header.

In step 33313, because repeatedly receiving the same block header by a service node that has received the block header is of no significance, when determining a service node that receives the block header, each service node not only needs to consider preferentially transmitting the block header to a service node closest to the service node (to reduce transmission waiting time), but also needs to consider transmitting the block header to a service node that has not received the block header. In this way, each service node only needs to transmit the block header to a service node, which is a service node closest to the service node among remaining service nodes that have not received the block header remaining service node. In this way, secure delivery of the block header node by node is completed, and delivery load is prevented from concentrating on one service node, thereby implementing load balance.

Figure 11:
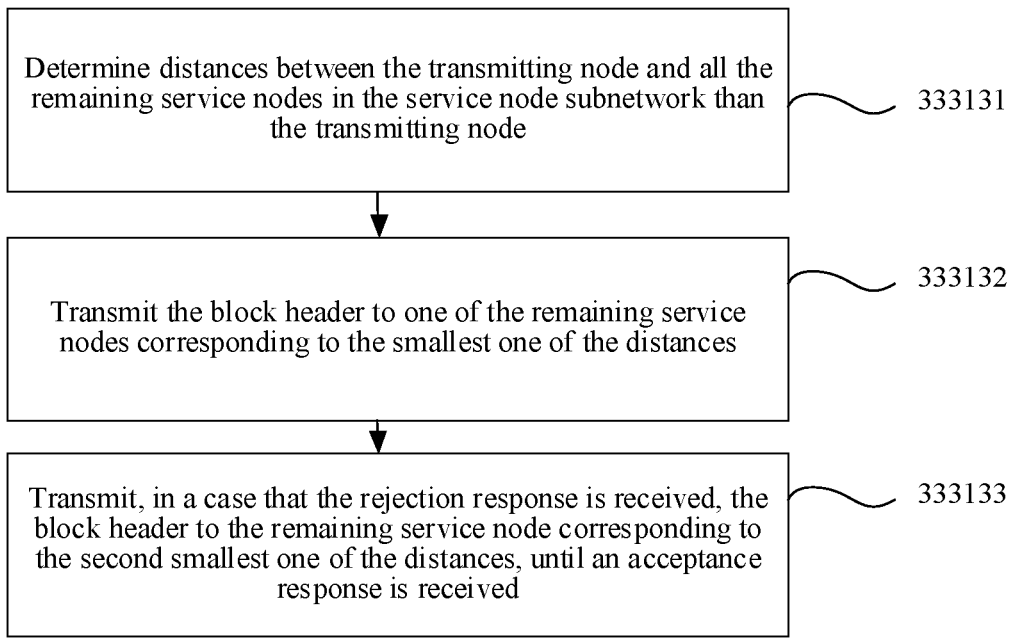
FIG. 11 shows a flowchart of a specific implementation of step 33313 in FIG. 10 according to an embodiment of the present disclosure.

In an embodiment, as shown in FIG. 11, step 33313 can further include the following.

In step 333131, the method can determine distances between the transmitting node and all the remaining service nodes in the service node subnetwork than the transmitting node.

In step 333132, the method can transmit the block header to one of the remaining service node corresponding to the smallest one of the distances, and transmit a rejection response to the transmitting node in a case that the remaining service node that receives the block header has previously received the block header.

In step 333133, the method can transmit, in a case that the rejection response is received, the block header to the remaining service node corresponding to the second smallest one of the distances, until an acceptance response is received.

In an embodiment, in step 333131, the determining distances between the transmitting node and all the other nodes in the service node subnetwork than the transmitting node may further include periodically receiving positioning information broadcast by all the remaining service nodes in the service node subnetwork than the transmitting node, and calculating the distance between each of the remaining service nodes than the transmitting node and the transmitting node according to the positioning information that is broadcast by the each of the remaining service nodes and that is received most recently and positioning information of the transmitting node.

The transmitting node periodically (for example, every other 5 s) receives the positioning information of all the remaining service nodes in the service node subnetwork. The positioning information is location information of the service node obtained by each service node from a positioning system of the service node (for example, a GPS system installed on the node). Each service node obtains the positioning information of the service node from a positioning system installed on the service node, and then periodically (for example, every other 5 s) broadcasts the positioning information to all the remaining service nodes in the service node subnetwork. The transmitting node can also obtain positioning information of the transmitting node from a positioning system of the transmitting node. Because broadcasting and updating of the positioning information is periodic and the period is relatively short, the positioning information that is broadcast by the each of the remaining service nodes and that is received most recently by the transmitting node may be regarded as current positioning information of the each of the remaining service nodes. In this way, the distance between the each of the remaining service nodes and the transmitting node can be calculated according to the positioning information that is broadcast by the each of the remaining service nodes and that is received most recently and the positioning information of the transmitting node.

A service node closest to the transmitting node among remaining service nodes remaining service node can be found by using the foregoing calculated distance, but the service node closest to the transmitting node may have received the block header. Therefore, in this embodiment of the present disclosure, remaining service nodes that receive the block header transmit an acceptance response or a rejection response to avoid repeatedly transmitting the block header to a service node. The difference between the acceptance response and the rejection response lies in that, different characters or character strings are placed in a specific flag field, to represent the acceptance response or the rejection response. In this way, the transmitting node can recognize whether the received response is the acceptance response or the rejection response by recognizing the specific flag field in the received response.

If the response is the acceptance response, it indicates that the service node that is in the remaining service nodes and that receives the block header has not previously received the block header, and therefore the block header is accepted. If the response is the rejection response, it indicates that the service node that is in the remaining service nodes and that receives the block header has previously received the block header, and therefore the block header is rejected. In this case, a service node corresponding to the second smallest one of the distances among the remaining service nodes needs to be found, and the block header is then transmitted to the service node, and whether the response fed back by the service node is the rejection response or the acceptance response is determined. If the response is still the rejection response, a service node corresponding to the third smallest one of the distances among the remaining service nodes needs to be found, and the block header is then transmitted to the service node, and whether the response fed back by the service node is the rejection response or the acceptance response is determined. That is, if the rejection response is received, the block header is transmitted to a service node in the remaining service nodes according to an ascending order of distances between the service node and the transmitting node, until the acceptance response is received.

Another implementation of finding a service node closest to the transmitting node among remaining service nodes that have not received the block header is maintaining a distribution progress recording server. Each time a service node in the remaining service nodes receives the block header, a recording request is transmitted to the distribution progress recording server, the recording request including an identifier of the service node and an identifier of the block header (for example, the Merkle root therein), and the distribution progress recording server stores the identifier of the service node and the identifier of the block header in a corresponding manner. When needing to determine a service node closest to the transmitting node among remaining service nodes that have not received the block header, the transmitting node first transmits a request to the distribution progress recording server, and the distribution progress recording server queries identifiers (removes, from a list of identifiers of all service nodes, a service node identifier already stored corresponding to the identifier of the block header) of service nodes that have not received the block header and that are in the service node subnetwork, and transmits the identifiers to the transmitting node. The transmitting node determines, in the service nodes that have not received the block header, a service node closest to the transmitting node. In comparison, in the manner of transmitting the block header to a service node corresponding to the smallest one of the distances among the remaining service nodes, and transmitting, by the service node that receives the block header, an acceptance response or a rejection response according to whether the service node has previously received the block header, a server is reduced, so that network resources are reduced, thereby avoiding network congestion.

After the service node performs signature verification, a verification result of a success or a failure is received. Further processing after the verification result is obtained is further described below.

Although signature verification performed by a service node may fail, because the service node is civil and has no processing right, the accounting node that misbehaves can still continue to misbehave. However, once signature verification performed by a service node fails, it is also improper to forbid an accounting node that misbehaves and that is verified by the service node from continuing to run, because the service node may maliciously prosecute, or the verification failure is caused by incorrect information transmission rather than misbehaving by the accounting node. Therefore, in this embodiment of the present disclosure, an arbiter server may be set, which is dedicated in collecting signature verification results of all the service nodes, and arbitrating whether the accounting node misbehaves.

In an embodiment, an arbitration manner of the arbiter server is that once a signature verification result for a signature in the block header by a service node is a verification failure, the arbiter server performs signature verification again. If the signature verification still fails, manual investigation is performed, and further processing measures are adopted.

In this embodiment, after step 333, the method can further include transmitting, by the service node, the signature verification result and the block header to the arbiter server, and once a signature verification result for a signature in the block header by a service node is a verification failure, performing, by the arbiter server, signature verification on the signature in the block header according to the key specific to the accounting node and the digest in the block header.

That is, all the service nodes transmit the signature verification results and the block header to the arbiter server. The significance of transmitting the block header to the arbiter server is that the arbiter server may perform signature verification again according to the block header. In this embodiment, once a signature verification result for a signature in the block header by a service node is a verification failure, the arbiter server performs signature verification on the signature in the block header according to the key specific to the accounting node and the digest in the block header, and the verification method is the same as the method for performing signature verification by each service node. In this embodiment, if verification performed by the arbiter server still fails, manual verification needs to be performed to finally determine whether the accounting node misbehaves, to achieve the effect that detailed screening is performed if there is a little suspect, so that the accuracy of screening the misbehaving of the accounting node is ensured.

In the foregoing embodiment, if the verification result of the signature verification performed again by the arbiter server is still the verification failure, and it is proved after manual verification that the accounting node misbehaves, the arbiter server may transmit a running stop instruction to the accounting node that generates the data block, and add, onto the blockchain, a data block including an indication that the data block is invalid When receiving the running stop instruction, the accounting node will stop running. An incorrect data block that has been recorded onto the blockchain cannot be deleted, which is determined by the property of the blockchain, but a data block can be added, indicating that the recorded incorrect data block is invalid, that is, a data block including the indication that the data block is invalid is added.

In an embodiment, an arbitration manner of the arbiter server is that only in a case that signature verification results for a signature in the same block header by service nodes with a quantity reaching a preset quantity threshold are all verification failures, further processing measures are adopted. This takes into account that a service node may complain maliciously, but there are many more service nodes that need to record transactions onto the blockchain than accounting nodes that participate in accounting. Therefore, a small quantity of service nodes may complain maliciously, but it is unrealistic for a plurality of service nodes to unite to maliciously complain about addition of the same data block. Therefore, a quantity threshold may be preset, and only when signature verifications performed by service nodes with a quantity exceeding the quantity threshold for the signature of the same data block all fail, the arbiter server adopts corresponding measures. Moreover, once signature verifications performed by the service nodes with the quantity reaching the quantity threshold all fail, it can basically be concluded that the accounting node cheats, and punitive measures can be adopted directly, that is, the accounting node stops running and a data block indicating that the recorded data block is invalid is added onto the blockchain.

In this embodiment, after step 333, the method further includes: transmitting, by the service node, the signature verification result to the arbiter server, and if signature verification results of more than f service nodes are verification failures, transmitting, by the arbiter server, a running stop instruction to the accounting node that generates the data block, and adding, onto the blockchain, a data block that includes an indication that the data block is invalid, where f is a maximum integer in all integers not greater than $(N-1)/3$, and N is the quantity of service nodes in the service node subnetwork.

Experiments show that, if N is the quantity of the service nodes in the service node subnetwork, and f is the maximum possible quantity of service nodes that unite to complain maliciously, f may be determined as a maximum integer in all the integers not greater than $(N-1)/3$. If signature verification results of more than f service nodes are verification failures, and the maximum possible quantity of service nodes that unite to complain maliciously is exceeded, it may be concluded that the accounting node misbehaves. Therefore, further manual verification is not required, and the arbiter server can directly adopt the punitive measures, that is, transmit the running stop instruction to the accounting node that generates the data block, and add, onto the blockchain, a data block that includes an indication that the data block is invalid. The advantage of this embodiment is that, based on the quantity of service nodes that report the verification results of failures, whether to transmit the running stop instruction to the accounting node that generates the data block, and add, onto the blockchain, a data block that includes an indication that the data block is invalid is determined, thereby avoiding complexity of manual verification to some extent.

The foregoing signature verification enables each service node to verify the signature generated by the accounting node to ensure that the data block is generated by the accounting node. In this way, once any problem is found in the data block later, the problem is the evidence of the misbehavior of the accounting node. Therefore, the foregoing signature verification is of great significance to improving the credibility of accounting of the data block on the blockchain. To further prevent the accounting node from tampering with the transaction information in the data block, in a further embodiment of the present disclosure, content verification is further adopted after the signature verification. That is, it is verified whether each piece of transaction data recorded by the accounting node in the data block is real.

Figure 12:
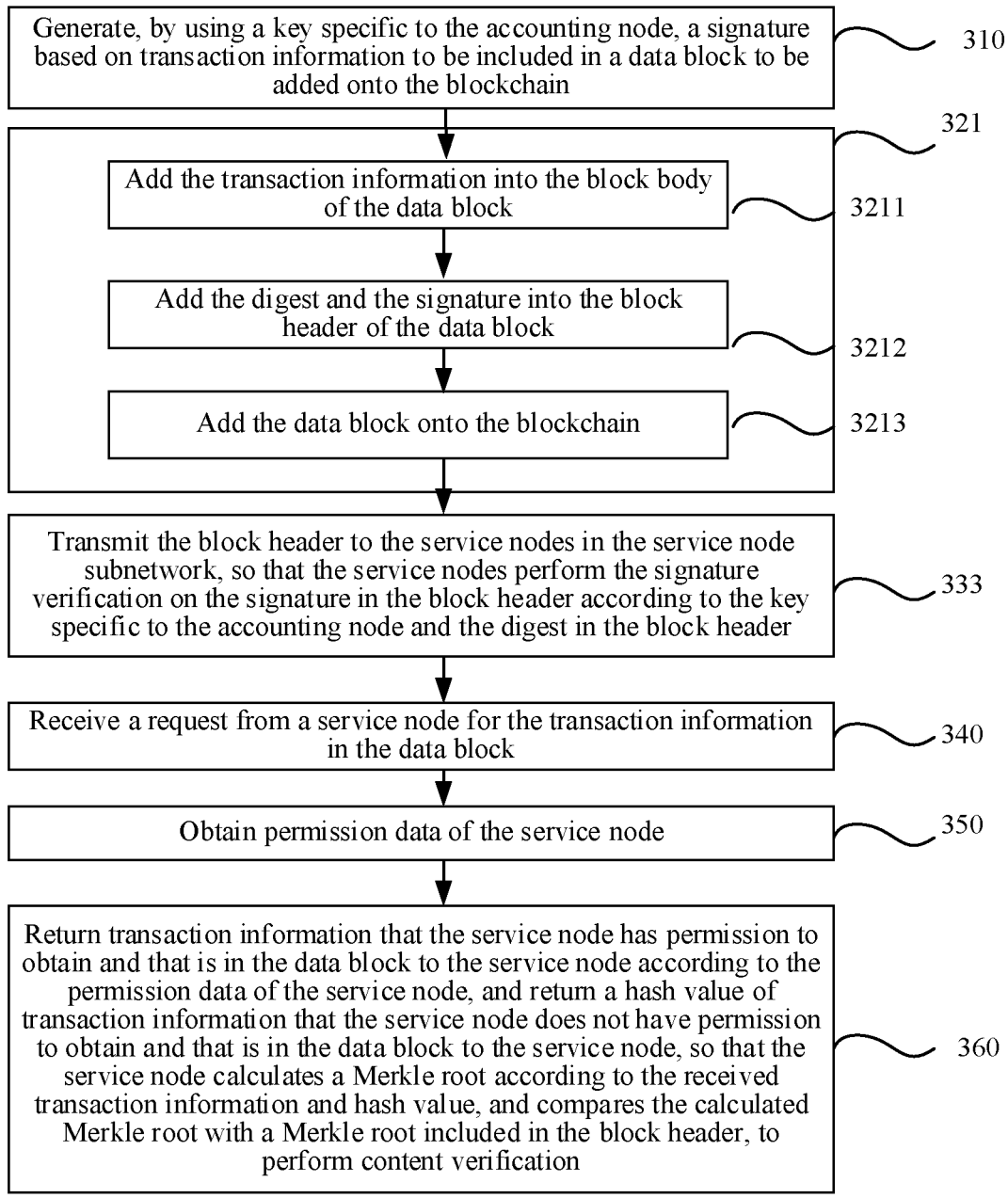
FIG. 12 shows a flowchart of a method for recording a data block in a blockchain network according to an embodiment of the present disclosure.

In this embodiment, the digest calculated for the transaction information to be included in the data block is a Merkle root calculated according to a hash value of each piece of transaction information to be included in the data block. The manner of calculating the Merkle root is described above. After step 333, as shown in FIG. 12, in an embodiment, the method further includes the following steps.

In step 340, the method can receive a request from a service node for the transaction information in the data block.

In step 350, the method can obtain permission data of the service node.

In step 360, the method can return transaction information that the service node has permission to obtain and that is in the data block to the service node according to the permission data of the service node, and return a hash value of transaction information that the service node does not have permission to obtain and that is in the data block to the service node, so that the service node calculates a Merkle root according to the received transaction information and hash value, and compares the calculated Merkle root with a Merkle root included in the block header, to perform content verification.

After the data block is added onto the blockchain, in a case that the accounting node transmits the block header to each service node of the service node subnetwork, the each service node cannot see each piece of transaction information in the block body of the data block. In this way, the transaction information is hidden. When the service node wants to see the transaction information in the data block, the service node needs to transmit, to the accounting node, a request for the transaction information in the data block. However, the accounting node transmits only transaction information (for example, transaction information that the service node requests to be added onto the blockchain, or transaction information that an underling unit of the service node requests to be added onto the blockchain) that the service node has permission to view to the service node for viewing, and forbids the service node from viewing transaction information (such as information that remaining service nodes request to add onto the blockchain) that the service node does not have permission to view, so that information of the units is added onto the blockchain and is prevented from being leaked out. However, the accounting node returns a hash value of the transaction information that the service node does not have permission to view to the service node. It can be learned from the foregoing manner of calculating the Merkle root that, if some transaction information in the data block is unknown, but hash values of the transaction information are known, the foregoing Merkle root can also be finally calculated. When the Merkle root calculated by the service node is compared with the Merkle root that is in the block header of the data block and that is returned by the accounting node, content verification may be performed. If the two Merkle roots are consistent, it indicates that the accounting node tampers with no transaction information. If the two Merkle roots are inconsistent, it indicates that the accounting node tampers with some of the transaction information, leading to a possibility that the Merkle root finally recalculated by the service node is inconsistent with the Merkle root in the block header.

The permission data of the service node means data of the permission of the service node to obtain the transaction information in the data block, and the lack of the permission of the service node to obtain the transaction information. In an embodiment, permission in the permission data includes one or more of the following: a requesting service node, where the requesting service node means a service node that requests to add the transaction information allowed to be viewed onto the blockchain; a transaction type corresponding to the transaction information allowed to be viewed; and an addition time, where the addition time means a time at which the transaction information allowed to be viewed is added onto the blockchain.

The service node that requests to add the transaction information allowed to be viewed onto the blockchain means permission to view transaction information that which service nodes request to add onto the blockchain. In an embodiment, it may be specified that one service node can view only transaction information that the service node requests to be added onto the blockchain. It is assumed that there is a service node A, and it is specified in the permission data of the service node A that the service node that requests to add onto the blockchain and that corresponds to transaction information allowed to be viewed is the service node A itself, in this way, only the data block that the service node A requests to add onto the blockchain can be viewed by the service node A. In another embodiment, it may be specified that one service node can view transaction information that the service node itself, and all underling units of the service node request to add onto the blockchain. For example, there is a service node A, and service nodes of underling units of the service node A are A1 to A7. In this way, the service nodes that request to add onto the blockchain and that correspond to transaction information allowed to be viewed are the service nodes A and A1 to A7. In this way, data blocks that any one of the service node A and the service nodes A1 to A7 requests to add onto the blockchain can be viewed by the service node A.

The transaction type corresponding to the transaction information allowed to be viewed means the permission to view which transaction types of transaction information. A transaction type is carried in the transaction information of the data block. The transaction type is, for example, invoice transaction, supply chain finance transaction, legal digital currency transaction, or the like. In the invoice transaction, a service node of the local tax bureau may be allowed to view all transaction information about the invoice within its jurisdiction. Therefore, all the transaction information about the invoice in the data block may be returned to the service node, and only hash values of transaction information of other types in the data block are returned to the service node. In the supply chain finance transaction, a service node of a bank may be allowed to view all transaction information about the supply chain finance within its jurisdiction. Therefore, all the transaction information about the supply chain finance in the data block may be returned to the service node, and only hash values of transaction information of other types in the data block are returned to the service node. In the legal digital currency transaction, a service node of an issuing authority of the legal digital currency may be allowed to view all transaction information about the circulation of the legal digital currency within its jurisdiction. Therefore, all the transaction information about the legal digital currency in the data block may be returned to the service node, and only hash values of transaction information of other types in the data block are returned to the service node.

The time at which the transaction information allowed to be viewed is added onto the blockchain means the permission to view transaction information added onto the blockchain in which period of time. For example, it may be specified that the service node A can view only transaction information added onto the blockchain within the most recent year.

The foregoing permissions may alternatively be used in combination. For example, the service node that requests to add the transaction information allowed to be viewed onto the blockchain and the time at which the transaction information allowed to be viewed is added onto the blockchain may be used in combination. It is assumed that there is a service node A, and service nodes of underling units of the service node A are A1 to A7. It may be specified in permission data of the service node A that: the service node A may obtain transaction information of the service node A and the service nodes A1 to A7 that is added onto the blockchain in the most recent year.

In an embodiment, before step 310, the method may include obtaining, in response to a registration request to a blockchain network from a service node, a network access contract corresponding to the service node, the network access contract including permission data of the service node, and adding the network access contract to a data block, and adding the data block onto the blockchain.

In this embodiment, step 350 includes obtaining the network access contract from the blockchain, and obtaining the permission data of the service node from the network access contract.

When the service node applies to join the blockchain network, a registration request is transmitted to an accounting node. At the same time, a staff member that operates and maintains the blockchain network verifies, for the service node according to the property and the operation status of the service node, permission to view the transaction information, writes corresponding permission data into the network access contract, and inputs the network access contract into the accounting node. In this way, the accounting node obtains the network access contract corresponding to the service node, the network access contract including permission data of the service node. The accounting node may add, in a corresponding manner, the identifier of the service node and the network access contract to a block body of a data block, and add the data block onto the blockchain. In this way, after receiving the request for the transaction information in the data block from the service node, because all content in the data block on the blockchain is completely visible to the accounting node, the network access contract stored corresponding to the identifier of the service node can be found in the blockchain according to the identifier of the requesting service node, and permission data is read from the network access contract.

The process in which the service node calculates the Merkle root according to the received transaction information and hash values is similar to the foregoing process in which the accounting node generates the Merkle root according to all the transaction information in the data block, and the difference lies only in that, in the foregoing process in which the accounting node generates the Merkle root according to all the transaction information in the data block, hash values of all the transaction information need to be calculated, and the Merkle root is then generated according to the hash values, and at the service node, hash values of some pieces of transaction information are directly received and do not need to be calculated.

The advantage of the foregoing embodiment is that, content verification may be performed based on signature verification, to further prevent the accounting node from tampering with content of the transaction information, and enable the transaction information to be confidential to irrelevant users, thereby preventing leakage of the transaction information.

Similar to the further processing after the signature verification, the method may further include further processing after the content verification. That is, in an embodiment, after step 360, the method may further include transmitting, by the service node, the content verification result, the transaction information and hash values received by the service node, and the Merkle root included in the block header to the arbiter server, and once a content verification result for the data block by a service node is a verification failure, recalculating, by the arbiter server, the Merkle root according to the received transaction information and hash values, and comparing the recalculated Merkle root with the Merkle root included in the block header, to perform content verification.

In this embodiment, all the service nodes transmit the content verification results and the transaction information and hash values received by the service nodes, and the Merkle root included in the block header to the arbiter server. Once a content verification result of a service node is a verification failure, the arbiter server performs content verification again according to the received transaction information and hash values, and the Merkle root included in the block header. If verification still fails, manual verification further needs to be performed, to finally determine whether the accounting node misbehaves. In this way, the effect that detailed screening is performed if there is a little suspect is achieved, so that the accuracy of screening the misbehaving of the accounting node is ensured.

In another embodiment, after step 360, the method includes transmitting, by the service node, the content verification result to the arbiter server, and if content verification results of more than f service nodes are verification failures, transmitting, by the arbiter server, a running stop instruction to the accounting node that generates the data block, and adding, onto the blockchain, a data block that includes an indication that the data block is invalid, where f is a maximum integer in all integers not greater than $(N-1)/3$, and N is the quantity of service nodes in the service node subnetwork.

Experiments show that, if N is the quantity of service nodes in the service node subnetwork, and f is the maximum possible quantity of service nodes that unite to complain maliciously, f may be determined as a maximum integer in all the integers not greater than $(N-1)/3$. If content verification results of more than f service nodes are verification failures, and the maximum possible quantity of service nodes that unite to complain maliciously is exceeded, it may be concluded that the accounting node misbehaves. Therefore, further manual verification is not required, and the arbiter server may directly adopt the punitive measures, that is, transmit the running stop instruction to the accounting node that generates the data block, and add, onto the blockchain, a data block that includes an indication that the data block is invalid. The advantage of this embodiment is that, based on the quantity of service nodes that report the verification results of failures, whether to transmit the running stop instruction to the accounting node that generates the data block, and add, onto the blockchain, a data block that includes an indication that the data block is invalid is determined, thereby avoiding complexity of manual verification to some extent.

As described above, the method for recording a data block in a blockchain network according to this embodiment of the present disclosure is performed by an accounting node in the accounting node subnetwork. A process of selecting the accounting node is described in detail below.

Figure 14:
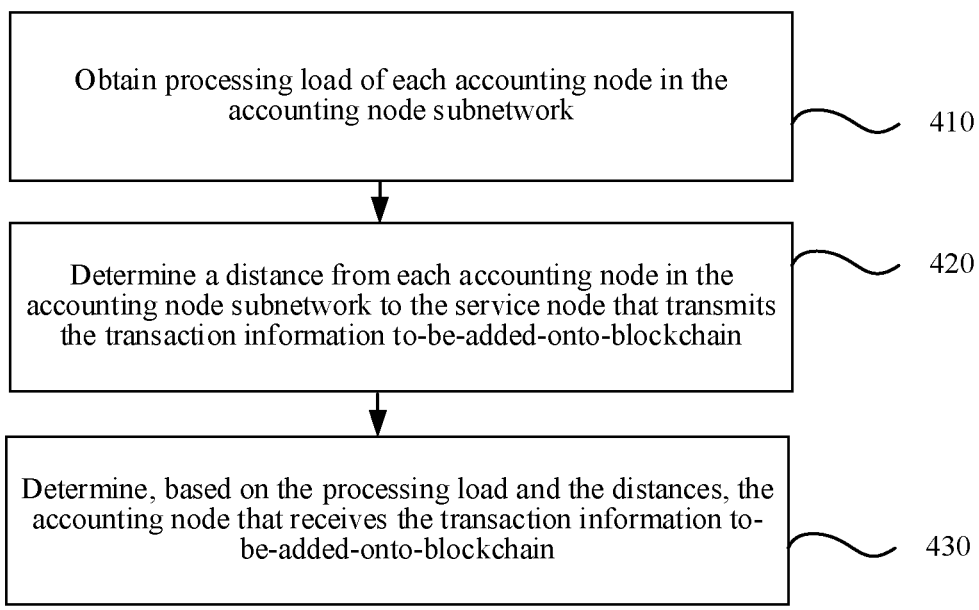
FIG. 14 shows a flowchart of a selecting an accounting node that performs a method for recording a data block in a blockchain network according to an embodiment of the present disclosure.

In an embodiment, as shown in FIG. 14, the accounting node that receives transaction information to-be-added-onto-blockchain from a service node is selected from the accounting node subnetwork in the following manner. In an embodiment, the transaction information to-be-added-onto-blockchain of the service node is first transmitted to a proxy node, and the proxy node selects the accounting node according to the following steps.

In step 410, the method can obtain processing load of each accounting node in the accounting node subnetwork.

In step 420, the method can determine a distance from each accounting node in the accounting node subnetwork to the service node that transmits the transaction information to-be-added-onto-blockchain.

In step 430, the method can determine, based on the processing load and the distances, the accounting node that receives the transaction information to-be-added-onto-blockchain.

The processing load is a parameter that represents load of a task being processed. In an embodiment, the processing load may be measured by the quantity of pieces of the transaction information to-be-added-onto-blockchain that the accounting node does not complete in processing. When expecting to add a piece of transaction information to-be-added-onto-blockchain onto the blockchain, the service node transmits the transaction information to-be-added-onto-blockchain to the accounting node. After receiving the transaction information to-be-added-onto-blockchain, the accounting node generates a digest and a signature based on transaction information to be included in a data block to be added onto the blockchain, encapsulates the transaction information, the digest, and the signature into a data block, and then adds the data block onto the blockchain after accounting nodes reach a consensus. A case that the accounting node does not add a piece of received transaction information to-be-added-onto-blockchain onto the blockchain is a case in which processing is not completed. The quantity of pieces of the transaction information to-be-added-onto-blockchain that the accounting node does not complete in processing can represent the processing load of the accounting node.

In an embodiment, step 410 can include obtaining and storing processing load periodically transmitted by each accounting node, and using processing load that is of the accounting node and that is stored by the accounting node most recently as the obtained processing load of the accounting node.

That is, in this embodiment, the processing load may be periodically (for example, every other five seconds) transmitted to the proxy node by each accounting node. The proxy node maintains a processing load table, which records received processing load periodically broadcast by each accounting node. In this way, the proxy node may use processing load that is of the accounting node and that is stored by the accounting node most recently as the obtained processing load of the accounting node.

In this embodiment, the proxy node passively receives the processing load periodically transmitted by the accounting node. In another embodiment, the proxy node actively queries the processing load of the accounting node. In this embodiment, step 410 includes transmitting a processing load query request to each accounting node in the accounting node subnetwork, and receiving the processing load of the each accounting node transmitted by the accounting node.

In an embodiment, in step 420, the determining a distance from each accounting node in the accounting node subnetwork to the service node that transmits the transaction information to-be-added-onto-blockchain includes transmitting a positioning information request to the each accounting node in the accounting node subnetwork and the service node that transmits the transaction information to-be-added-onto-blockchain. Further, the method can include receiving, from the each accounting node and the service node that transmits the transaction information to-be-added-onto-blockchain, positioning information of the each accounting node and the service node that transmits the transaction information to-be-added-onto-blockchain, and determining, by using the positioning information of the each accounting node and the service node that transmits the transaction information to-be-added-onto-blockchain, the distance from the each accounting node to the service node that transmits the transaction information to-be-added-onto-blockchain.

Each service node and accounting node may have a positioning system such as GPS. Therefore, they can obtain their own positioning information from respective GPS positioning systems. When a positioning information request transmitted by the proxy node is received, the positioning information obtained from the GPS system is transmitted to the proxy node. After obtaining the positioning information of the each accounting node and the service node that transmits the transaction information to-be-added-onto-blockchain, the proxy node can determine, by using the positioning information, the distance from the each accounting node to the service node that transmits the transaction information to-be-added-onto-blockchain.

In the foregoing embodiment, the positioning information is obtained in the manner of active requesting by the proxy node. Similar to the processing load, the positioning information may alternatively be periodically transmitted to the proxy node by the each accounting node and the service node that transmits the transaction information to-be-added-onto-blockchain. Therefore, details are not described again.

The advantage of this embodiment is that, when the accounting node that receives the transaction information to-be-added-onto-blockchain is determined, not only the processing load of the each accounting node is considered, but also the distance from the each accounting node to the service node that transmits the transaction information to-be-added-onto-blockchain is considered. Although processing load of an accounting node is the smallest, the accounting node may be very far away from the service node that transmits the transaction information to-be-added-onto-blockchain. If the accounting node is selected as the accounting node that receives the transaction information to-be-added-onto-blockchain, network transmission load is increased, and the processing speed of addition is also reduced. However, if an accounting node is very close to the service node that transmits the transaction information to-be-added-onto-blockchain but has large processing load, the processing speed of addition is also reduced. This embodiment compressively takes the distance and the processing load into account, and compared with the solution of determining, only according to the distance or the processing load, the accounting node that receives the transaction information to-be-added-onto-blockchain, this embodiment can approximately balance processing load of each accounting node without causing excessive transmission load to the network.

Figure 15:
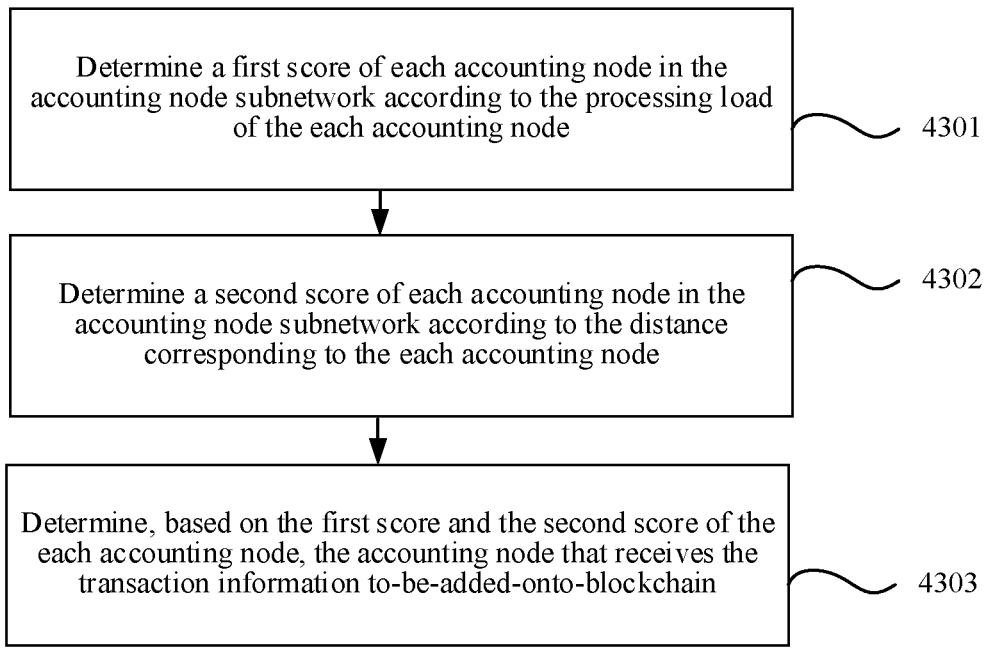
FIG. 15 shows a flowchart of a specific implementation of step 430 in FIG. 14 according to an embodiment of the present disclosure.

In an embodiment, as shown in FIG. 15, step 430 may include the following.

In step 4301, the method can determine a first score of each accounting node in the accounting node subnetwork according to the processing load of the each accounting node.

In step 4302, the method can determine a second score of each accounting node in the accounting node subnetwork according to the distance corresponding to the each accounting node.

In step 4303, the method can determine, based on the first score and the second score of the each accounting node, the accounting node that receives the transaction information to-be-added-onto-blockchain.

In step 4301, the determining a first score of each accounting node in the accounting node subnetwork according to the processing load of the each accounting node may be implemented in a manner of querying a preset table of a correspondence between the processing load and the first score. The table of the correspondence between the processing load and the first score may be preset. Larger processing load indicates a lower first score. For example,

TABLE 1

Table of Correspondence between Processing Load and First Score

| Processing load (the quantity of pieces of transaction information to-be-added-onto-blockchain on which processing is not completed) | First score |
|---|---|
| 0-1 | 5 |
| 2-4 | 4 |
| 5-9 | 3 |
| 10-19 | 2 |
| 20-49 | 1 |
| More than 50 | 0 |

In step 4302, the determining a second score of the each accounting node in the accounting node subnetwork according to the distance corresponding to the each accounting node may be implemented in a manner of querying a preset table of a correspondence between the distance and the second score. The table of the correspondence between the distance and the second score may be preset. A larger distance indicates a lower second score. For example,

TABLE 2

Table of Correspondence between Distance and Second Score

| Distance | Second score |
|---|---|
| Within 50 meters | 5 |
| 50 meters to 200 meters | 4 |
| 200 meters to 1000 meters | 3 |
| 1000 meters to 5000 meters | 2 |
| 5000 meters to 20000 meters | 1 |
| More than 20000 meters | 0 |

If the first score and the second score of the each accounting node are obtained, the accounting node that receives the transaction information to-be-added-onto-blockchain may be determined according to the first score and the second score. The advantage of this embodiment lies in that, the impact of two factors, namely, the processing load of each accounting node in the accounting node subnetwork and the distance corresponding to the each accounting node in the accounting node subnetwork on selection of the accounting node that receives the transaction information to-be-added-onto-blockchain is scored, to improve the accuracy of selecting the accounting node that receives the transaction information to-be-added-onto-blockchain.

Figure 16:
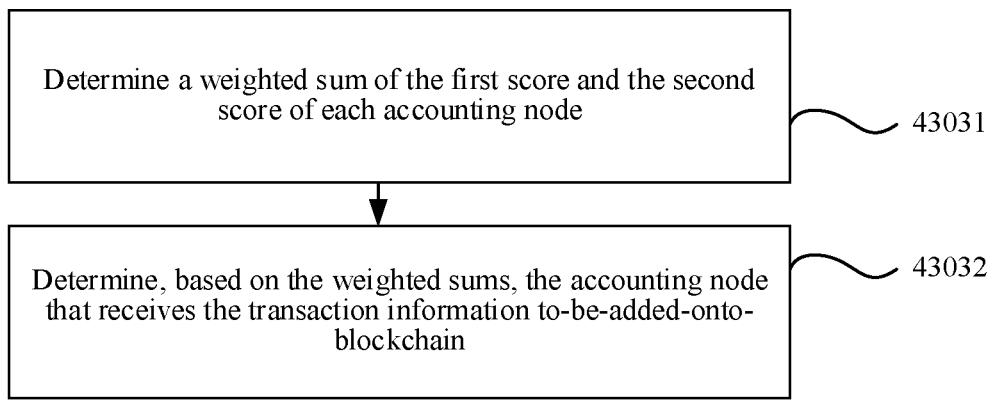
FIG. 16 shows a flowchart of a specific implementation of step 4303 in FIG. 15 according to an embodiment of the present disclosure.

In an embodiment, as shown in FIG. 16, step 4303 can include the following.

In step 43031, the method can determine a weighted sum of the first score and the second score of each accounting node.

In step 43032, the method determine, based on the weighted sums, the accounting node that receives the transaction information to-be-added-onto-blockchain.

In step 43031, when the weighted sum is determined, the weight allocated to the first score and the second score may be preset according to experience.

In step 43032, an accounting node with a largest weighted sum may be determined as the accounting node that receives the transaction information to-be-added-onto-blockchain, or an accounting node may be randomly selected from accounting nodes with weighted sums greater than a preset weighted sum threshold as the accounting node that receives the transaction information to-be-added-onto-blockchain. It may be considered that provided that the weighted sum is greater than a preset weighted sum threshold, the accounting node is an accounting node that has load not excessively large and that is not excessively far away from the service node that transmits the transaction information to-be-added-onto-blockchain. The manner of the latter further facilitates load balance, to prevent selection of an accounting node with a largest weighted sum in the same period of time, which causes the accounting node with a largest weighted sum to run in an overloaded manner.

The advantage of this embodiment is that, compared with the solution of determining, based on a sum of the first score and the second score or an average value of the first score and the second score, the accounting node that receives the transaction information to-be-added-onto-blockchain, the determining, based on the weighted sum of the first score and the second score of each accounting node, the accounting node that receives the transaction information to-be-added-onto-blockchain fully takes into account that the first score and the second score contribute differently to determining of the accounting node that receives the transaction information to-be-added-onto-blockchain, so that the properness of determining the accounting node that receives the transaction information to-be-added-onto-blockchain is improved.

The foregoing embodiment of determining the accounting node that receives the transaction information to-be-added-onto-blockchain is mainly applied to a case that there is no branch accounting node subnetwork in an accounting node subnetwork end in FIG. 1A and FIG. 1B. However, in the embodiment in which the accounting node subnetwork end is divided into a plurality of branch accounting node subnetworks shown in FIG. 1C, the case is described below.

In this embodiment, the transaction information to-be-added-onto-blockchain carries a transaction information type, such as supply chain finance transaction, electronic invoice transaction, or legal digital currency transaction. Accounting nodes in the accounting node subnetwork are pre-classified according to the type of transaction information to be processed. Each type of accounting nodes obtained after classification form a branch accounting node subnetwork, for example, a supply chain finance transaction branch accounting node subnetwork, an electronic invoice transaction branch accounting node subnetwork, or a legal digital currency transaction branch accounting node subnetwork. Each branch accounting node subnetwork is dedicated in processing transaction information corresponding to a transaction type. Therefore, the proxy node needs to transmit, according to a transaction information type carried in the transaction information to-be-added-onto-blockchain, the transaction information to-be-added-onto-blockchain to an accounting node in a branch accounting node subnetwork of the corresponding type. To implement this, a table of a correspondence between an identifier of the accounting node and the transaction information type is stored in the proxy node. The identifier of the accounting node and the transaction information type to be processed are correspondingly recorded in the table of the correspondence between the identifier of the accounting node and the transaction information type.

Figure 17:
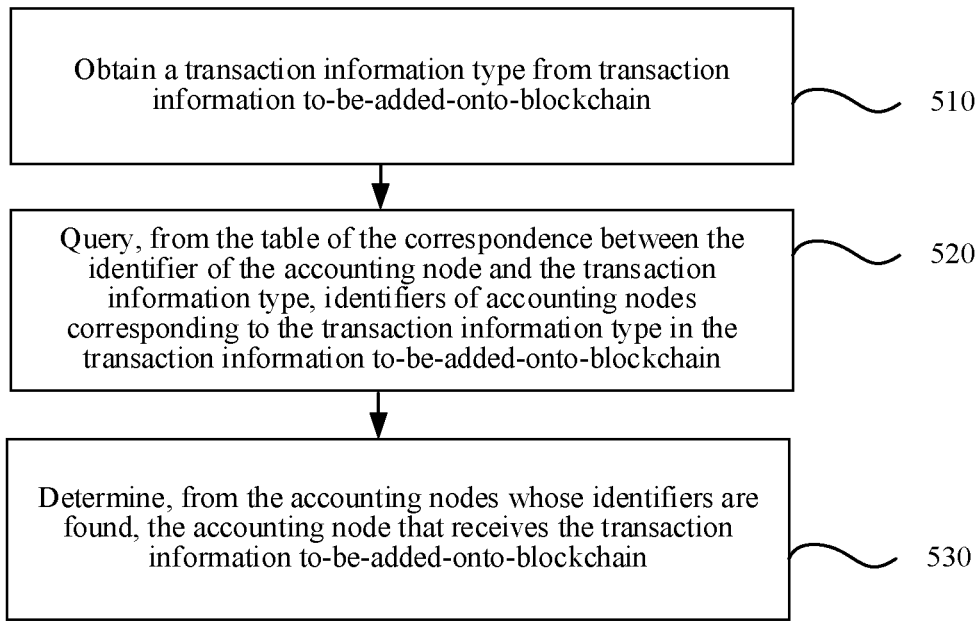
FIG. 17 shows a flowchart of a selecting an accounting node that performs a method for recording a data block in a blockchain network according to an embodiment of the present disclosure.

In this embodiment, as shown in FIG. 17, the accounting node that receives the transaction information to-be-added-onto-blockchain from the service node is selected from the accounting node subnetwork in the following manner.

In step 510, the method can obtain a transaction information type from transaction information to-be-added-onto-blockchain.

In step 520, the method can query, from the table of the correspondence between the identifier of the accounting node and the transaction information type, identifiers of accounting nodes corresponding to the transaction information type in the transaction information to-be-added-onto-blockchain.

In step 530, the method can determine, from the accounting nodes whose identifiers are found, the accounting node that receives the transaction information to-be-added-onto-blockchain.

The advantage of this embodiment is that, for the system architecture in which the accounting node subnetwork end is divided into branch accounting node subnetworks shown in FIG. 1C, a manner that is of properly selecting the accounting node that receives the transaction information to-be-added-onto-blockchain from the service node and that is applicable to the system architecture is provided.

In an embodiment, the transaction information type field of the transaction information to-be-added-onto-blockchain includes the transaction information type. In step 510, the transaction information type may be directly read from the transaction information type field.

Because the table of the correspondence between the identifier of the accounting node and the transaction information type is disposed on the proxy node, in an embodiment, in step 520, the identifier of the accounting node corresponding to the transaction information type in the transaction information to-be-added-onto-blockchain may be found from the table.

Figure 18:
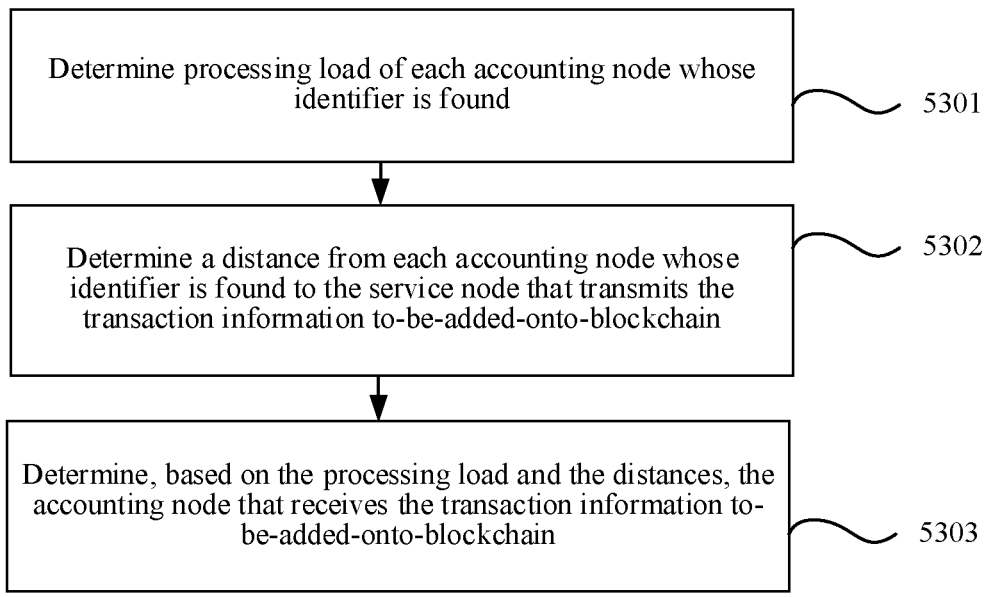
FIG. 18 shows a flowchart of a specific implementation of step 530 in FIG. 17 according to an embodiment of the present disclosure.

As shown in FIG. 18, in an embodiment, step 530 include the following.

In step S301, the method can determine processing load of each accounting node whose identifier is found.

In step S302, the method can include determine a distance from each accounting node whose identifier is found to the service node that transmits the transaction information to-be-added-onto-blockchain.

In step S303, the method can determine, based on the processing load and the distances, the accounting node that receives the transaction information to-be-added-onto-blockchain.

The specific implementation process of step S301 to step S303 is similar to the specific implementation process of step 410 to step 430, and the difference only lies in that in the embodiment of FIG. 18, the range of accounting nodes in which the processing load and the distance to the service node that transmits the transaction information to-be-added-onto-blockchain is limited only to the accounting nodes whose identifiers correspond to the transaction information type in the transaction information to-be-added-onto-blockchain and that are found in step 520, rather than all the accounting nodes in the accounting node subnetwork. Therefore, details are not described again.

Figure 21:
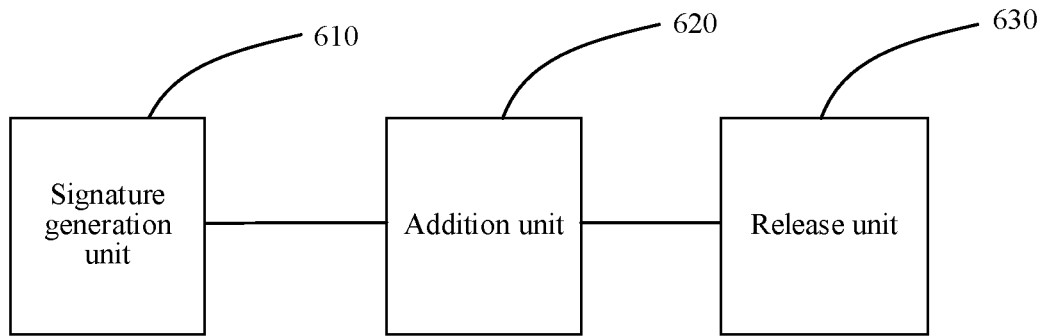
FIG. 21 shows a schematic diagram of modules of an accounting node for recording a data block in a blockchain network according to an embodiment of the present disclosure.

According to an embodiment of the present disclosure, as shown in FIG. 21, an accounting node for recording a data block in a blockchain network is further provided. The blockchain network includes an accounting node subnetwork and a service node subnetwork. The accounting node subnetwork includes accounting nodes configured to record a data block onto a blockchain. The service node subnetwork includes service nodes configured to verify data blocks recorded by the accounting nodes onto the blockchain.

The accounting node can included a signature generation unit 610, configured to generate, by using a key specific to the accounting node, a signature based on transaction information to be included in a data block to be added onto the blockchain, an addition unit 620, configured to add the transaction information and the generated signature to the data block, and add the data block onto the blockchain, and a release unit 630, configured to transmit the signature to the service nodes in the service node subnetwork, so that the service nodes perform signature verification on the signature according to the key specific to the accounting node.

In an embodiment, the release unit 630 is further configured to transmit the signature and the transaction information in the data block to the service nodes in the service node subnetwork, so that the service nodes perform obtaining a key specific to the accounting node, decrypting the signature by using the key specific to the accounting node, to obtain a digest of transaction information in the data block, calculating a digest of the transaction information in the data block, and considering the signature verification a success if the calculated digest is consistent with the digest obtained through decryption.

In an embodiment, the addition unit 620 is further configured to add the transaction information, the generated signature, and a digest that is calculated for the transaction information to be included in the data block to the data block, and add the data block onto the blockchain.

In an embodiment, the release unit 630 is further configured to transmit the signature and the digest to the service nodes in the service node subnetwork, so that the service nodes perform the signature verification on the signature according to the key specific to the accounting node and the received digest.

In an embodiment, the performing the signature verification on the signature according to the key specific to the accounting node and the received digest includes obtaining a key specific to the accounting node, decrypting the signature by using the key specific to the accounting node, to obtain a digest of transaction information in the data block, and considering the signature verification a success in a case that the received digest is consistent with the digest obtained through decryption.

In an embodiment, the addition unit 620 is further configured to add the transaction information to a block body of the data block, add the digest and the signature to a block header of the data block, and add the data block onto the blockchain.

In this embodiment, the release unit 630 is further configured to transmit the block header to the service nodes in the service node subnetwork, so that the service nodes perform the signature verification on the signature in the block header according to the key specific to the accounting node and the digest in the block header.

In an embodiment, the transmitting the block header to the service nodes in the service node subnetwork includes transmitting the block header to a proxy node, the proxy node being a service node in the service node subnetwork, and broadcasting the block header to remaining service nodes in the service node subnetwork than the proxy node by using the proxy node.

In an embodiment, the transmitting the block header to the service nodes in the service node subnetwork includes transmitting the block header to a proxy node, the proxy node being a service node in the service node subnetwork, and transmitting, by using the proxy node as a transmitting node, the block header to a service node closest to the transmitting node among remaining service nodes that have not received the block header, and transmitting, by using the service node that receives the block header as a transmitting node, the block header, until all the remaining service nodes receive the block header.

In an embodiment, the transmitting the block header to a service node closest to the transmitting node among remaining service nodes that have not received the block header includes determining distances between the transmitting node and all the remaining service nodes in the service node subnetwork than the transmitting node, transmitting the block header to the remaining service node corresponding to the smallest one of the distances, and transmitting a rejection response to the transmitting node in a case that the remaining service node that receives the block header has previously received the block header, and transmitting, in a case that the rejection response is received, the block header to the remaining service node corresponding to the second smallest one of the distances, until an acceptance response is received.

In an embodiment, the determining distances between the transmitting node and all the remaining service nodes in the service node subnetwork than the transmitting node includes periodically receiving positioning information broadcast by all the remaining service nodes in the service node subnetwork than the transmitting node, and calculating the distance between the transmitting node and each of the remaining service nodes than the transmitting node according to the positioning information that is broadcast by the each of the remaining service nodes and that is received most recently and positioning information of the transmitting node.

In an embodiment, after the transmitting the block header to the service nodes in the service node subnetwork, so that the service nodes perform the signature verification on the signature in the block header according to the key specific to the accounting node and the digest in the block header, the service node transmits the signature verification result and the block header to the arbiter server. Once a signature verification result for a signature in the block header by a service node is a verification failure, the arbiter server performs the signature verification on the signature in the block header according to the key specific to the accounting node and the digest in the block header.

In an embodiment, after the transmitting the block header to the service nodes in the service node subnetwork, so that the service nodes perform the signature verification on the signature in the block header according to the key specific to the accounting node and the digest in the block header, the service node transmits the signature verification result to the arbiter server. If signature verification results of more than f service nodes are verification failures, the arbiter server transmits a running stop instruction to the accounting node that generates the data block, and adds, onto the blockchain, a data block that includes an indication that the data block is invalid, where f is a maximum integer in all integers not greater than $(N-1)/3$.

In an embodiment, the digest calculated for the transaction information to be included in the data block is a Merkle root calculated according to a hash value of each piece of transaction information to be included in the data block. The accounting node further includes a request receiving unit, configured to receive a request from a service node for transaction information in the data block, a permission data obtaining unit, configured to obtain permission data of the service node, and a returning unit, configured to return transaction information that the service node has permission to obtain and that is in the data block to the service node according to the permission data of the service node, and return a hash value of transaction information that the service node does not have permission to obtain and that is in the data block to the service node, so that the service node calculates a Merkle root according to the received transaction information and hash value, and compares the calculated Merkle root with a Merkle root included in the block header, to perform content verification.

In an embodiment, after the service node calculates a Merkle root according to the received transaction information and hash value, and compares the calculated Merkle root with a Merkle root included in the block header, to perform content verification the service node transmits the content verification result, the transaction information and hash value received by the service node, and the Merkle root included in the block header to the arbiter server. Once a content verification result for the data block by a service node is a verification failure, the arbiter server calculates the Merkle root according to the received transaction information and hash value, and compares the calculated Merkle root with the Merkle root included in the block header, to perform content verification.

In an embodiment, after the service node calculates the Merkle root according to the received transaction information and hash value, and compares the calculated Merkle root with a Merkle root included in the block header, to perform content verification, the service node transmits the content verification result to the arbiter server. If content verification results of more than f service nodes are verification failures, the arbiter server transmits a running stop instruction to the accounting node that generates the data block, and adds, onto the blockchain, a data block that includes an indication that the data block is invalid, where f is a maximum integer in all integers not greater than $(N-1)/3$, and N is the quantity of service nodes in the service node subnetwork.

In an embodiment, the signature generation unit is further configured to receive and cache transaction information to-be-added-onto-blockchain from the service node, use, in a case that the cached transaction information to-be-added-onto-blockchain meets a preset block packaging requirement, the cached transaction information to-be-added-onto-blockchain as the transaction information to be included in the data block to be added onto the blockchain, obtain the key specific to the accounting node from a CA, and implement, by using the key obtained from the CA, a signature algorithm on the transaction information to be included in the data block to be added onto the blockchain, to generate the signature.

In an embodiment, the block packaging requirement includes at least one of the following a total size of the cached transaction information to-be-added-onto-blockchain reaches a preset size threshold, a total quantity of pieces of the cached transaction information to-be-added-onto-blockchain reaches a preset piece quantity threshold, and a time length from a caching time of a piece of transaction information to-be-added-onto-blockchain that is cached the earliest in the cached transaction information to-be-added-onto-blockchain to a current time reaches a preset time threshold.

In an embodiment, the addition unit is further configured to add the transaction information and the generated signature to the data block, and transmit the data block to a leader accounting node in all accounting nodes in the accounting node subnetwork, broadcast, by the leader accounting node, the data block to other accounting nodes in the accounting node subnetwork for consensus, and add, by the leader accounting node, the data block onto the blockchain after the consensus succeeds.

In an embodiment, the accounting node is selected from the accounting node subnetwork in the following manner obtaining processing load of each accounting node in the accounting node subnetwork, determining a distance from each accounting node in the accounting node subnetwork to the service node that transmits the transaction information to-be-added-onto-blockchain, and determining, based on the processing load and the distances, the accounting node that receives the transaction information to-be-added-onto-blockchain.

In an embodiment, the determining, based on the processing load and the distances, the accounting node that receives the transaction information to-be-added-onto-blockchain includes determining a first score of each accounting node in the accounting node subnetwork according to the processing load of the each accounting node, determining a second score of each accounting node in the accounting node subnetwork according to the distance corresponding to the each accounting node, and determining, based on the first score and the second score of the each accounting node, the accounting node that receives the transaction information to-be-added-onto-blockchain.

In an embodiment, the determining, based on the first score and the second score of the each accounting node, the accounting node that receives the transaction information to-be-added-onto-blockchain includes determining a weighted sum of the first score and the second score of each accounting node, and determining, based on the weighted sums, the accounting node that receives the transaction information to-be-added-onto-blockchain.

In an embodiment, the determining, based on the weighted sums, the accounting node that receives the transaction information to-be-added-onto-blockchain includes determining the accounting node with a largest weighted sum as the accounting node that receives the transaction information to-be-added-onto-blockchain.

In an embodiment, the transaction information to-be-added-onto-blockchain carries a transaction information type. Accounting nodes in the accounting node subnetwork are pre-classified according to the type of transaction information to be processed. Each type of accounting nodes obtained after classification form a branch accounting node subnetwork. An identifier of the accounting node and the transaction information type to be processed are correspondingly recorded in a table of a correspondence between the identifier of the accounting node and the transaction information type. The accounting node is selected from the accounting node subnetwork in the following manner of obtaining a transaction information type from transaction information to-be-added-onto-blockchain, querying, from the table of the correspondence between the identifier of the accounting node and the transaction information type, identifiers of accounting nodes corresponding to the transaction information type in the transaction information to-be-added-onto-blockchain, and determining, from the accounting nodes whose identifiers are found, the accounting node that receives the transaction information to-be-added-onto-blockchain.

In an embodiment, the determining, from the accounting nodes whose identifiers are found, the accounting node that receives the transaction information to-be-added-onto-blockchain includes obtaining processing load of each accounting node whose identifier is found, determining a distance from each accounting node whose identifier is found to the service node that transmits the transaction information to-be-added-onto-blockchain, and determining, based on the processing load and the distances, the accounting node that receives the transaction information to-be-added-onto-blockchain.

Figure 22:
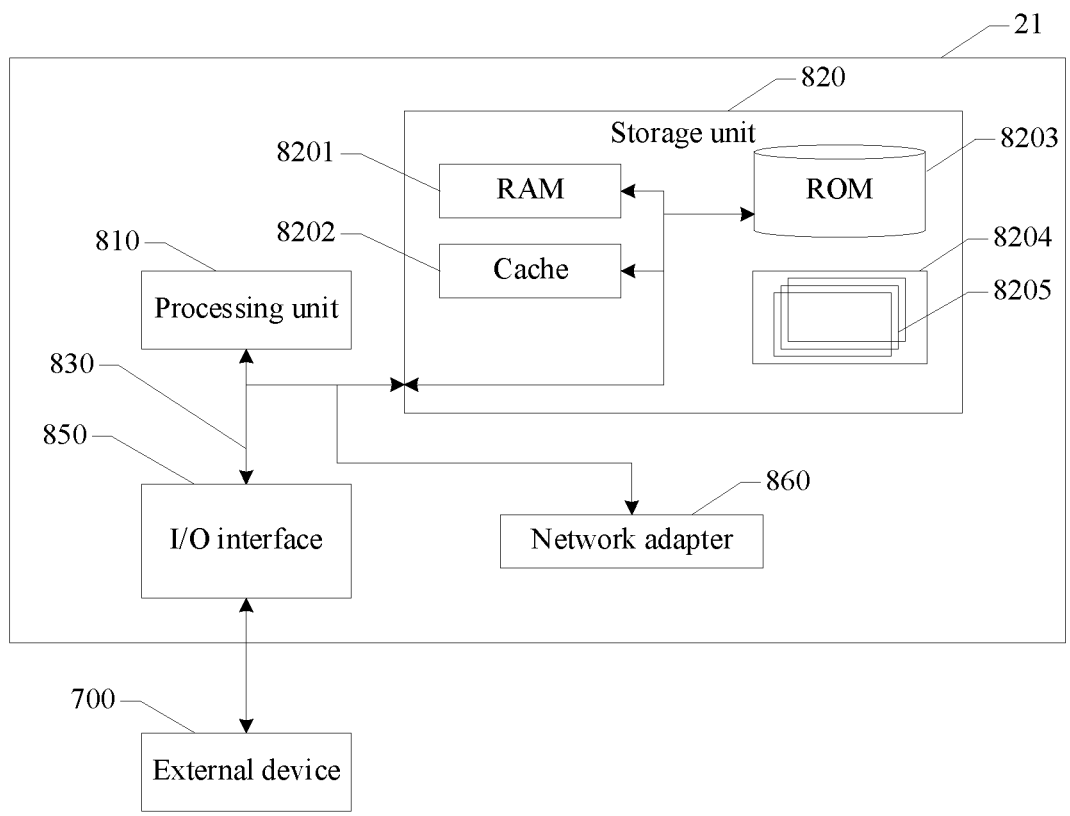
FIG. 22 shows a schematic structural diagram of hardware of an accounting node according to an embodiment of the present disclosure.

The method for recording a data block in a blockchain network according to this embodiment of the present disclosure may be implemented by the accounting node 21 of FIG. 22. The accounting node 21 according to this embodiment of the present disclosure is described below with reference to FIG. 22. The accounting node 21 shown in FIG. 22 is only an example, and does not impose any limitation on the functions and scope of use of the embodiments of the present disclosure.

As shown in FIG. 22, the accounting node 21 is represented in a form of a general-purpose computing device. Components of the accounting node 21 may include, but are not limited to: at least one processing unit 810, at least one storage unit 820, and a bus 830 connected to different system components (including the storage unit 820 and the processing unit 810).

The storage unit stores program code, and the program code may be executed by the processing unit 810, so that the processing unit 810 performs the steps according to various exemplary implementations of the present disclosure described in the foregoing embodiments of this specification. For example, the processing unit 810 may perform each step shown in FIG. 6.

The storage unit 820 may include a readable medium in the form of a volatile storage unit, for example, a random access memory (RAM) 8201 and/or a cache storage unit 8202, and may further include a read-only memory (ROM) 8203.

The storage unit 820 may further include a program/utility tool 8204 having a group of (at least one) program modules 8205. Such a program module 8205 includes, but is not limited to, an operating system, one or more application programs, other program modules, and program data. Each or a combination of these examples may include implementation of a network environment.

The bus 830 may represent one or more of several types of bus structures, including a storage unit bus or a storage unit controller, a peripheral bus, an accelerated graphics port, a processing unit, or a local bus using any bus structure in a plurality of types of bus structures.

The accounting node 21 may alternatively communicate with one or more external devices 700 (for example, a keyboard, a pointing device, and a Bluetooth device), or may communicate with one or more devices that enable a user to interact with the accounting node 21 and/or communicate with any device (for example, a router or a modem) that enables the accounting node 21 to communicate with one or more other computing devices. Such communication may be performed by using an input/output (I/O) interface 850. In addition, the accounting node 21 may further communicate with one or more networks (for example, a local area network (LAN), a wide area network (WAN), and/or a public network such as the Internet) through a network adapter 860. As shown in the figure, the network adapter 860 communicates with other modules of the accounting node 21 by using the bus 830. It is to be understood that although not shown in the figure, other hardware and/or software modules may be used in combination with the accounting node 21, including, but not limited to microcode, a device drive, a redundancy processing unit, an external disk drive array, a RAID system, a tape drive, a data backup and storage system, and the like.

Through descriptions of the foregoing implementations, a person skilled in the art can easily understand that the exemplary implementations described herein may be implemented by software or by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or in a network and includes several instructions for instructing a computer device (which may be a personal computer, a server, a terminal apparatus, a network device, or the like) to perform the methods described in the implementations of the present disclosure.

In an exemplary embodiment of the present disclosure, a computer-readable storage medium is further provided, storing computer-readable instructions, the computer-readable instructions, when executed by a processor of a computer, causing the computer to perform the methods described in the foregoing method embodiments.

According to an embodiment of the present disclosure, a program product for implementing the methods in the foregoing method embodiments is further provided. The program product may use a portable CD-ROM and include program code, and may be run on a terminal device such as a personal computer. However, the program product in the present disclosure is not limited thereto. In this specification, the readable storage medium may be any tangible medium including or storing a program, and the program may be used by or used in combination with an instruction execution system, an apparatus, or a device.

The program product may use any combination of one or more readable media. The readable medium may be a readable signal medium or a readable storage medium. The readable storage medium may be, for example, but not limited to, an electric, magnetic, optical, electromagnetic, infrared, or semi-conductive system, apparatus, or device, or any combination thereof. More specific examples (a non-exhaustive list) of the readable storage medium may include: an electrical connection having one or more wires, a portable disk, a hard disk, a RAM, a ROM, an erasable programmable ROM (EPROM or flash memory), an optical fiber, a portable CD-ROM, an optical storage device, a magnetic storage device, or any appropriate combination thereof.

The non-transitory computer-readable signal medium may include a data signal propagated in a baseband or as part of a carrier, and stores readable program code. The propagated data signal may be in a plurality of forms, including, but not limited to, an electromagnetic signal, an optical signal, or any appropriate combination thereof. The readable signal medium may alternatively be any readable medium other than the readable storage medium. The readable medium may transmit, propagate, or transmit a program configured to be used by or in combination with an instruction execution system, apparatus, or device.

The program code included in the readable medium may be transmitted by using any suitable medium, including but not limited to, via wireless transmission, a wire, a cable, radio frequency (RF), or the like, or any suitable combination thereof.

The program code used for executing the operations of the present disclosure may be written by using one or more programming languages or a combination thereof. The programming languages include an object-oriented programming language such as Java and C++, and also include a conventional procedural programming language such as "C" language or similar programming languages. The program code may be completely executed on a user computing device, partially executed on user equipment, executed as an independent software package, partially executed on a user computing device and partially executed on a remote computing device, or completely executed on a remote computing device or server. For the case involving a remote computing device, the remote computing device may be connected to a user computing device through any type of network including a LAN or a WAN, or may be connected to an external computing device (for example, through the Internet by using an Internet service provider).

Although several modules or units of a device for action execution are mentioned in the foregoing detailed descriptions, the division is not mandatory. Actually, according to the implementations of the present disclosure, features and functions of the two or more modules or units described above may be embodied in one module or unit. Conversely, the features and functions of one module or unit described above may be further divided into a plurality of modules or units to be embodied.

In addition, although the steps of the method in the present disclosure are described in the accompanying drawings in a specific sequence, this does not require or imply that these steps need to be performed according to the specific sequence, or all shown steps need to be performed to achieve an expected result. Additionally or alternatively, some steps may be omitted, a plurality of steps are combined into one step, and/or one step is decomposed into a plurality of steps for execution, and the like.

Through the description of the foregoing implementations, a person of ordinary skill in the art can easily understand that the exemplary implementations described herein may be implemented by software, or may be implemented by combining software with necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a mobile terminal, a network device, or the like) to execute the methods described in the implementations of the present disclosure.

After considering the specification and practicing the present disclosure, a person skilled in the art would easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the related art. The specification and the embodiments are merely for an illustration purpose, and the true scope and spirit of the present disclosure are subject to the claims.

What is claimed is:

1. A method for recording a data block in a blockchain network having an accounting node subnetwork and a service node subnetwork, the accounting node subnetwork including accounting nodes that are configured to record the data block onto a blockchain, the service node subnetwork including service nodes that are configured to verify data blocks recorded by the accounting nodes onto the blockchain, the method being performed by an accounting node of the accounting nodes in the accounting node subnetwork and comprising:

generating a signature based on transaction information to be included in the data block to be added onto the blockchain by using a key specific to the accounting node;

adding the transaction information and the generated signature to the data block;

adding the data block onto the blockchain; and transmitting the signature to the service nodes in the service node subnetwork, wherein the service nodes perform signature verification on the signature based on the key specific to the accounting node.

2. The method according to claim 1, wherein:
the adding the transaction information and the generated signature to the data block comprises:
   adding the transaction information, the generated signature, and a digest that is calculated for the transaction information to the data block; and
the transmitting the signature to the service nodes in the service node subnetwork comprises:
   transmitting the signature and the digest to the service nodes in the service node subnetwork, wherein the service nodes perform the signature verification on the signature based on the key specific to the accounting node and the received digest.

3. The method according to claim 2, wherein:
the adding the transaction information, the generated signature, and the digest comprises:
   adding the transaction information to a block body of the data block;
   adding the digest and the generated signature to a block header of the data block; and
the transmitting the signature and the digest to the service nodes further comprises:
   transmitting the block header to the service nodes in the service node subnetwork, wherein the service nodes perform the signature verification on the signature in the block header according to the key specific to the accounting node and the received digest in the block header.

4. The method according to claim 3, wherein the transmitting the block header to the service nodes in the service node subnetwork comprises:
   transmitting the block header to a proxy node that is one of the service nodes in the service node subnetwork; and
   broadcasting the block header to remaining service nodes in the service node subnetwork other than the proxy node by using the proxy node.

5. The method according to claim 3, wherein the transmitting the block header to the service nodes in the service node subnetwork comprises:
   transmitting the block header to a proxy node that is a service node of the service nodes in the service node subnetwork;
   transmitting the block header to another service node of the service nodes closest to a transmitting node among remaining service nodes that have not received the block header by using the proxy node as the transmitting node; and
   transmitting the block header by using the other service node that receives the block header, until all the remaining service nodes receive the block header.

6. The method according to claim 5, wherein the transmitting the block header to the other service node closest to the transmitting node further comprises:
   determining distances between the transmitting node and all the remaining service nodes in the service node subnetwork other than the transmitting node;
   transmitting the block header to the remaining service node corresponding to the smallest one of the distances, and transmitting a rejection response to the transmitting node when the remaining service node that receives the block header has previously received the block header; and
   transmitting the block header to the remaining service node corresponding to the second smallest one of the distances when the rejection response is received, until an acceptance response is received.

7. The method according to claim 3, wherein:
the digest calculated for the transaction information is a Merkle root calculated based on a hash value of each piece of the transaction information, and
after the transmitting the block header to the service nodes in the service node subnetwork, the method further comprises:
   receiving a request from a service node of the service nodes for the transaction information in the data block;
   obtaining permission data of the service node; and
   returning transaction information that the service node has permission to obtain and that is in the data block to the service node based on the permission data of the service node, and returning a hash value of transaction information that the service node does not have permission to obtain and that is in the data block to the service node, wherein the service node calculates a Merkle root based on the received transaction information and the hash value, and compares the calculated Merkle root with the Merkle root included in the block header, to perform content verification.

8. The method according to claim 1, wherein the generating the signature based on the transaction information further comprises:
   receiving and caching transaction information to-be-added-onto-blockchain from a service node of the service nodes;
   using the cached transaction information to-be-added-onto-blockchain as the transaction information to be included in the data block to be added onto the blockchain when the cached transaction information to-be-added-onto-blockchain meets a preset block packaging requirement;
   obtaining the key specific to the accounting node from a certification authority; and
   implementing a signature algorithm on the transaction information to be included in the data block to be added onto the blockchain by using the key obtained from the certification authority to generate the signature.

9. The method according to claim 8, wherein the preset block packaging requirement further comprises at least one of:
   a total size of the cached transaction information to-be-added-onto-blockchain reaches a preset size threshold;
   a total quantity of pieces of the cached transaction information to-be-added-onto-blockchain reaches a preset piece quantity threshold; and
   a time length from a caching time of a piece of transaction information to-be-added-onto-blockchain that is cached the earliest in the cached transaction information to-be-added-onto-blockchain to a current time reaches a preset time threshold.

10. The method according to claim 8, wherein the accounting node that receives the transaction information to-be-added-onto-blockchain from the service node is selected from the accounting node subnetwork by:
   obtaining processing load of each accounting node in the accounting node subnetwork;
   determining a distance from each accounting node in the accounting node subnetwork to the service node that transmits the transaction information to-be-added-onto-blockchain; and
   determining the accounting node that receives the transaction information to-be-added-onto-blockchain based on the processing load and the distances.

11. The method according to claim 10, wherein the determining the accounting node that receives the transaction information to-be-added-onto-blockchain comprises:
  determining a first score of each accounting node in the accounting node subnetwork according to the processing load of the respective accounting node;
  determining a second score of each accounting node in the accounting node subnetwork according to the distance corresponding to the respective accounting node; and
  determining the accounting node that receives the transaction information to-be-added-onto-blockchain based on the first score and the second score of each accounting node.

12. The method according to claim 11, wherein the determining the accounting node that receives the transaction information to-be-added-onto-blockchain further comprises:
  determining a weighted sum of the first score and the second score of each accounting node; and
  determining the accounting node that receives the transaction information to-be-added-onto-blockchain based on the weighted sums.

13. An accounting node for recording a data block in a blockchain network having an accounting node subnetwork and a service node subnetwork, the blockchain network including an accounting node subnetwork having accounting nodes that are configured to record the data block onto a blockchain, and the service node subnetwork having service nodes that are configured to verify data blocks recorded by the accounting nodes onto the blockchain, the accounting node including processing circuitry that is configured to:
  generate a signature based on transaction information to be included in the data block to be added onto the blockchain by using a key specific to the accounting node;
  add the transaction information and the generated signature to the data block;
  add the data block onto the blockchain; and
  transmit the signature to the service nodes in the service node subnetwork, wherein the service nodes perform signature verification on the signature based on the key specific to the accounting node.

14. The accounting node according to claim 13, wherein the processing circuitry is configured to:
  add the transaction information, the generated signature, and a digest that is calculated for the transaction information to the data block;
  transmit the signature and the digest to the service nodes in the service node subnetwork, wherein the service nodes perform the signature verification on the signature based on the key specific to the accounting node and the received digest.

15. The accounting node according to claim 14, wherein the processing circuitry is configured to:
  add the transaction information to a block body of the data block;
  add the digest and the generated signature to a block header of the data block; and
  transmit the block header to the service nodes in the service node subnetwork, wherein the service nodes perform the signature verification on the signature in the block header according to the key specific to the accounting node and the digest in the block header.

16. The accounting node according to claim 15, wherein the processing circuitry is configured to:
  transmit the block header to a proxy node that is one of the service nodes in the service node subnetwork; and
  broadcast the block header to remaining service nodes in the service node subnetwork other than the proxy node by using the proxy node.

17. The accounting node according to claim 15, wherein the processing circuitry is configured to:
  transmit the block header to a proxy node that is one of the service nodes in the service node subnetwork;
  transmit the block header to another service node of the service nodes closest to a transmitting node among remaining service nodes that have not received the block header by using the proxy node as the transmitting node; and
  transmit the block header by using the other service node that receives the block header, until all the remaining service nodes receive the block header.

18. The accounting node according to claim 17, wherein the processing circuitry is configured to:
  determine distances between the transmitting node and all the remaining service nodes in the service node subnetwork other than the transmitting node;
  transmit the block header to the remaining service node corresponding to the smallest one of the distances, and transmit a rejection response to the transmitting node when the remaining service node that receives the block header has previously received the block header; and
  transmit the block header to the remaining service node corresponding to the second smallest one of the distances when the rejection response is received, until an acceptance response is received.

19. An accounting node, comprising:
  memory that is configured to store computer-readable instructions; and
  one or more processors that are configured to read the computer-readable instructions stored in the memory and perform the method according to claim 1.

20. A non-transitory computer-readable storage medium that stores computer-readable instructions that, when executed by a processor of a computer, cause the computer to perform a method for recording a data block in a blockchain network having an accounting node subnetwork and a service node subnetwork, the accounting node subnetwork including accounting nodes that are configured to record the data block onto a blockchain, the service node subnetwork including service nodes that are configured to verify data blocks recorded by the accounting nodes onto the blockchain, the method comprising:
  generating a signature based on transaction information to be included in the data block to be added onto the blockchain by using a key specific to the accounting node;
  adding the transaction information and the generated signature to the data block;
  adding the data block onto the blockchain; and
  transmitting the signature to the service nodes in the service node subnetwork, wherein the service nodes perform signature verification on the signature based on the key specific to the accounting node.

* * * * *